(12) United States Patent
Stauber et al.

(10) Patent No.: US 12,124,673 B2
(45) Date of Patent: Oct. 22, 2024

(54) DEVICES, METHODS, AND GRAPHICAL USER INTERFACES FOR CONTENT APPLICATIONS

(71) Applicant: Apple Inc., Cupertino, CA (US)

(72) Inventors: Matan Stauber, San Francisco, CA (US); Jonathan R. Dascola, San Francisco, CA (US); Lorena S. Pazmino, San Francisco, CA (US); Poyan Pourshian, Alameda, CA (US); Ichha Arora, Rancho Cucamonga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/933,707

(22) Filed: Sep. 20, 2022

(65) Prior Publication Data

US 2023/0093979 A1 Mar. 30, 2023

Related U.S. Application Data

(60) Provisional application No. 63/261,567, filed on Sep. 23, 2021.

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/013* (2013.01); *G06T 7/70* (2017.01); *G06T 19/006* (2013.01); *G06T 19/20* (2013.01); *G06V 10/761* (2022.01); *G06V 40/103* (2022.01); *G06V 40/20* (2022.01); *G06T 2207/30196* (2013.01)

(58) Field of Classification Search
None
See application file for complete search history.

(56) References Cited

U.S. PATENT DOCUMENTS 5,515,488 A 5/1996 Hoppe et al.
5,524,195 A 6/1996 Clanton et al.
(Continued)

FOREIGN PATENT DOCUMENTS

CN 104714771 A 6/2015
CN 110543230 A 12/2019
(Continued)

OTHER PUBLICATIONS

Corrected Notice of Allowability received for U.S. Appl. No. 17/479,791, mailed on May 19, 2023, 2 pages.
(Continued)

*Primary Examiner* — Frank S Chen
(74) *Attorney, Agent, or Firm* — Kubota & Basol LLP

(57) ABSTRACT

In some embodiments, an electronic device displays a user interface of a content application in a three-dimensional environment with or without virtual lighting effects applied to the three-dimensional environment depending on whether the user interface is in a mode that does not include virtual lighting or a mode that includes virtual lighting. In some embodiments, an electronic device updates display of interactive user interface elements in response to detecting a respective pose of a respective portion of a user of the electronic device.

48 Claims, 43 Drawing Sheets

(51) Int. Cl.
*G06T 7/70* (2017.01)
*G06T 19/00* (2011.01)
*G06T 19/20* (2011.01)
*G06V 10/74* (2022.01)
*G06V 40/10* (2022.01)
*G06V 40/20* (2022.01)

(56) References Cited

U.S. PATENT DOCUMENTS

| | | |
|---|---|---|
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,108,004 A | 8/2000 | Medl |
| 6,112,015 A | 8/2000 | Planas et al. |
| 6,323,846 B1 | 11/2001 | Westerman et al. |
| 6,456,296 B1 | 9/2002 | Cataudella et al. |
| 6,570,557 B1 | 5/2003 | Westerman et al. |
| 6,584,465 B1 | 6/2003 | Zhu et al. |
| 6,677,932 B1 | 1/2004 | Westerman |
| 6,756,997 B1 | 6/2004 | Ward et al. |
| 7,035,903 B1 | 4/2006 | Baldonado |
| 7,137,074 B1 | 11/2006 | Newton et al. |
| 7,230,629 B2 | 6/2007 | Reynolds et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,706,579 B2 | 4/2010 | Oijer |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,593,558 B2 | 11/2013 | Gardiner et al. |
| 8,803,873 B2 | 8/2014 | Yoo et al. |
| 8,896,632 B2 | 11/2014 | Macdougall et al. |
| 8,970,478 B2 | 3/2015 | Johansson |
| 8,970,629 B2 | 3/2015 | Kim et al. |
| 9,185,062 B1 | 11/2015 | Yang et al. |
| 9,348,458 B2 | 5/2016 | Hotelling et al. |
| 9,465,479 B2 | 10/2016 | Cho et al. |
| 9,491,374 B1 * | 11/2016 | Avrahami .............. G06V 40/20 |
| 9,563,331 B2 | 2/2017 | Poulos et al. |
| 9,681,112 B2 | 6/2017 | Son |
| 9,851,866 B2 | 12/2017 | Goossens et al. |
| 9,886,087 B1 | 2/2018 | Wald et al. |
| 9,933,937 B2 | 4/2018 | Lemay et al. |
| 10,307,671 B2 | 6/2019 | Barney et al. |
| 10,664,048 B2 | 5/2020 | Cieplinski et al. |
| 10,699,488 B1 | 6/2020 | Terrano |
| 10,701,661 B1 | 6/2020 | Coelho et al. |
| 10,732,721 B1 | 8/2020 | Clements |
| 10,768,693 B2 | 9/2020 | Powderly et al. |
| 10,983,663 B2 | 4/2021 | Iglesias |
| 11,720,171 B2 | 8/2023 | Pastrana Vicente et al. |
| 2001/0047250 A1 | 11/2001 | Schuller et al. |
| 2002/0015024 A1 | 2/2002 | Westerman et al. |
| 2002/0044152 A1 | 4/2002 | Abbott et al. |
| 2003/0151611 A1 | 8/2003 | Turpin et al. |
| 2004/0059784 A1 | 3/2004 | Caughey |
| 2004/0243926 A1 | 12/2004 | Trenbeath et al. |
| 2005/0073136 A1 | 4/2005 | Larsson et al. |
| 2005/0100210 A1 | 5/2005 | Rice et al. |
| 2005/0144570 A1 | 6/2005 | Loverin et al. |
| 2005/0144571 A1 | 6/2005 | Loverin et al. |
| 2005/0190059 A1 | 9/2005 | Wehrenberg |
| 2005/0198143 A1 | 9/2005 | Moody et al. |
| 2006/0017692 A1 | 1/2006 | Wehrenberg et al. |
| 2006/0033724 A1 | 2/2006 | Chaudhri et al. |
| 2006/0080702 A1 | 4/2006 | Diez et al. |
| 2006/0197753 A1 | 9/2006 | Hotelling |
| 2006/0283214 A1 | 12/2006 | Donadon et al. |
| 2009/0231356 A1 | 9/2009 | Barnes et al. |
| 2011/0018895 A1 | 1/2011 | Buzyn et al. |
| 2011/0018896 A1 | 1/2011 | Buzyn et al. |
| 2011/0310001 A1 | 12/2011 | Madau et al. |
| 2012/0170840 A1 | 7/2012 | Caruso et al. |
| 2012/0290401 A1 | 11/2012 | Neven |
| 2013/0222410 A1 | 8/2013 | Kameyama et al. |
| 2013/0335301 A1 | 12/2013 | Wong et al. |
| 2013/0342564 A1 | 12/2013 | Kinnebrew et al. |
| 2014/0075361 A1 | 3/2014 | Reynolds et al. |
| 2014/0108942 A1 | 4/2014 | Freeman et al. |
| 2014/0125585 A1 | 5/2014 | Song et al. |
| 2014/0168267 A1 | 6/2014 | Kim et al. |
| 2014/0198017 A1 | 7/2014 | Lamb et al. |
| 2014/0247208 A1 * | 9/2014 | Henderek .............. G06F 3/017 |
| | | 345/156 |
| 2014/0375541 A1 | 12/2014 | Nister et al. |
| 2015/0042679 A1 | 2/2015 | Järvenpää |
| 2015/0169506 A1 | 6/2015 | Leventhal et al. |
| 2015/0242095 A1 | 8/2015 | Sonnenberg |
| 2015/0332091 A1 | 11/2015 | Kim et al. |
| 2015/0370323 A1 | 12/2015 | Cieplinski et al. |
| 2016/0012642 A1 | 1/2016 | Lee et al. |
| 2016/0041391 A1 | 2/2016 | Van et al. |
| 2016/0093108 A1 | 3/2016 | Mao et al. |
| 2016/0171304 A1 | 6/2016 | Golding et al. |
| 2016/0193104 A1 | 7/2016 | Du |
| 2016/0275702 A1 | 9/2016 | Reynolds et al. |
| 2016/0309081 A1 | 10/2016 | Frahm et al. |
| 2017/0038829 A1 | 2/2017 | Lanier et al. |
| 2017/0038837 A1 | 2/2017 | Faaborg et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0148339 A1 | 5/2017 | Van Curen et al. |
| 2017/0236332 A1 | 8/2017 | Kipman et al. |
| 2017/0285737 A1 | 10/2017 | Khalid et al. |
| 2017/0287225 A1 | 10/2017 | Powderly et al. |
| 2018/0024681 A1 | 1/2018 | Bernstein et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095649 A1 | 4/2018 | Valdivia et al. |
| 2018/0101223 A1 | 4/2018 | Ishihara et al. |
| 2018/0181199 A1 | 6/2018 | Harvey et al. |
| 2018/0300023 A1 | 10/2018 | Hein |
| 2018/0315248 A1 | 11/2018 | Bastov et al. |
| 2018/0348861 A1 | 12/2018 | Uscinski et al. |
| 2019/0012060 A1 | 1/2019 | Moore et al. |
| 2019/0018498 A1 | 1/2019 | West et al. |
| 2019/0146128 A1 | 5/2019 | Cao et al. |
| 2019/0279407 A1 | 9/2019 | Mchugh et al. |
| 2019/0333278 A1 | 10/2019 | Palangie et al. |
| 2019/0362557 A1 | 11/2019 | Lacey et al. |
| 2020/0026349 A1 | 1/2020 | Fontanel et al. |
| 2020/0098173 A1 | 3/2020 | Mccall |
| 2020/0126291 A1 | 4/2020 | Nguyen et al. |
| 2020/0159017 A1 | 5/2020 | Lin et al. |
| 2020/0225746 A1 | 7/2020 | Bar-zeev et al. |
| 2020/0225747 A1 | 7/2020 | Bar-zeev et al. |
| 2020/0322178 A1 | 10/2020 | Wang et al. |
| 2020/0322575 A1 | 10/2020 | Valli |
| 2020/0371673 A1 | 11/2020 | Faulkner |
| 2020/0387228 A1 | 12/2020 | Ravasz et al. |
| 2020/0410960 A1 | 12/2020 | Saito et al. |
| 2021/0074062 A1 | 3/2021 | Madonna et al. |
| 2021/0097776 A1 | 4/2021 | Faulkner et al. |
| 2021/0191600 A1 | 6/2021 | Lemay et al. |
| 2021/0286502 A1 | 9/2021 | Lemay et al. |
| 2021/0312684 A1 | 10/2021 | Zimmermann et al. |
| 2021/0327140 A1 | 10/2021 | Rothkopf et al. |

(56) References Cited

U.S. PATENT DOCUMENTS

| | | | |
|---|---|---|---|
| 2021/0365108 | A1 | 11/2021 | Burns et al. |
| 2022/0030197 | A1 | 1/2022 | Ishimoto |
| 2022/0100270 | A1 | 3/2022 | Pastrana Vicente et al. |
| 2022/0121275 | A1 | 4/2022 | Balaji et al. |
| 2022/0155853 | A1* | 5/2022 | Fan .................. G06F 3/0483 |
| 2022/0155909 | A1 | 5/2022 | Kawashima et al. |
| 2022/0253136 | A1 | 8/2022 | Holder et al. |
| 2022/0319453 | A1* | 10/2022 | Llull .................. G09G 3/3426 |
| 2022/0326837 | A1 | 10/2022 | Dessero et al. |
| 2022/0350463 | A1 | 11/2022 | Walkin et al. |
| 2023/0008537 | A1 | 1/2023 | Henderson et al. |
| 2023/0086766 | A1 | 3/2023 | Olwal et al. |
| 2023/0094522 | A1 | 3/2023 | Stauber et al. |
| 2023/0273706 | A1 | 8/2023 | Smith et al. |
| 2023/0274504 | A1 | 8/2023 | Ren et al. |
| 2023/0315270 | A1 | 10/2023 | Hylak et al. |
| 2023/0316658 | A1 | 10/2023 | Smith et al. |
| 2023/0333646 | A1 | 10/2023 | Pastrana Vicente et al. |

FOREIGN PATENT DOCUMENTS

| | | |
|---|---|---|
| CN | 111641843 A | 9/2020 |
| EP | 3249497 A1 | 11/2017 |
| JP | 2006-295236 A | 10/2006 |
| JP | 2012-234550 A | 11/2012 |
| JP | 2013-257716 A | 12/2013 |
| JP | 2014-59840 A | 4/2014 |
| JP | 2014-99184 A | 5/2014 |
| JP | 2015-118332 A | 6/2015 |
| JP | 2016-96513 A | 5/2016 |
| JP | 6438869 B2 | 12/2018 |
| JP | 2019-175449 A | 10/2019 |
| KR | 10-2019-0100957 A | 8/2019 |
| WO | 2013/169849 A2 | 11/2013 |
| WO | 2014/105276 A1 | 7/2014 |
| WO | 2015/130150 A1 | 9/2015 |
| WO | 2015/192117 A1 | 12/2015 |
| WO | 2019/067902 A1 | 4/2019 |
| WO | 2020/247256 A1 | 12/2020 |
| WO | 2021/202783 A1 | 10/2021 |
| WO | 2022/225795 A1 | 10/2022 |

OTHER PUBLICATIONS

Corrected Notice of Allowability received for U.S. Appl. No. 17/659,147, mailed on Feb. 14, 2024, 6 pages.

Corrected Notice of Allowability received for U.S. Appl. No. 17/932,655, mailed on Oct. 12, 2023, 2 pages.

Extended European Search Report received for European Patent Application No. 23158818.7, mailed on Jul. 3, 2023, 12 pages.

Extended European Search Report received for European Patent Application No. 23158929.2, mailed on Jun. 27, 2023, 12 pages.

Final Office Action received for U.S. Appl. No. 17/659,147, mailed on Oct. 4, 2023, 17 pages.

International Search Report for PCT Application No. PCT/US2022/076608, mailed Feb. 24, 2023, 8 pages.

International Search Report received for PCT Application No. PCT/US2022/076719, mailed on Mar. 3, 2023, 8 pages.

International Search Report received for PCT Patent Application No. PCT/US2021/049130, mailed on Dec. 7, 2021, 4 pages.

International Search Report received for PCT Patent Application No. PCT/US2021/071518, mailed on Feb. 25, 2022, 7 pages.

International Search Report received for PCT Patent Application No. PCT/US2021/071596, mailed on Apr. 8, 2022, 7 pages.

International Search Report received for PCT Patent Application No. PCT/US2022/071704, mailed on Aug. 26, 2022, 6 pages.

Non-Final Office Action received for U.S. Appl. No. 17/479,791, mailed on May 11, 2022, 18 pages.

Non-Final Office Action received for U.S. Appl. No. 17/659,147, mailed on Mar. 16, 2023, 19 pages.

Non-Final Office Action received for U.S. Appl. No. 17/932,655, mailed on Apr. 20, 2023, 10 pages.

Notice of Allowance received for U.S. Appl. No. 17/448,876, mailed on Apr. 7, 2022, 9 pages.

Notice of Allowance received for U.S. Appl. No. 17/448,876, mailed on Jul. 20, 2022, 8 pages.

Notice of Allowance received for U.S. Appl. No. 17/479,791, mailed on Mar. 13, 2023, 9 pages.

Notice of Allowance received for U.S. Appl. No. 17/479,791, mailed on Nov. 17, 2022, 9 pages.

Notice of Allowance received for U.S. Appl. No. 17/650,775, mailed on Jan. 25, 2024, 10 pages.

Notice of Allowance received for U.S. Appl. No. 17/650,775, mailed on Sep. 18, 2023, 10 pages.

Notice of Allowance received for U.S. Appl. No. 17/659,147, mailed on Jan. 26, 2024, 13 pages.

Notice of Allowance received for U.S. Appl. No. 17/659,147, mailed on May 29, 2024, 13 pages.

Notice of Allowance received for U.S. Appl. No. 17/932,655, mailed on Jan. 24, 2024, 7 pages.

Notice of Allowance received for U.S. Appl. No. 17/932,655, mailed on Sep. 29, 2023, 7 pages.

Notice of Allowance received for U.S. Appl. No. 18/182,304, mailed on Jan. 24, 2024, 9 pages.

Notice of Allowance received for U.S. Appl. No. 18/182,304, mailed on Oct. 2, 2023, 9 pages.

Simple Modal Window With Background Blur Effect, Available online at: <http://web.archive.org/web/20160313233427/https://www.cssscript.com/simple-modal-window-with-background-blur-effect/ >, Mar. 13, 2016, 5 pages.

Yamada, Yoshihiro, "How to generate a modal window with ModalPopup control", Available online at: <http://web.archive.org/web/20210920015801/https://atmarkit.itmedia.co.jp/fdotnet/dotnettips/580aspajaxmodalpopup/aspajaxmodalpopup.html >, Sep. 20, 2021 [Search Date Aug. 22, 2023] (1 page of English Abstract, 7 pages of Official Copy Submitted). See attached Communication 37 CFR § 1.98(a)(3).

* cited by examiner

DEVICES, METHODS, AND GRAPHICAL USER INTERFACES FOR CONTENT APPLICATIONS

CROSS-REFERENCE TO RELATED APPLICATIONS

This application claims the benefit of U.S. Provisional Application No. 63/261,567, filed Sep. 23, 2021, the content of which is incorporated herein by reference in its entirety for all purposes.

TECHNICAL FIELD

This relates generally to computer systems with a display generation component and one or more input devices that present graphical user interfaces, including but not limited to electronic devices that present graphical user interfaces, via the display generation component, including user interfaces for presenting and browsing content.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

SUMMARY

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for navigating user interfaces. Such methods and interfaces may complement or replace conventional methods for interacting with a graphical user interface. Such methods and interfaces reduce the number, extent, and/or the nature of the inputs from a user and produce a more efficient human-machine interface.

In some embodiments, an electronic device displays a user interface of a content application in a three-dimensional environment with or without virtual lighting effects applied to the three-dimensional environment depending on whether the user interface is in a mode that does not include virtual lighting or a mode that includes virtual lighting. In some embodiments, an electronic device updates display of interactive user interface elements in response to detecting a respective pose of a respective portion of a user of the electronic device.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
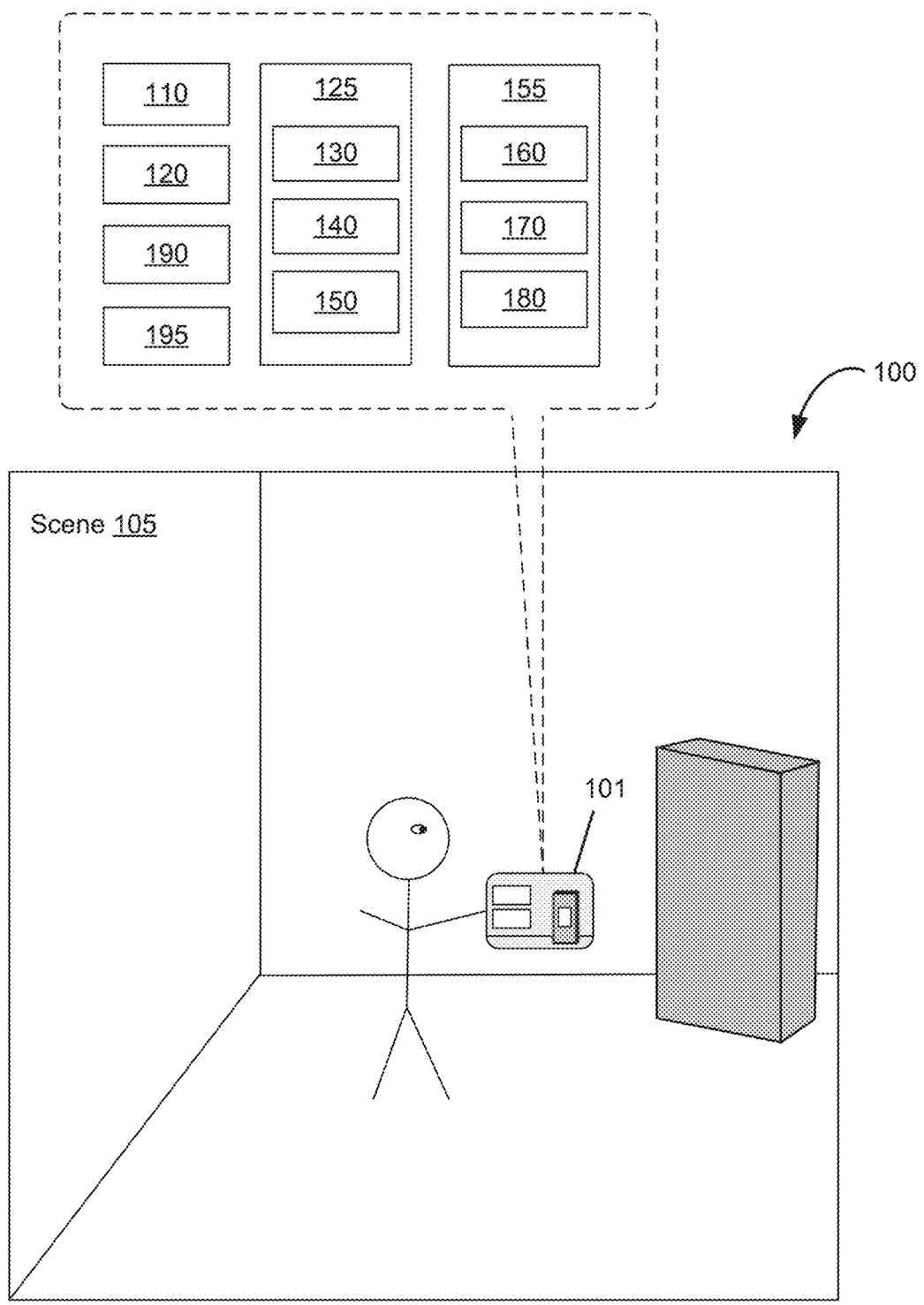
FIG. 1 is a block diagram illustrating an operating environment of a computer system for providing XR experiences in accordance with some embodiments.

The present disclosure relates to user interfaces for providing a computer generated reality (CGR) experience to a user, in accordance with some embodiments.

The systems, methods, and GUIs described herein provide improved ways for an electronic device to present content corresponding to physical locations indicated in a navigation user interface element.

In some embodiments, a computer system displays, in a three-dimensional environment, a content application. In some embodiments, while displaying the content application in a mode that does not include virtual lighting, the electronic device displays portions of the three-dimensional environment other than the portion of the three-dimensional environment including the user interface of the content application without a virtual lighting effect. In some embodiments, while displaying the content application in a mode that includes virtual lighting, the electronic device displays portions of the three-dimensional environment other than the portion of the three-dimensional environment including the user interface of the content application with the virtual lighting effect. In some embodiments, the virtual lighting effect is based on the content item playing via the content application (e.g., including colors included in an image associated with the content item and/or including animation to the beat of audio included in the content item). Presenting the content application user interface with or without virtual lighting provides an efficient way of transitioning between an immersive experience and an experience that facilitates engagement with objects and user interfaces other than the content application user interface, which additional reduces power usage and improves battery life of the electronic device by enabling the user to use the electronic device more quickly and efficiently.

In some embodiments, a computer system displays an application user interface that includes a plurality of interactive user interface elements in a three-dimensional environment. In some embodiments, while a respective portion of a user of the electronic device (e.g., the user's hand) is not in a predetermined pose (e.g., location, orientation and/or hand shape), the electronic device displays the interactive elements in a first manner. In some embodiments, while a respective portion of a user of the electronic device (e.g., the user's hand) is in a predetermined pose (e.g., location, orientation and/or hand shape), the electronic device displays the interactive elements in a second manner, different from the first manner, such as at an updated location in the three-dimensional environment. For example, in response to detecting the respective portion of the user in the predefined pose, the electronic device moves the interactive user interface elements closer to the viewpoint of the user in the three-dimensional environment. Updating the interactive user interface elements in this way provides an efficient way of facilitating interaction with the user interface elements by indicating which elements are interactive and updating the positions of the interactive elements to positions that facilitate ergonomic user interaction with the interactive elements, which additionally reduces power usage and improves battery life of the electronic device by enabling the user to use the electronic device more quickly and efficiently and reduces errors in usage which would have to be corrected with further user inputs.

FIGS. 1-6 provide a description of example computer systems for providing XR experiences to users (such as described below with respect to methods 800 and 1000). FIGS. 7A-7H illustrate examples of how an electronic device generates virtual lighting effects while presenting a content item in accordance with some embodiments. FIGS. 8A-8G is a flowchart illustrating a method of displaying a user interface of a content application in a three-dimensional environment with or without virtual lighting effects applied to the three-dimensional environment depending on whether the user interface is in a mode that does not include virtual lighting or a mode that includes virtual lighting in accordance with some embodiments. The user interfaces in FIGS. 7A-7H are used to illustrate the processes in FIGS. 8A-8G. FIGS. 9A-9F illustrate examples of how an electronic device updates display of interactive user interface elements in response to detecting a respective pose of a respective portion of a user of the electronic device in accordance with some embodiments. FIGS. 10A-10O is a flowchart illustrating a method of updating display of interactive user interface elements in response to detecting a respective pose of a respective portion of a user of an electronic device in accordance with some embodiments. The user interfaces in FIGS. 9A-9F are used to illustrated the processes in FIGS. 10A-10O.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
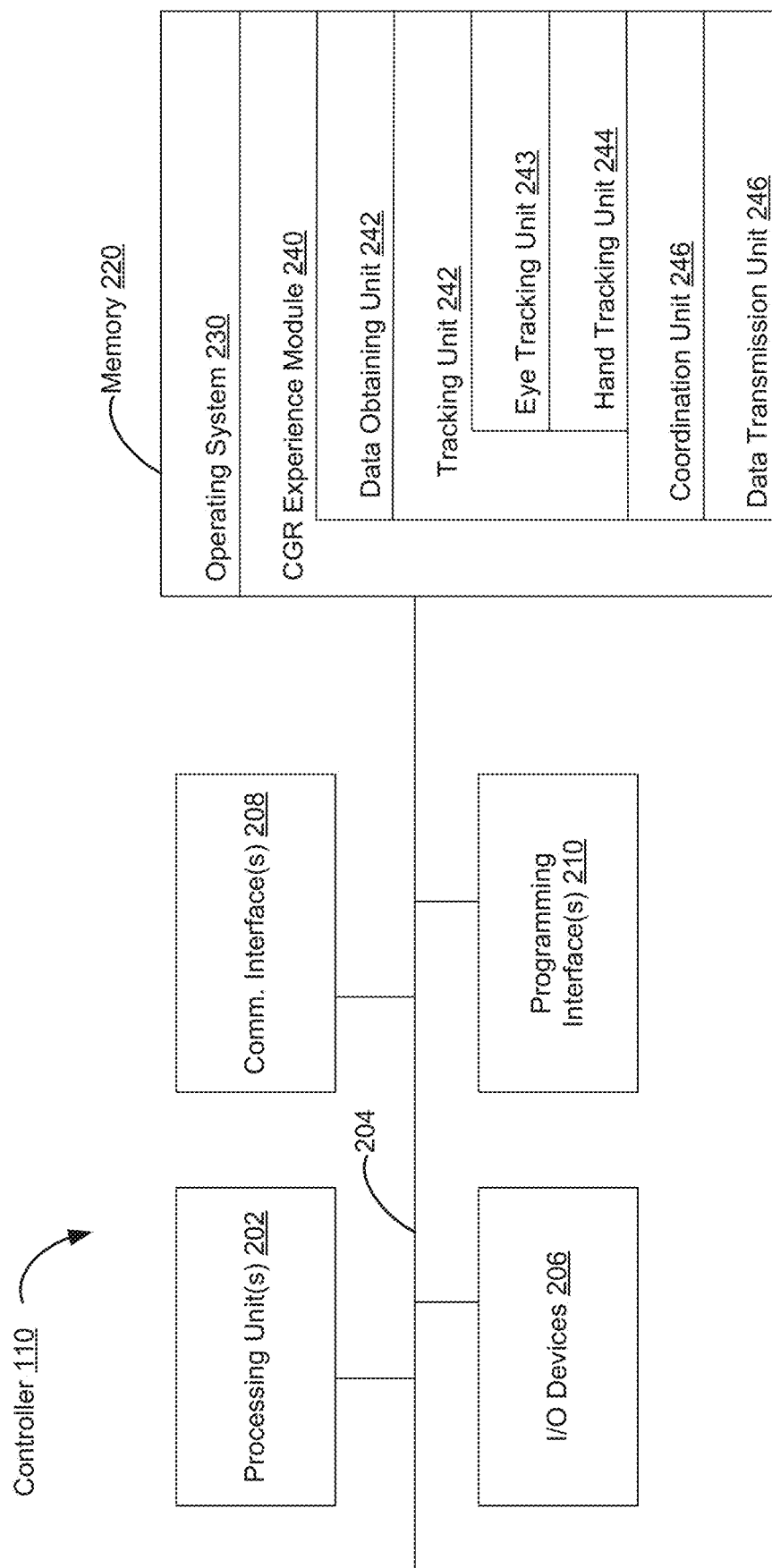
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
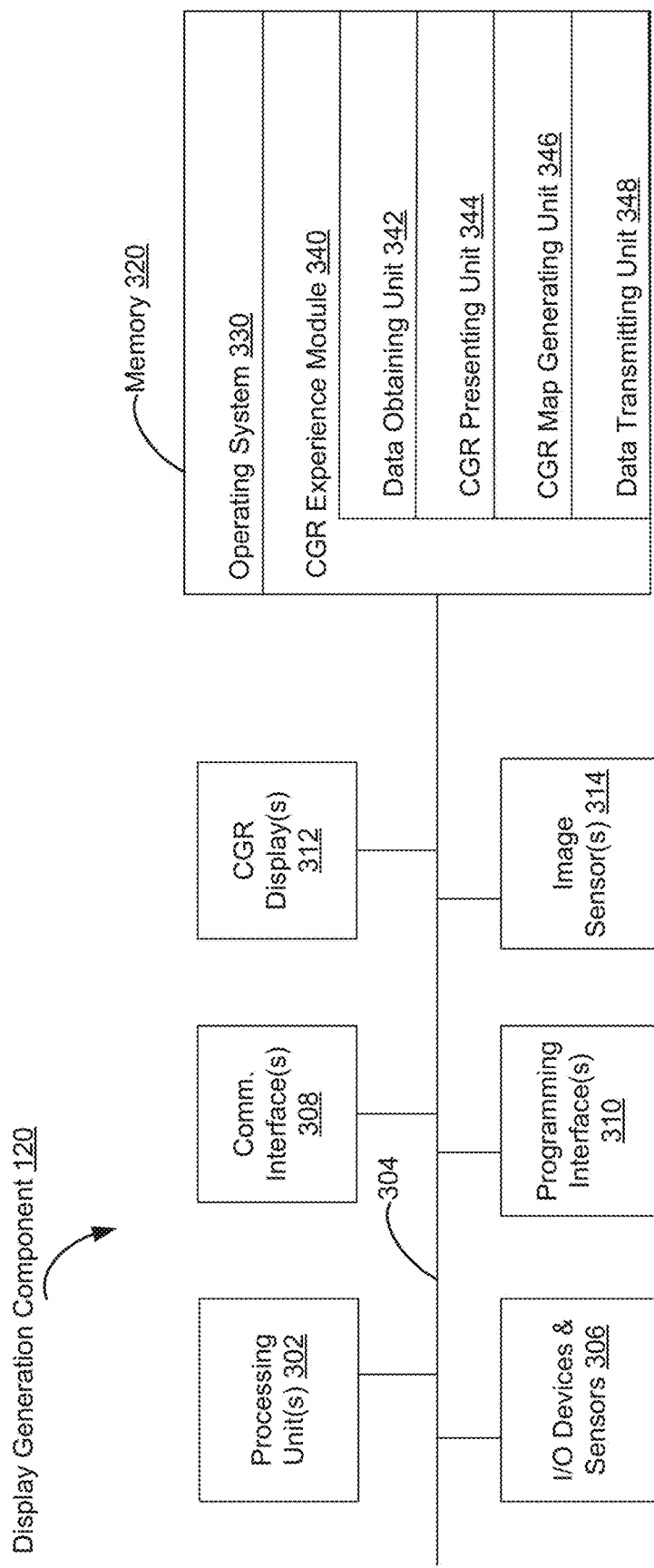
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
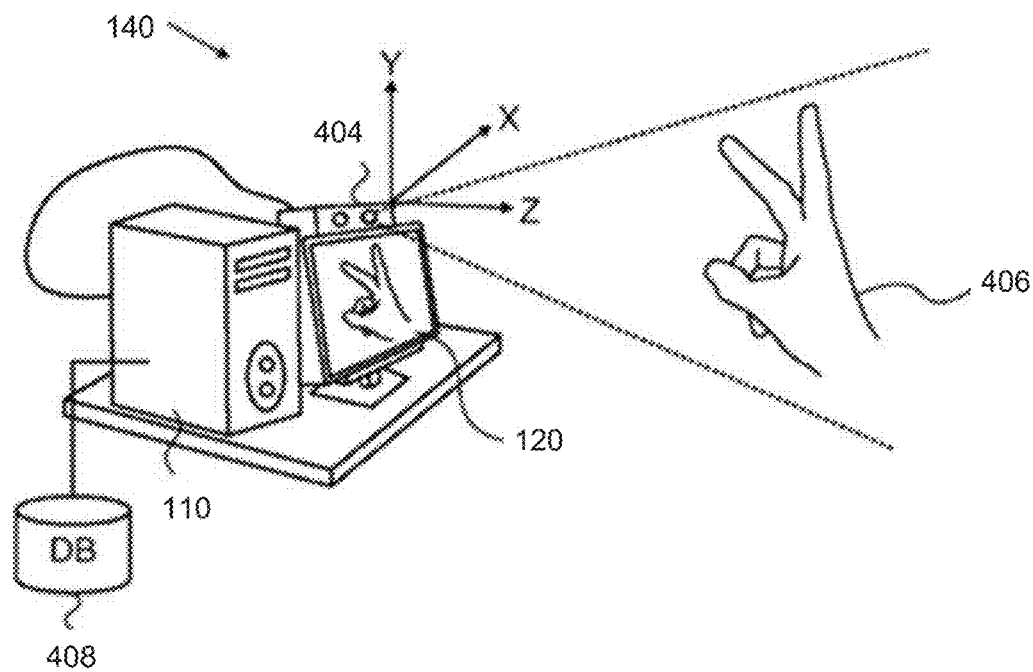
FIG. 4 is a block diagram illustrating a hand tracking unit of a computer system that is configured to capture gesture inputs of the user in accordance with some embodiments.
Figure 4:
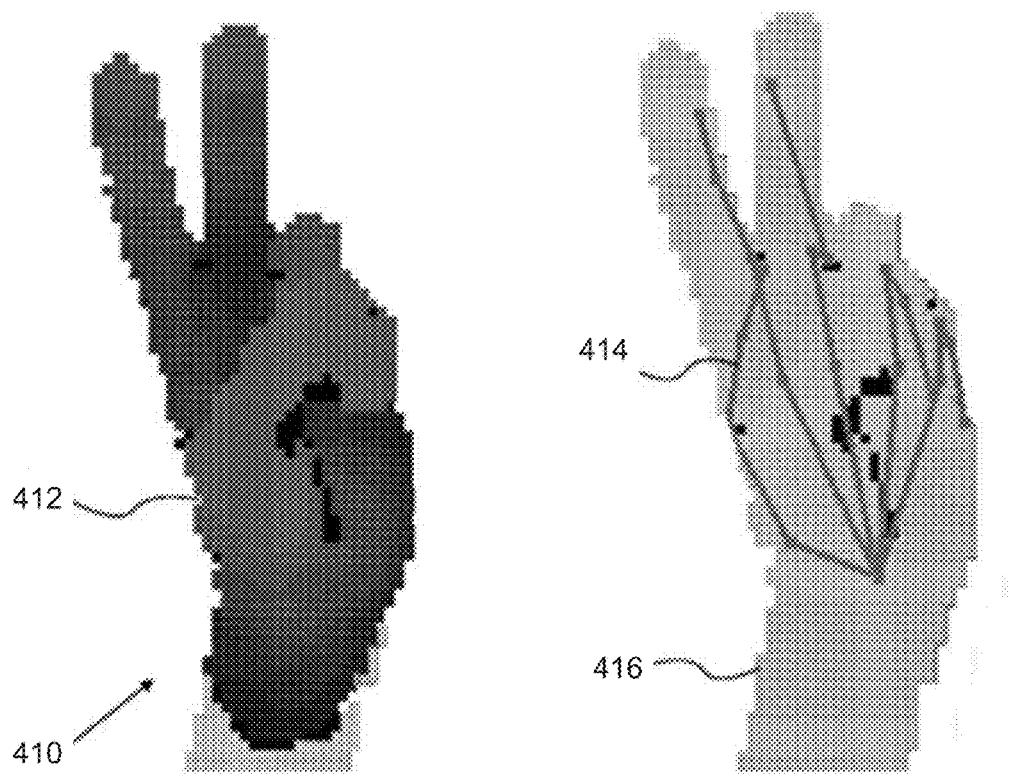

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a pre-defined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments.

In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
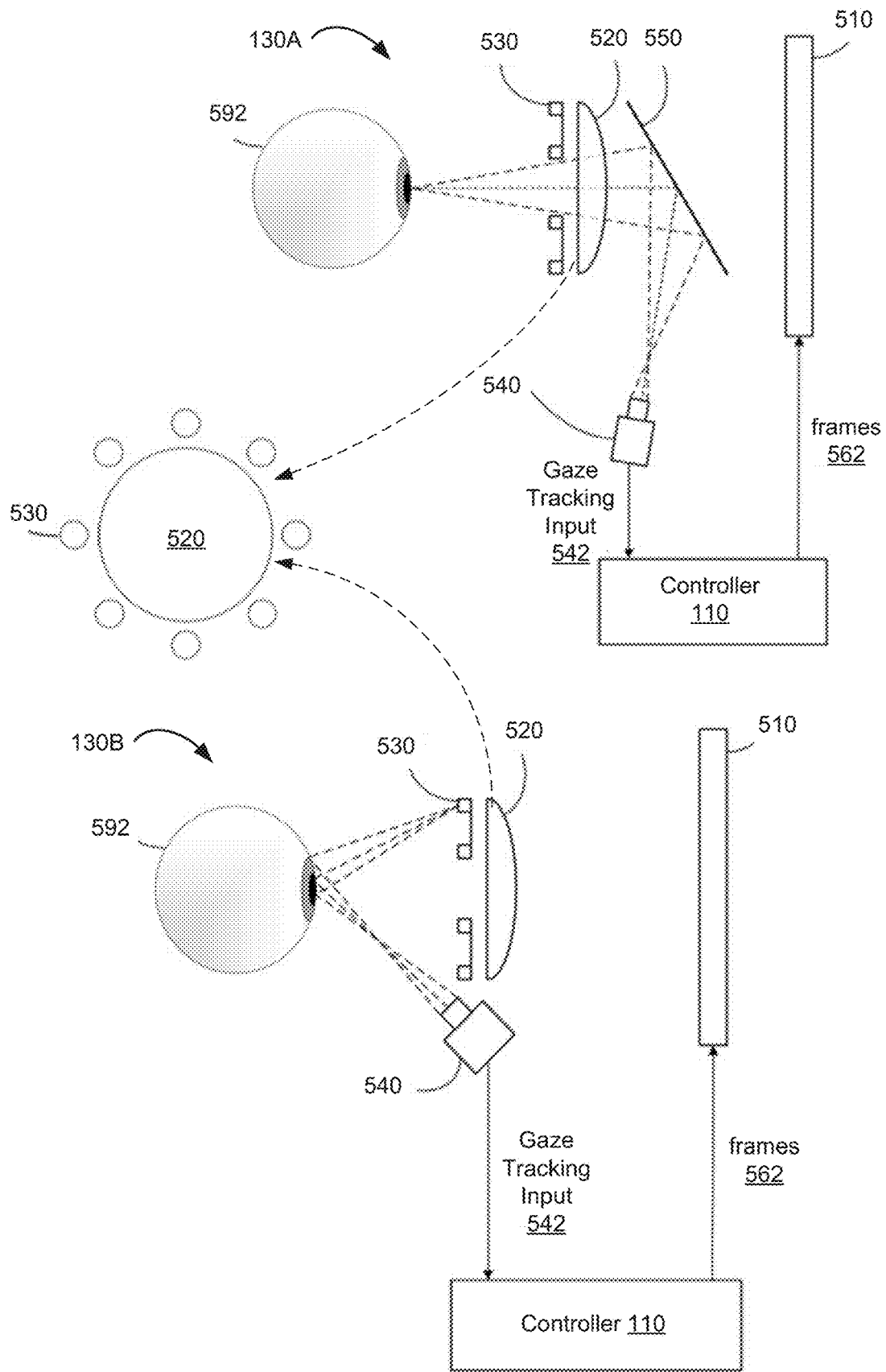
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
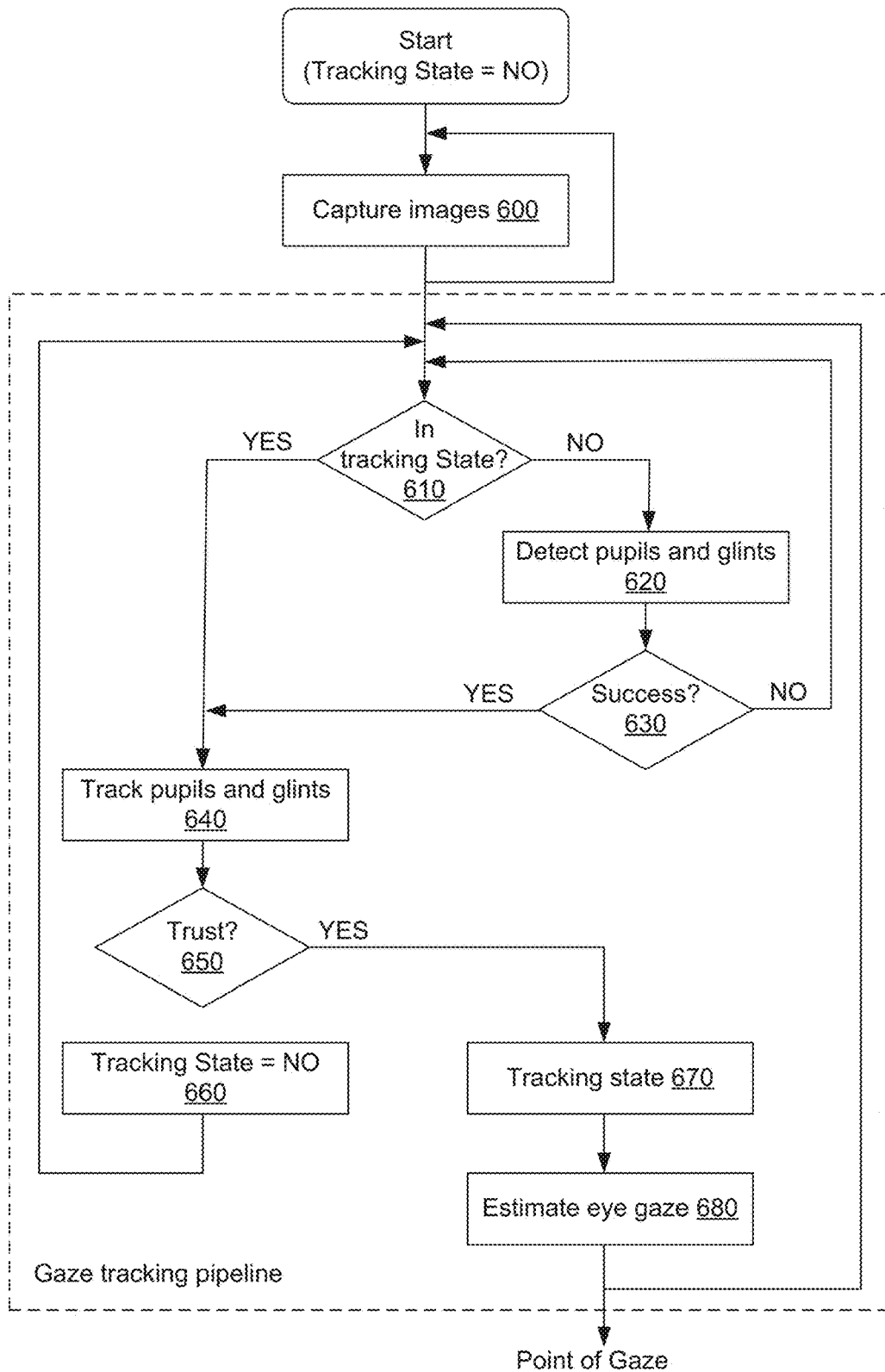
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Figure 6B:
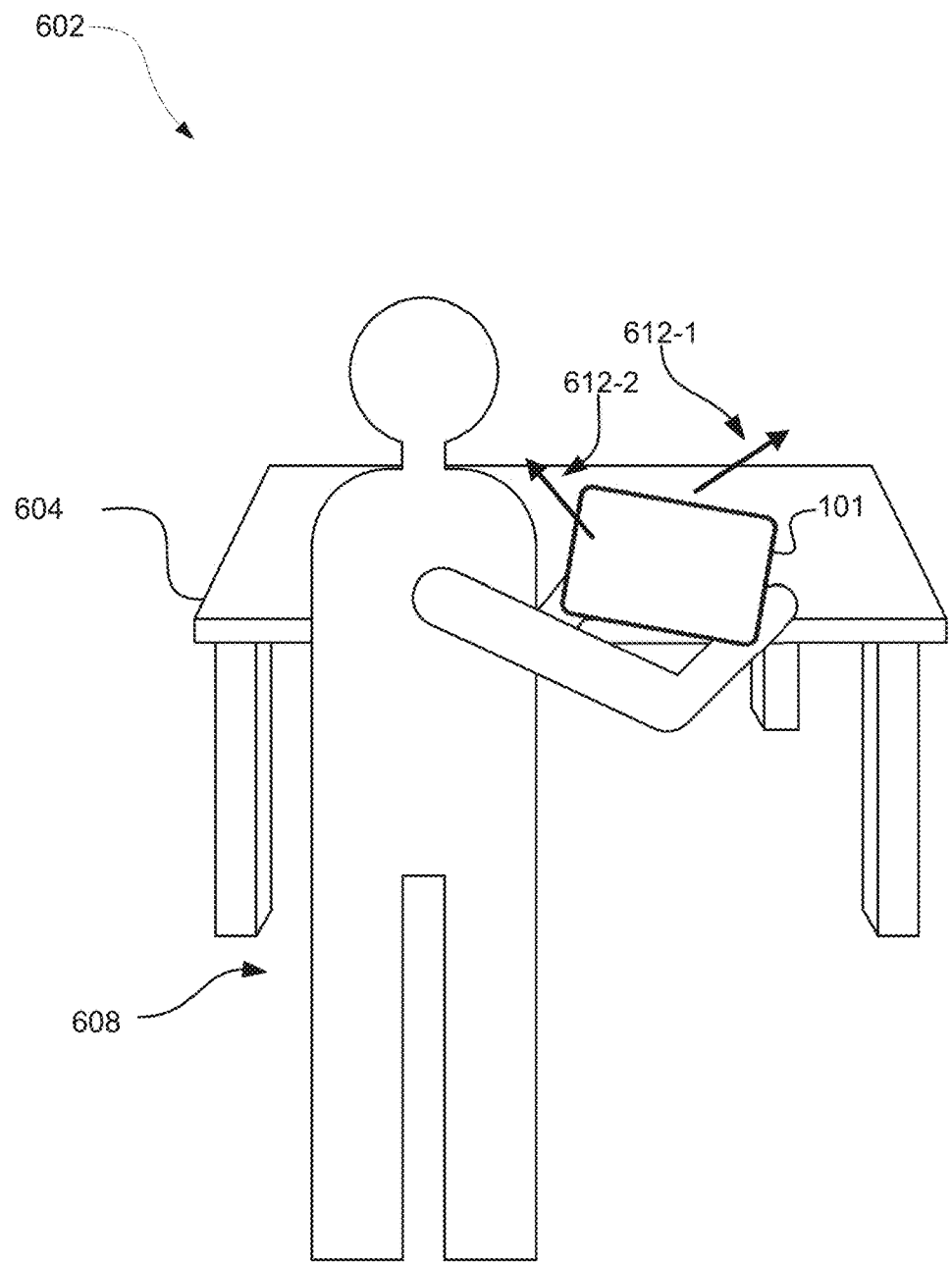
FIG. 6B illustrates an exemplary environment of an electronic device providing a XR experience in accordance with some embodiments.

FIG. 6B illustrates an exemplary environment of an electronic device 101 providing a XR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one or more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7H illustrate examples of how an electronic device generates virtual lighting effects while presenting a content item in accordance with some embodiments.

Figure 7A:
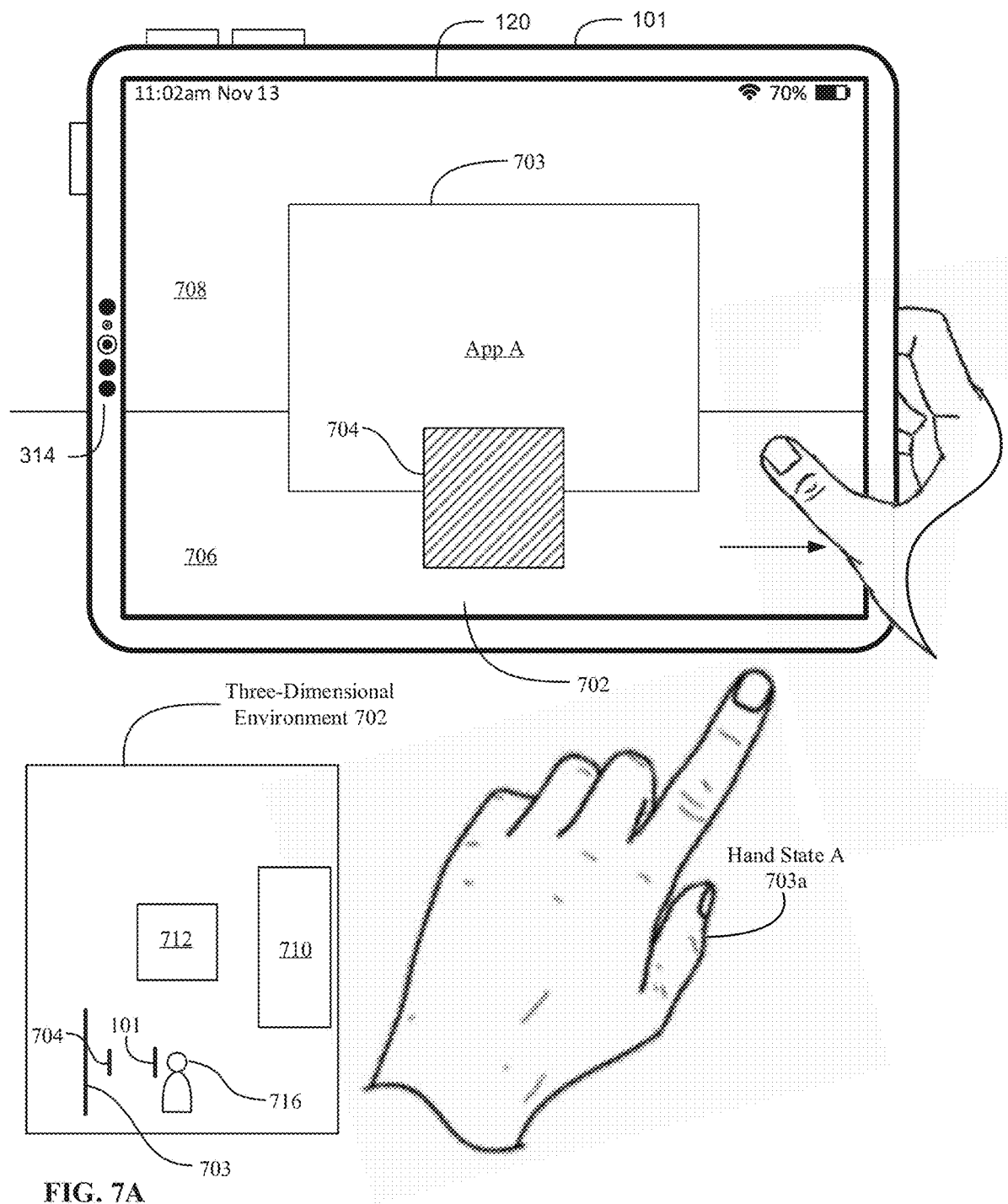
FIGS. 7A-7H illustrate examples of how an electronic device generates virtual lighting effects while presenting a content item in accordance with some embodiments.

FIG. 7A illustrates an electronic device 101 displaying, via a display generation component 120, a three-dimensional environment 702. It should be understood that, in some embodiments, electronic device 101 utilizes one or more techniques described with reference to FIGS. 7A-7H in a two-dimensional environment without departing from the scope of the disclosure. As described above with reference to FIGS. 1-6, the electronic device 101 optionally includes a display generation component 120 (e.g., a touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

In some embodiments, the electronic device 101 displays user interfaces of a content (e.g., streaming, delivery, playback, browsing, library, sharing, etc.) application in the three-dimensional environment 702. In some embodiments, the content application includes a mini-player user interface and an expanded user interface. In some embodiments, the mini player user interface includes playback control elements that, in response to user inputs directed to the playback control elements, cause the electronic device 101 to modify playback of a content item playing via the content application, and artwork (e.g., album artwork) associated with the content item currently playing via the content application. In some embodiments, the expanded user interface includes a greater number of user interface elements (e.g., containers such as windows, platters, or backplanes; selectable options, content, etc.) than the mini player user interface. In some embodiments, the expanded user interface includes a navigation element, a content browsing element, and a playback element. In some embodiments, the mini player user interface includes virtual lighting effects presented in regions of the three-dimensional environment outside of the content application user interface not included in the expanded user interface element. The mini player user interface and expanded user interface are described in more detail below with reference to FIGS. 7A-7H and further in reference to method 1000 below.

In FIG. 7A, the electronic device 101 presents a three-dimensional environment 702 including virtual objects and representations of real objects. For example, the virtual objects include a user interface 703 for a first application other than the content application and a mini player user interface 704 of the content application. In some embodiments, the mini player user interface 704 includes an image (e.g., album artwork) associated with a content item that is currently playing via the content application.

In some embodiments, the mini player user interface 704 does not include one or more selectable options for controlling playback of the content item while the electronic device 101 does not detect a ready state directed to the mini player user interface 704. For example, FIG. 7A includes an illustration of the hand 703a of the user in Hand State A, which corresponds to hand shape, pose, location, etc. that does not correspond to a ready state or an input, such as the hand of the user near the user's lap or torso or in a hand shape that does not correspond to a ready state, which will be described below. In some embodiments, the electronic device 101 is able to detect an indirect ready state, a direct ready state, an air gesture ready state, and/or an input device ready state. In some embodiments, detecting the indirect ready state includes detecting (e.g., via one or more of input devices 314) the hand 703a of the user in a ready state pose, such as a pre-pinch gesture in which the thumb is within a threshold distance (e.g., 0.5, 1, 2, 3, 4, or 5 centimeters) of, but not touching, another finger of the hand or a pointing hand shape in which one or more fingers are extended and one or more fingers are curled towards the palm while the hand 703a is within a predefined threshold distance (e.g., 1, 2, 3, 5, 10, 15, or 30 centimeters) of the mini player user interface 704. In some embodiments, detecting the indirect ready state includes detecting (e.g., via one or more of input devices 314) the hand 703a of the user in a ready state pose, such as the pre-pinch hand shape, while detecting (e.g., via one or more of input devices 314) the gaze of the user directed to the mini player user interface 704. In some embodiments, detecting an air gesture ready state includes detecting (e.g., via one or more of input devices 314) the hand 703a in the ready state pose, such as the pointing hand shape within a threshold distance (e.g., 1, 2, 3, 5, 10, 15, or 30 centimeters) of an input element displayed via display generation component 120 while detecting (e.g., via one or more of input devices 314) the gaze of the user directed to the mini player user interface 704. In some embodiments, detecting the input device ready state includes detecting a predefined portion of the user (e.g., a hand 703a of the user) proximate to, but not providing input to, a mechanical input device in communication with the electronic device 101 (e.g., a stylus, trackpad, mouse, keyboard, etc.), optionally while a cursor controlled by the input device corresponds to the location of the mini player user interface 704 or optionally while detecting (e.g., via one or more of input devices 314) the gaze of the user directed to the mini player user interface 704. As will be described in more detail below with reference to FIG. 7C, in response to detecting the ready state or detecting the user providing input directed to the mini player user interface, the electronic device 101 displays a plurality of selectable options, that, when selected, cause the electronic device 101 to modify playback of the content item via the content application.

Referring again to FIG. 7A, in some embodiments, the user interface 703 is associated with an application other than the content application or with an operating system of electronic device 101. As another example, the representations of real objects include a representation 706 of the floor in the physical environment of the electronic device 101 and a representation 708 of a wall in the physical environment of the electronic device 101. In some embodiments, the representations of real objects are displayed via the display generation component 120 (e.g., virtual or video passthrough) or are views of the real objects through a transparent portion of the display generation component 120 (e.g., real passthrough). In some embodiments, the physical environment of the electronic device 101 further includes a table 712 and a sofa 710. In FIG. 7A, representations of the table 712 and sofa 710 are not displayed by device 101 because these objects are currently outside of the field of view of the three-dimensional environment 702 presented by the electronic device 101.

In some embodiments, the mini player user interface 704 of the content application is displayed at a location in the three-dimensional environment 702 in the field of view of the electronic device 101. In some embodiments, in response to detecting movement of the viewpoint of the user in the three-dimensional environment 702, which causes the electronic device 101 to update the field of view, the electronic device 101 updates the position of the mini player user interface 704 to remain in the field of view of the electronic device 101. In some embodiments, the electronic device 101 updates the location of the mini player user interface 704 automatically, without a further input requesting that the electronic device 101 update the position of the mini player user interface 704 (e.g., other than the movement of the viewpoint of the user itself). In some embodiments, the electronic device 101 updates the viewpoint of the user and the position of the mini player user interface 704 in the three-dimensional environment 702 in response to detecting movement of the electronic device 101 (e.g., and/or display generation component 120), such as moving or rotating the device 101 to the right as shown in FIG. 7A. In some embodiments, the electronic device 101 updates the viewpoint of the user and the position of the mini player user interface 704 in the three-dimensional environment 702 in response to detecting movement of a respective portion of the user (e.g., the user's head, the user's torso, etc.) relative to the electronic device 101 (e.g., and/or display generation component 120) and/or relative to the physical environment of the electronic device 101 (e.g., and/or display generation component). For example, in response to movement of the electronic device 101 as shown in FIG. 7A or movement of a portion of the user, the electronic device 101 updates the three-dimensional environment 702 as shown in FIG. 7B.

Figure 7B:
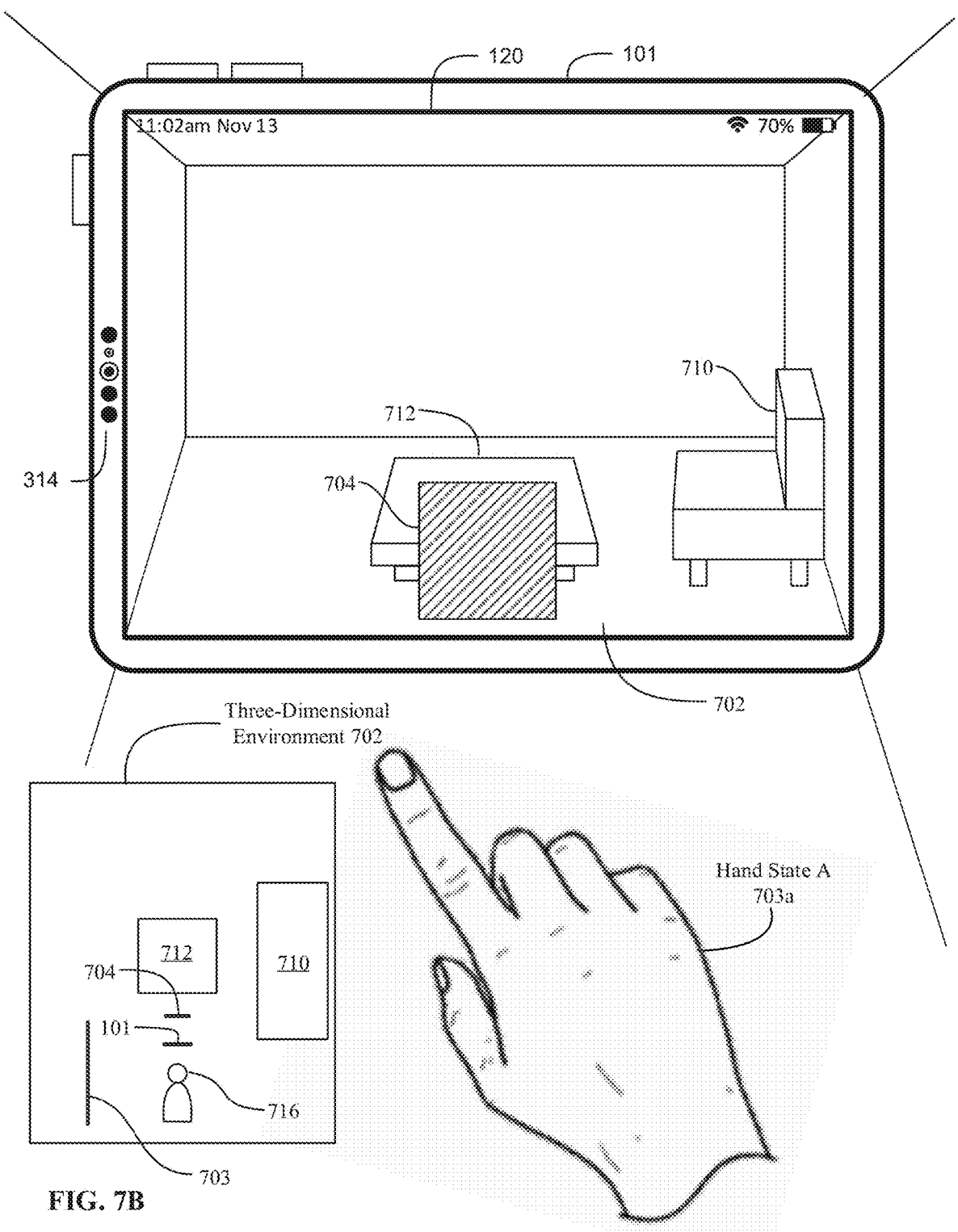

FIG. 7B illustrates an example of how the electronic device 101 updates the three-dimensional environment 702 in response to detecting movement of the electronic device 101 that causes the electronic device 101 to update the viewpoint of the user in the three-dimensional environment 702 and field of view of the electronic device 101. In some embodiments, the electronic device 101 updates the location of the mini player user interface 704 in three-dimensional environment 702 so that the electronic device 101 continues to display the mini player user interface 704 although the previous location of the mini player user interface 704 is no longer in the field of view of the electronic device 101. In some embodiments, updating the field of view of the electronic device 101 and viewpoint of the user also causes the electronic device 101 to display representations of the table 712 and sofa 710 in the physical environment of the electronic device 101 because these objects are now in the field of view of the electronic device 101. In some embodiments, updating the field of view of the electronic device 101 and the viewpoint of the user also causes the electronic device 101 to cease displaying user interface 703 because the electronic device 101 does not update the position of the user interface 703 in response to movement of the electronic device 101 without receiving an input requesting the electronic device 101 update the position of the user interface 703 in the three-dimensional environment 702. As shown in FIG. 7B, the electronic device 101 continues to detect the hand 703a of the user in Hand State A, corresponding to not detecting the ready state or an input, so the mini player user interface 704 continues to include the image associated with the content item without including the one or more user interface elements, that, in response to an input directed to one of the user interface elements, cause the electronic device 101 to modify playback of the content item that is currently playing via the content application.

Figure 7C:
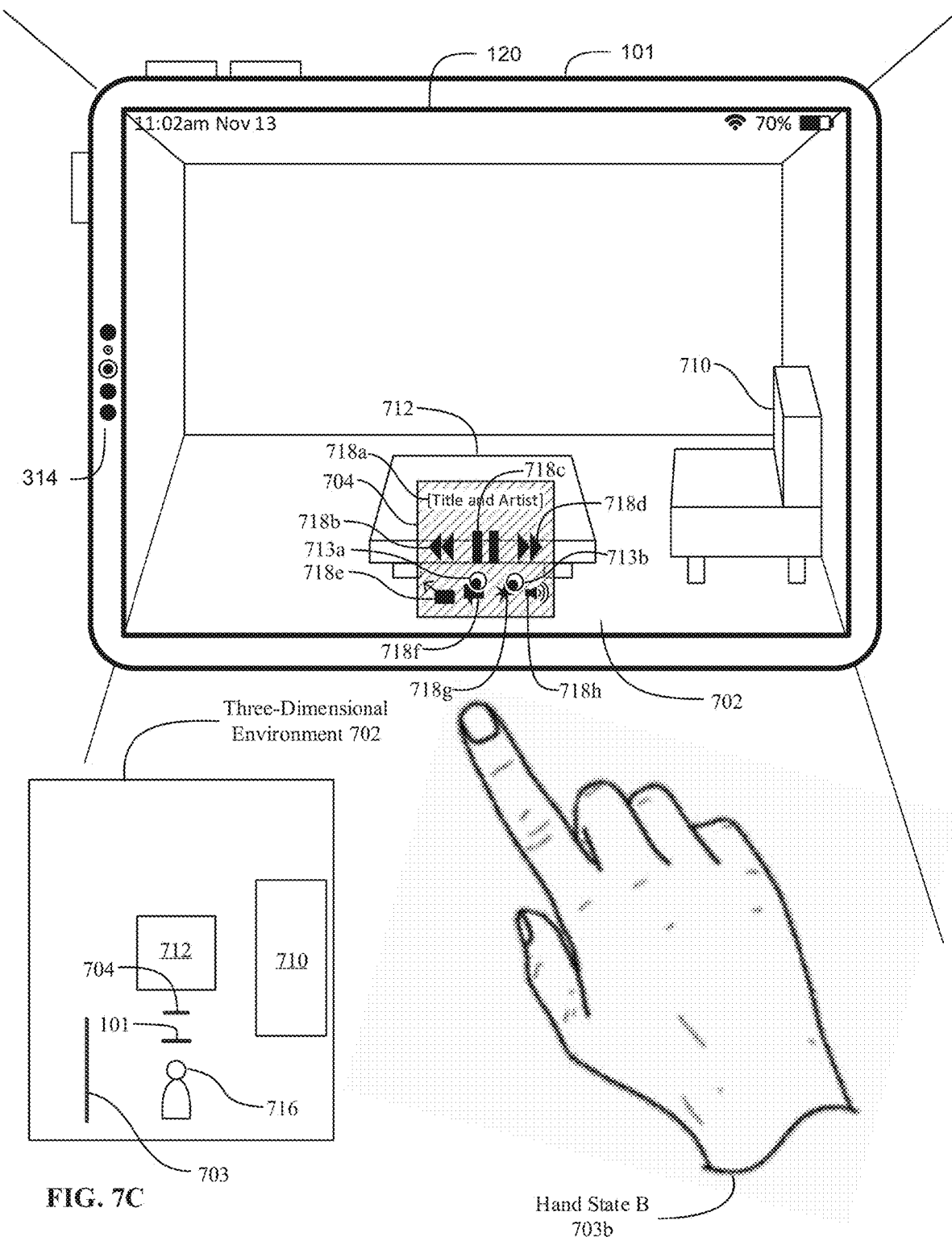

FIG. 7C illustrates an example of how the electronic device 101 updates the mini player user interface 704 in response to detecting the user provide an input directed to the mini player user interface 704. In some embodiments, the electronic device 101 updates the mini player user interface 704 in response to detecting the ready state of the user described above. Updating the mini player user interface 704 optionally includes blurring and/or fading the image associated with the content item currently playing via the content application, increasing the translucency of the mini player user interface 704 so that the representation 712 of the table is partially visible through the mini player user interface 704, and displaying an indication 718a of the title and artist of the content item and a plurality of user interface elements 718b-718h for modifying playback of the content item overlaid on the image.

Figure 7D:
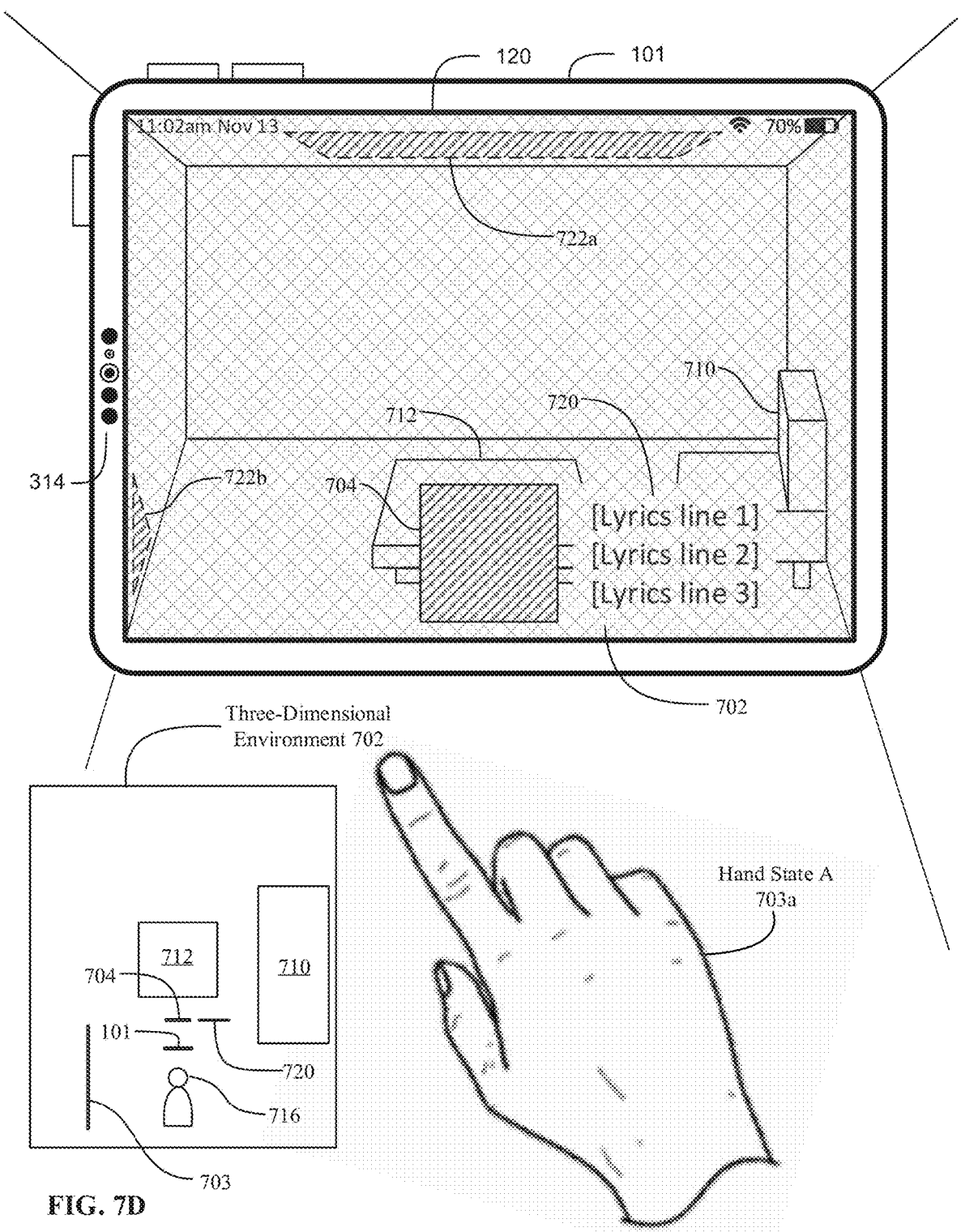

In some embodiments, in response to detecting an input directed to one of the user interface elements 718b-718h, the electronic device 101 modifies playback of the content item currently playing via the content application. In some embodiments, in response to detecting selection of user interface element 718b, the electronic device 101 skips back in a content item playback queue to restart the content item that is currently playing or play a previous item in the content item playback queue. In some embodiments, in response to detecting selection of user interface element 718c, the electronic device 101 pauses the content item and updates the user interface element 718c to be a user interface element that, when selected, causes the electronic device 101 to resume playback of the content item. In some embodiments, in response to detecting selection of user interface element 718d, the electronic device 101 ceases playback of the currently-playing content item and initiates playback of the next content item in the content item playback queue. In some embodiments, in response to detecting selection of user interface element 718e, the electronic device 101 ceases display of the mini player user interface 704 and displays the expanded user interface described in more detail with reference to FIGS. 7F-7H and below with reference to method 1000. In some embodiments, in response to detecting selection of user interface element 718f, the electronic device 101 displays time-synced lyrics of the content item that is currently playing, as illustrated in FIG. 7D. In some embodiments, in response to detecting selection of user interface element 718g, the electronic device 101 presents virtual lighting effects associated with the content item currently playing on the electronic device 101, as described in more detail with reference to FIGS. 7D-7E. In some embodiments, in response to detecting selection of user interface element 718h, the electronic device 101 presents another user interface element for adjusting the playback volume of audio content of the content item and/or presents a menu of audio output options for modifying playback of the audio content.

In some embodiments, the electronic device 101 detects selection of one of the user interface elements 718b-h by detecting an indirect selection input, a direct selection input, an air gesture selection input, or an input device selection input. In some embodiments, detecting a selection input includes first detecting a ready state corresponding to the type of selection input being detected (e.g., detecting an indirect ready state before detecting an indirect selection input, detecting a direct ready state before detecting a direct selection input). In some embodiments, detecting an indirect selection input includes detecting, via input devices 314, the gaze of the user directed to a respective user interface element while detecting the hand of the user make a selection gesture, such as a pinch hand gesture in which the user touches their thumb to another finger of the hand. In some embodiments, detecting a direct selection input includes detecting, via input devices 314, the hand of the user make a selection gesture, such as the pinch gesture within a predefined threshold distance (e.g., 1, 2, 3, 5, 10, 15, or 30 centimeters) of the location of the respective user interface element or a pressing gesture in which the hand of the user "presses" into the location of the respective user interface element while in a pointing hand shape. In some embodiments, detecting an air gesture input includes detecting the gaze of the user directed to a respective user interface element while detecting a pressing gesture into the location of an air gesture user interface element displayed in the three-dimensional environment 702 via display generation component 120. In some embodiments, detecting an input device selection includes detecting manipulation of a mechanical input device (e.g., a stylus, mouse, keyboard, trackpad, etc.) in a predefined manner corresponding to selection of a user interface element while a cursor controlled by the input device is associated with the location of the respective user interface element and/or while the gaze of the user is directed to the respective user interface element.

As shown in FIG. 7C, the electronic device 101 detects selection of the selectable option 718f that, when selected, causes the electronic device 101 to present time-synced lyrics associated with the content item and/or selection of the selectable option 718g that, when selected, causes the electronic device 101 to display a virtual lighting effect associated with the content item. For example, the electronic device 101 detects indirect selection of option 718f including detecting the gaze 713a of the user directed to the option 718f while detecting the hand 703b of the user make the selection gesture (e.g., Hand State B) and/or indirect selection of option 718g including detecting the gaze 713b of the user directed to the option 718g while detecting the hand 703b of the user make the selection gesture (e.g., Hand State B). It should be understood that, although FIG. 7C illustrates selection of both options 718f and 718g, in some embodiments, the inputs are detected at different times, rather than concurrently. Moreover, although FIG. 7C illustrates the electronic device 101 updating the mini player user interface 704 while detecting selection of options 718f and 718g, in some embodiments, the electronic device 101 updates the mini player user interface 704 in response to detecting the ready state (e.g., and is already displaying the selectable options 718b-h before the selection inputs are detected, rather than displaying the selectable options 718b-h in response to the selection inputs).

In some embodiments, in response to detecting selection of the lyrics option 718f as shown in FIG. 7C, the electronic device 101 updates the three-dimensional environment 702 to include time-synced lyrics associated with the content item, as shown in FIG. 7D. In some embodiments, in response to detecting selection of the virtual lighting option 718g as shown in FIG. 718g, the electronic device 101 updates the three-dimensional environment 702 to include one or more virtual lighting effects associated with the content item currently playing via the content application.

FIG. 7D illustrates an example of the electronic device 101 updating the three-dimensional environment 702 in response to the user inputs described above with reference to FIG. 7C. In response to the input illustrated in FIG. 7C selecting the lyrics option 718f, the electronic device 101 displays time-synced lyrics 720 associated with the content item in the three-dimensional environment 702. In response to the input illustrated in FIG. 7C selecting the virtual lighting option 718g, the electronic device 101 updates the three-dimensional environment 702 to include virtual lighting effects associated with the content item. In some embodiments, the electronic device 101 detects the input to display the virtual lighting effect without receiving an input to display the lyrics and, in response, displays the virtual lighting effect without displaying the lyrics 720. In some embodiments, the electronic device 101 detects the input to display the lyrics without receiving an input to display the virtual lighting effect and, in response, displays the lyrics 720 without displaying the virtual lighting effects.

In some embodiments, the time-synced lyrics 720 are lyrics associated with the content item currently playing via the content application of the electronic device 101. The electronic device 101 optionally presents a portion of the lyrics 720 corresponding to the portion of the content item currently playing on the electronic device 101 via the content application and updates the portion of lyrics 720 in accordance with continued playback of the content item. In some embodiments, the lyrics 720 include a line of lyrics corresponding to the portion of the content item that is currently playing, one or more lines of lyrics corresponding to a portion of the content item prior to the portion of the content item that is currently playing, and/or one or more lines of lyrics corresponding to a portion of the content item that will play after the portion of the content item that is currently playing. As shown in FIG. 7D, the lyrics 720 are displayed outside of a boundary of the mini player user interface element 704 in the three-dimensional environment 702. In some embodiments, the lyrics 720 are displayed proximate to (e.g., within 1, 2, 3, 5, 10, 15, 20, 30, or 50 centimeters or 1, 2, 3, or 5 meters of) the mini player user interface 704. In some embodiments, the lyrics 720 are displayed to the left or right of the mini player user interface 704. In some embodiments, the lyrics 720 are displayed at the same z-depth (e.g., distance) from the viewpoint of the user as the mini player user interface 704.

In some embodiments, in FIG. 7D, the electronic device 101 displays the three-dimensional environment 702 with one or more virtual lighting effects associated with the content item in response to detecting selection of the virtual lighting effects option 718g illustrated in FIG. 7C. In some embodiments, the electronic device 101 did not display the three-dimensional environment 702 with the virtual lighting effects prior to detecting the input selecting the lighting effects option 718*g*. For example, in FIG. 7C, the electronic device 101 displays the three-dimensional environment 702 without the lighting effects.

In some embodiments, the virtual lighting effects include changing a color of simulated three-dimensional material included in the mini player user interface 704. For example, the mini player user interface 704 includes and/or is composed of virtual glass (e.g., around or next to the image corresponding to the content item currently playing via the content application). In some embodiments, while the electronic device 101 is displaying the three-dimensional environment 702 without the virtual lighting effects, such as in FIG. 7C, the virtual glass is at least partially translucent and includes colors corresponding to regions of the three-dimensional environment 702 proximate to and/or behind portions of the mini player user interface 704. In some embodiments, while displaying the three-dimensional environment 702 with the virtual lighting effects, such as in FIG. 7D, the virtual glass includes colors corresponding to the image associated with the content item that is currently playing via the content application. In some embodiments, displaying the virtual glass with the virtual lighting effect includes displaying the virtual glass with both the colors corresponding to the image associated with the content item currently playing via the content application and colors corresponding to regions of the three-dimensional environment 702 proximate to and/or behind portions of the mini player user interface 704. For example, the virtual glass appears as though portions of the three-dimensional environment 702 and/or lighting effects 722*a* and 722*b* are visible through the virtual glass and/or reflecting off of the virtual glass.

In some embodiments, the virtual lighting effects 722*a* and/or 722*b* include a virtual light spill displayed on surfaces in the three-dimensional environment 702. In some embodiments, the virtual light spill simulates light emanating from the mini player user interface 704 that includes colors corresponding to the image associated with the currently-playing content item. In some embodiments, the virtual light spill is animated (e.g., flickers, changes intensities and/or colors) in a manner corresponding to a beat of audio content of the content item currently playing via the content application. In some embodiments, both virtual lighting effects 722*a* and 722*b* include the virtual light spill. In some embodiments, virtual lighting effect 722*b* includes the virtual light spill and virtual lighting effect 722*a* does not include the virtual light spill because virtual lighting effect 722*a* is further than a threshold distance (e.g., 1, 2, 3, 5, or 10 meters) associated with the virtual light spill from the mini player user interface 704 and virtual lighting effect 722*b* is within the threshold distance associated with the virtual light spill from the mini player user interface 704. As shown in FIG. 7D, in some embodiments, the electronic device 101 displays the virtual light spill on representations of real surfaces in the three-dimensional environment 702. In some embodiments, the electronic device 101 also displays the virtual light spill on virtual objects in the three-dimensional environment 702 (e.g., user interfaces of other applications, representations of users, etc.). In some embodiments, displaying the virtual lighting effects includes dimming and/or blurring portions of the three-dimensional environment 702 that do not include the mini player user interface 704 and/or lighting effects 722*a* and 722*b*.

In some embodiments, the virtual lighting effects 722*a* and 722*a* include a virtual light show including colors and/or animation corresponding to the content item. For example, the lights included in the virtual light show correspond to the image associated with the content item currently playing via the content application. As another example, the lights included in the virtual light show move, flicker, and/or change intensities and color based on the beat of the audio content of the content item playing via the content application. As shown in FIG. 7D, in some embodiments, the electronic device 101 displays the virtual light show on representations of real surfaces in the three-dimensional environment 702. In some embodiments, the electronic device 101 also displays the virtual light show on virtual objects in the three-dimensional environment 702 (e.g., user interfaces of other applications, representations of users, etc.). In some embodiments, the virtual light show is displayed on surfaces in the three-dimensional environment 702 irrespective of the distance of the surfaces from the mini player user interface 704. In some embodiments, the virtual light show is displayed on surfaces in the three-dimensional environment 702 within a threshold distance (e.g., 1, 2, 3, 5, or 10 meters) associated with the virtual light show of the mini player user interface 704 that is greater than the threshold distance associated with the virtual light spill described above. For example, the virtual light show is included in virtual lighting effects 722*a* and 722*b*, but the virtual light spill is included in virtual lighting effect 722*b* but not virtual lighting effect 722*a* (e.g., virtual lighting effect 722*b* is closer to the mini player user interface 704 than virtual lighting effect 722*a* is to the mini player user interface 704). In some embodiments, the virtual light show is displayed differently on different surfaces in the three-dimensional environment. For example, one or more colors, animations, intensities, sizes, etc. of the virtual light show included in virtual lighting effect 722*a* are different from those of the virtual light show included in virtual lighting effect 722*b*.

Figure 7E:
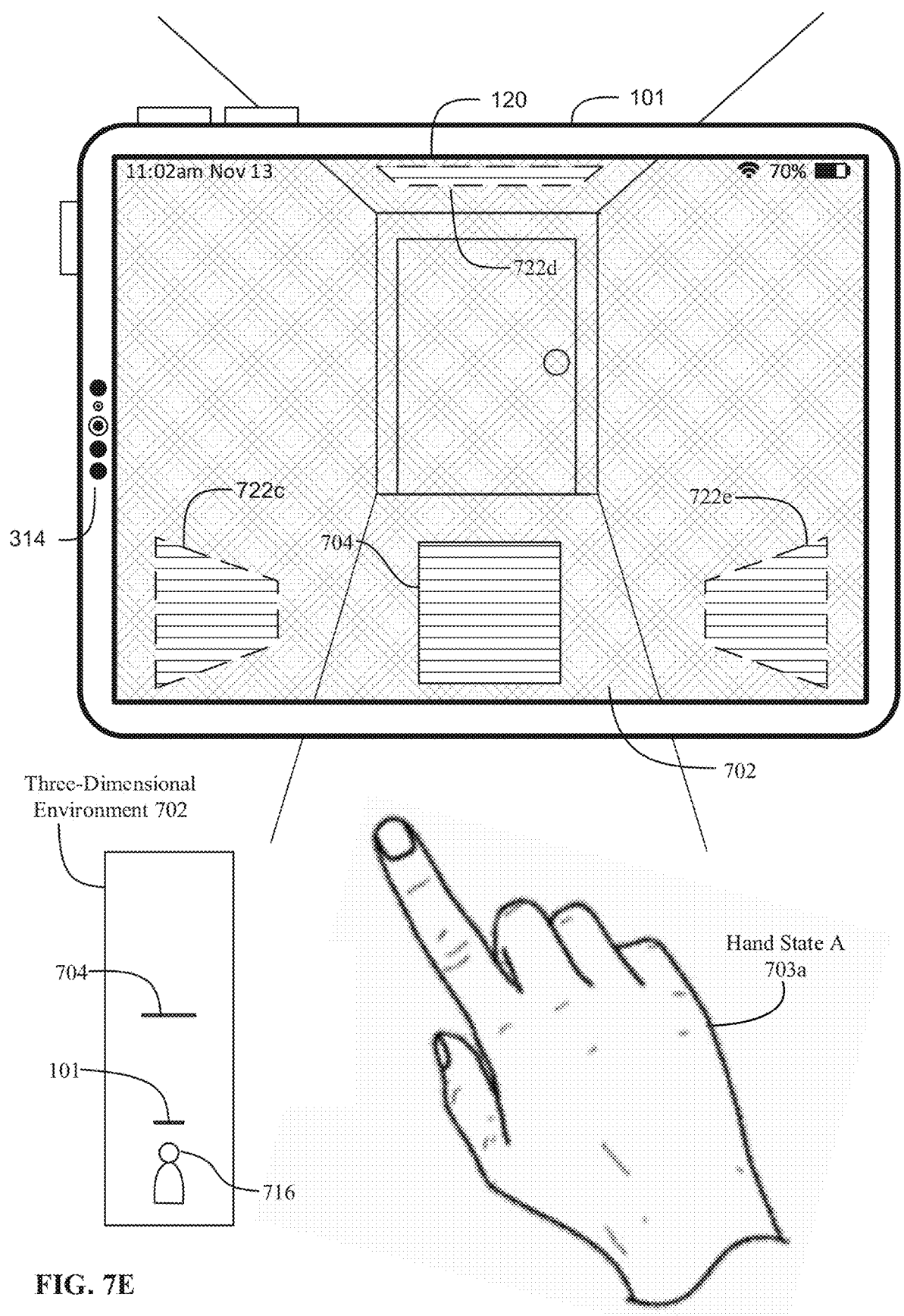

In some embodiments, the virtual light show is displayed differently in the three-dimensional environment 702 depending on the size of the three-dimensional environment 702. For example, FIG. 7D illustrates virtual lighting effects 722*a* and 722*b*, including a virtual light show, in a room, and FIG. 7E illustrates virtual lighting effects 722*c*, 722*d*, and 722*e* in a hallway. In some embodiments, the virtual lighting effects 722*c*-722*e* include a virtual light show effect that is different from virtual lighting effects 722*a* and 722*b* because the hallway in FIG. 7E is a smaller space than the room in FIG. 7D, for example. In some embodiments, because the walls of the hallway in FIG. 7E are closer to the mini player user interface 704 than the walls in the room in FIG. 7D, one or more of the intensities, sizes, colors, animations etc. of the virtual light show included in virtual lighting effects 722*c* and 722*e* in FIG. 7E are different from those of the virtual light show included in virtual lighting effect 722*b* in FIG. 7D.

FIG. 7E also illustrates how, in some embodiments, the virtual lighting effects 722*a-e* include colors based on the image associated with the currently playing content item that is included in the mini player user interface 704. For example, the mini player user interface 704 in FIG. 7E includes a different image than the image included in the mini player user interface 704 in FIG. 7D because the mini player user interface 704 include images (e.g., album artwork) associated with different content items. In some embodiments, because the images in FIGS. 7D and 7E are different, the colors and/or other visual characteristic of lighting effects 722*a* and 722*b* in FIG. 7D are different from the colors (e.g., and animations, etc.) and/or other visual characteristic of lighting effects 722*c-e* in FIG. 7E.

In some embodiments, the user moves themselves and the electronic device 101 (e.g., and/or the display generation component 120) from the room illustrated in FIG. 7D to the hallway illustrated in FIG. 7E. In some embodiments, in response to detecting movement of the electronic device 101 (e.g., and/or the display generation component 120) and/or the user in this way, the electronic device 101 displays the mini player 704 user interface at the location shown in FIG. 7E automatically without receiving an input corresponding to a request to update the position of the mini player user interface 704 in the three-dimensional environment 702 because the mini player user interface 704 "follows" the user in the three-dimensional environment 702. The mini player user interface 704 in FIG. 7E does not include one or more options for modifying playback of the content item currently playing via the content application because the hand 703a of the user does not correspond to the ready state or a selection input, as described above.

Figure 7F:
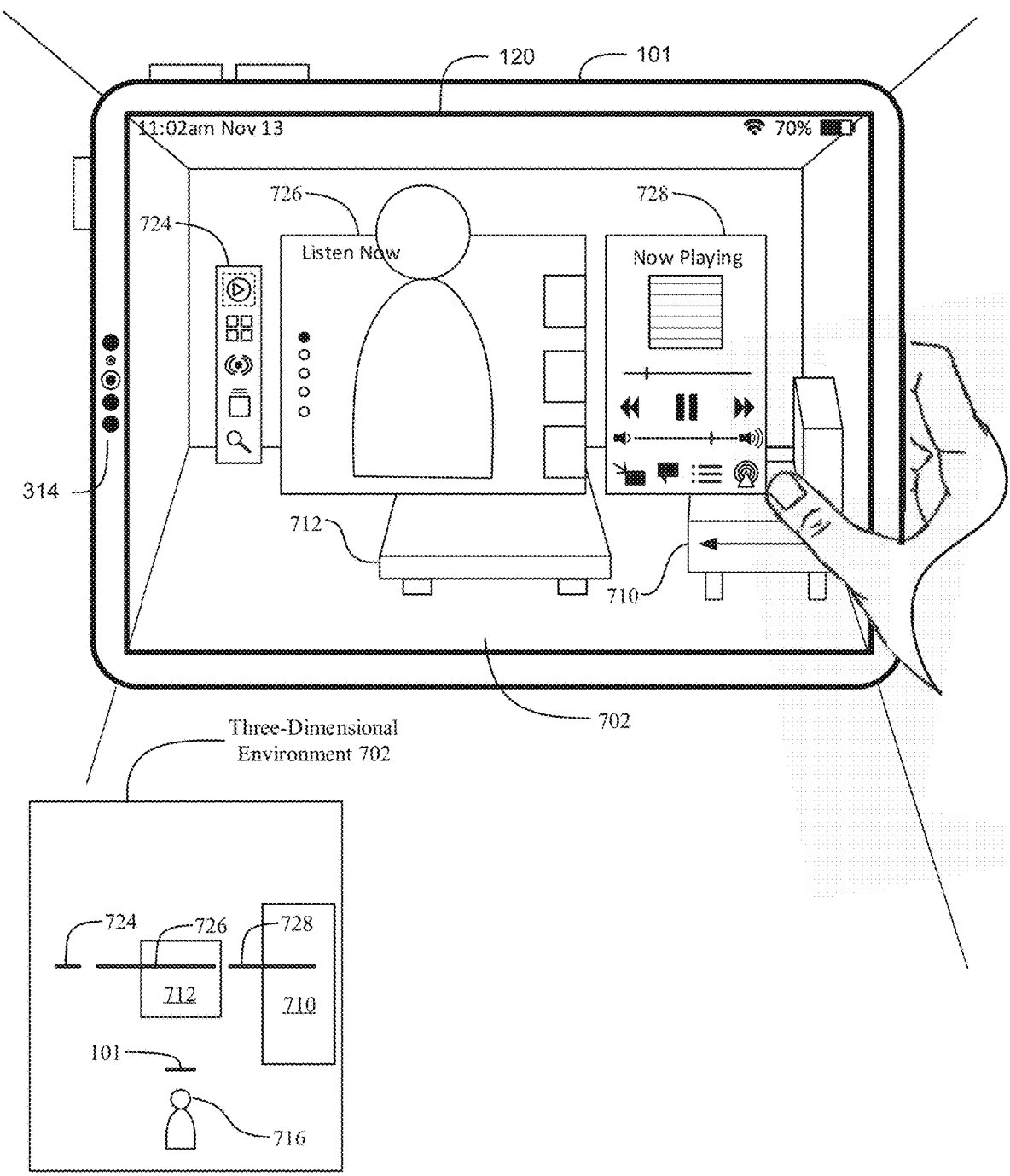

FIG. 7F illustrates an example of the electronic device 101 displaying an expanded user interface of the content application, including navigation element 724, content browsing element 726, and content playback element 728, in the three-dimensional environment 702. In some embodiments, the electronic device 101 displays the expanded user interface of the content application in response to detecting selection of option 718e illustrated in FIG. 7C. Elements of the expanded user interface of the content application will be described in more detail below with reference to method 1000. Certain differences between presentation of the mini player user interface 704 and the expanded user interface are described with reference to FIG. 7F-7H.

In some embodiments, displaying the expanded user interface of the content application includes displaying the three-dimensional environment 702 without virtual lighting effects described above with reference to FIGS. 7D-7E that were displayed while the electronic device displayed the mini player user interface 704. In some embodiments, the electronic device 101 does not update the location of the expanded user interface of the content application in the three-dimensional environment 702 in response to movement of the electronic device 101 (e.g., and/or display generation component 120) and/or the user without an additional input corresponding to a request to update the position of the expanded user interface in the three-dimensional environment 702. For example, FIG. 7F illustrates the user moving the electronic device 101 and display generation component 120 in the physical environment and FIG. 7G illustrates updated display of the three-dimensional environment 702 in response to the movement.

Figure 7G:
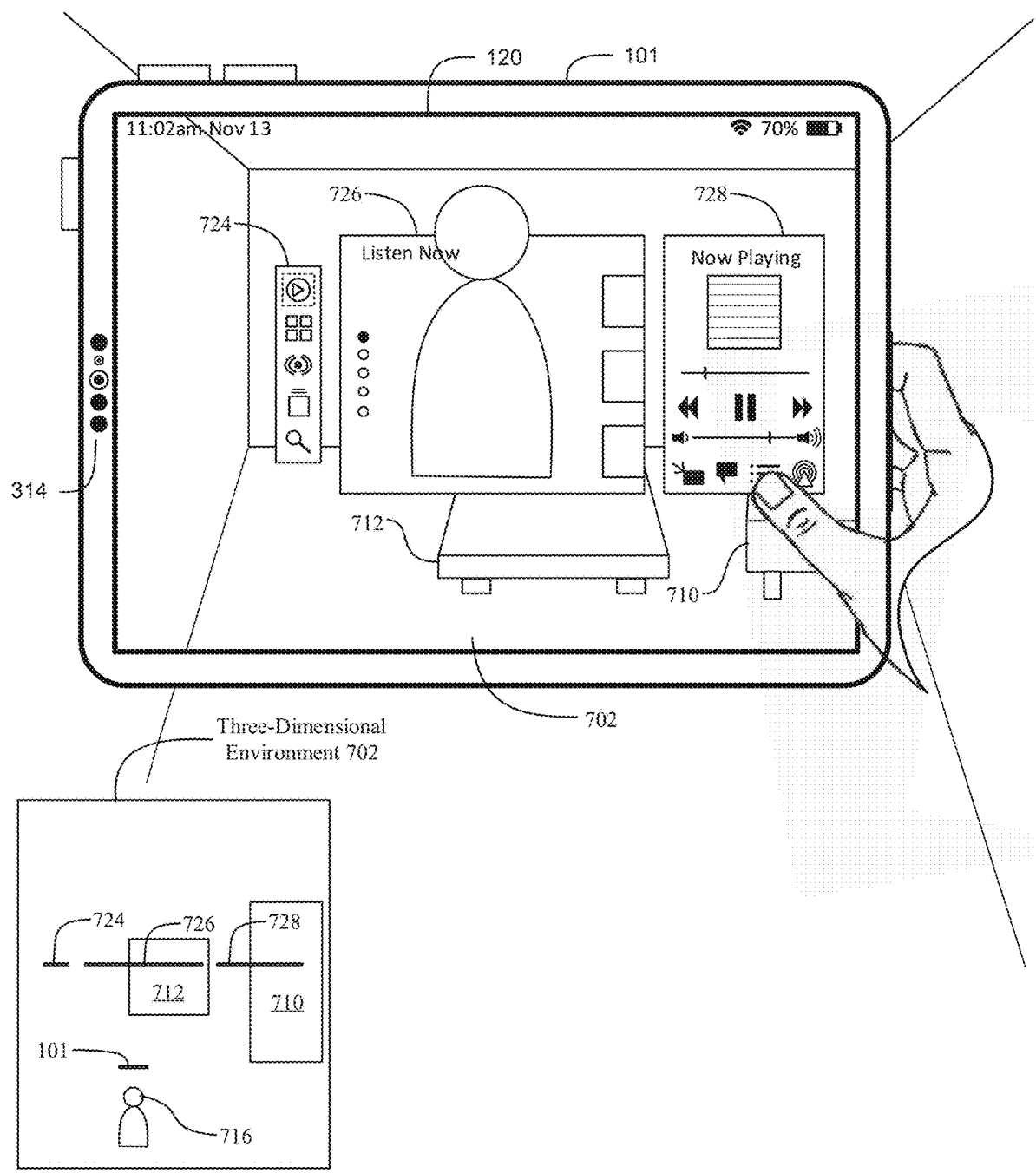

As shown in FIG. 7G, in response to the movement of the electronic device 101 and display generation component 120 illustrated in FIG. 7F, the electronic device 101 forgoes updating the position of the navigation element 724, content browsing element 726, and content playback element 728 of the expanded user interface of the content application. In some embodiments, the expanded user interface of the content application remains at a fixed location relative to the three-dimensional environment 702 in the absence of a user input corresponding to a request to update the position of the expanded content user interface in the three-dimensional environment 702. Thus, for example, the locations of the navigation element 724, content browsing element 726, and content playback element 728 shift relative to the viewpoint of the user and the field of view of the electronic device 101 in response to the movement illustrated in FIG. 7F, as opposed to "following" the user, as was the case for the mini player user interface 704.

Figure 7H:
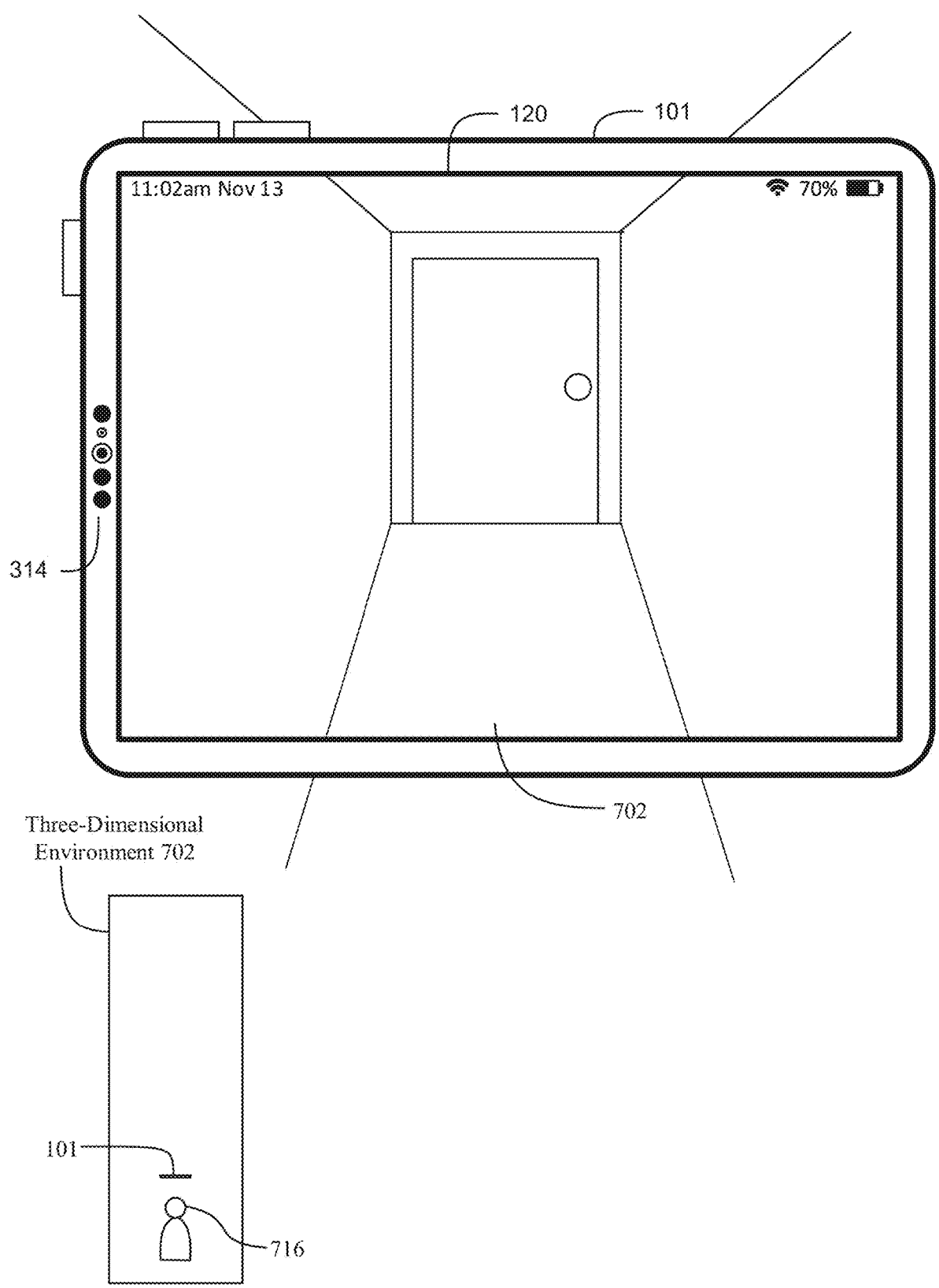
Figure 8A:
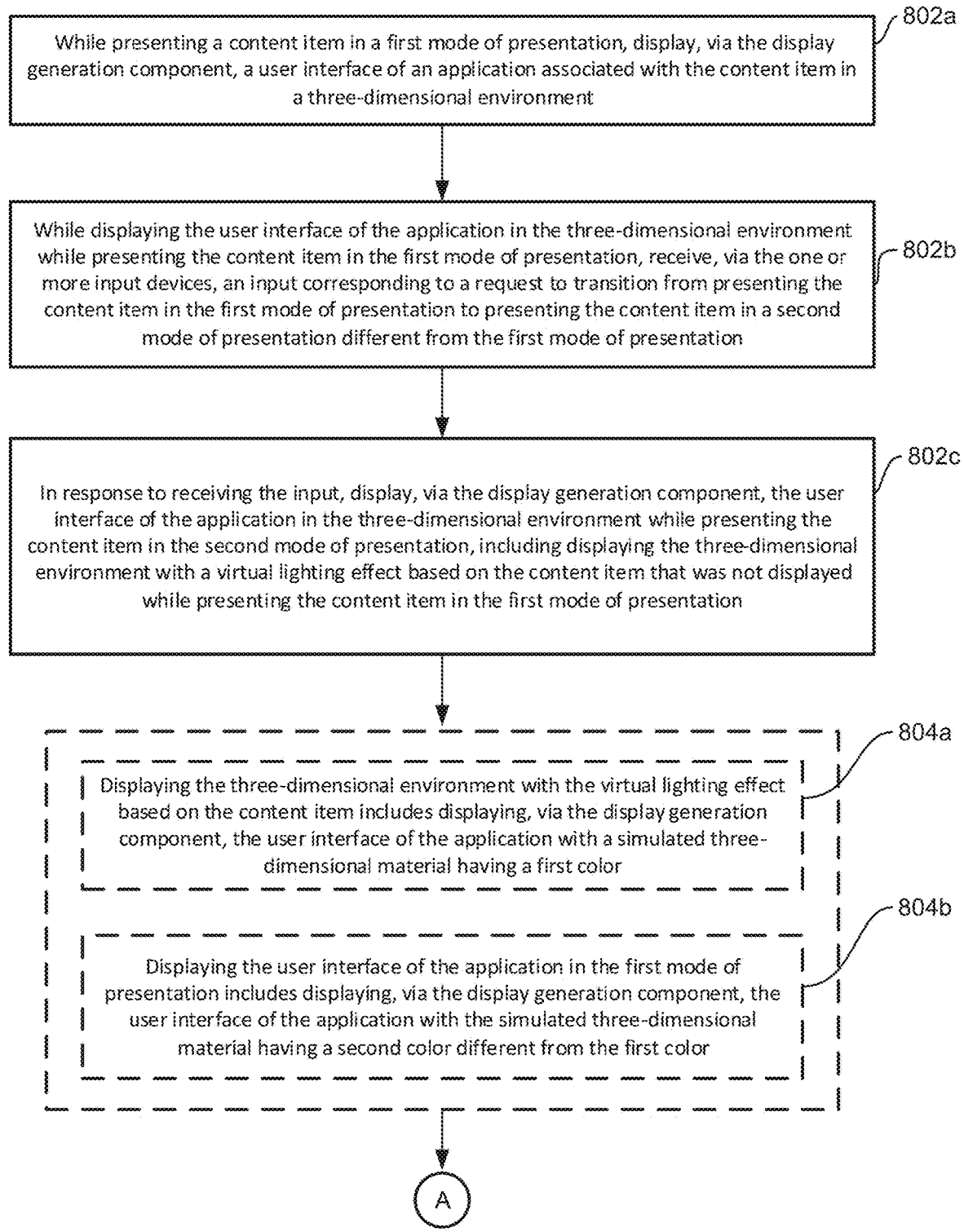
FIGS. 8A-8G is a flowchart illustrating a method of displaying a user interface of a content application in a three-dimensional environment with or without virtual lighting effects applied to the three-dimensional environment depending on whether the user interface is in a mode that does not include virtual lighting or a mode that includes virtual lighting in accordance with some embodiments.
Figure 8B:
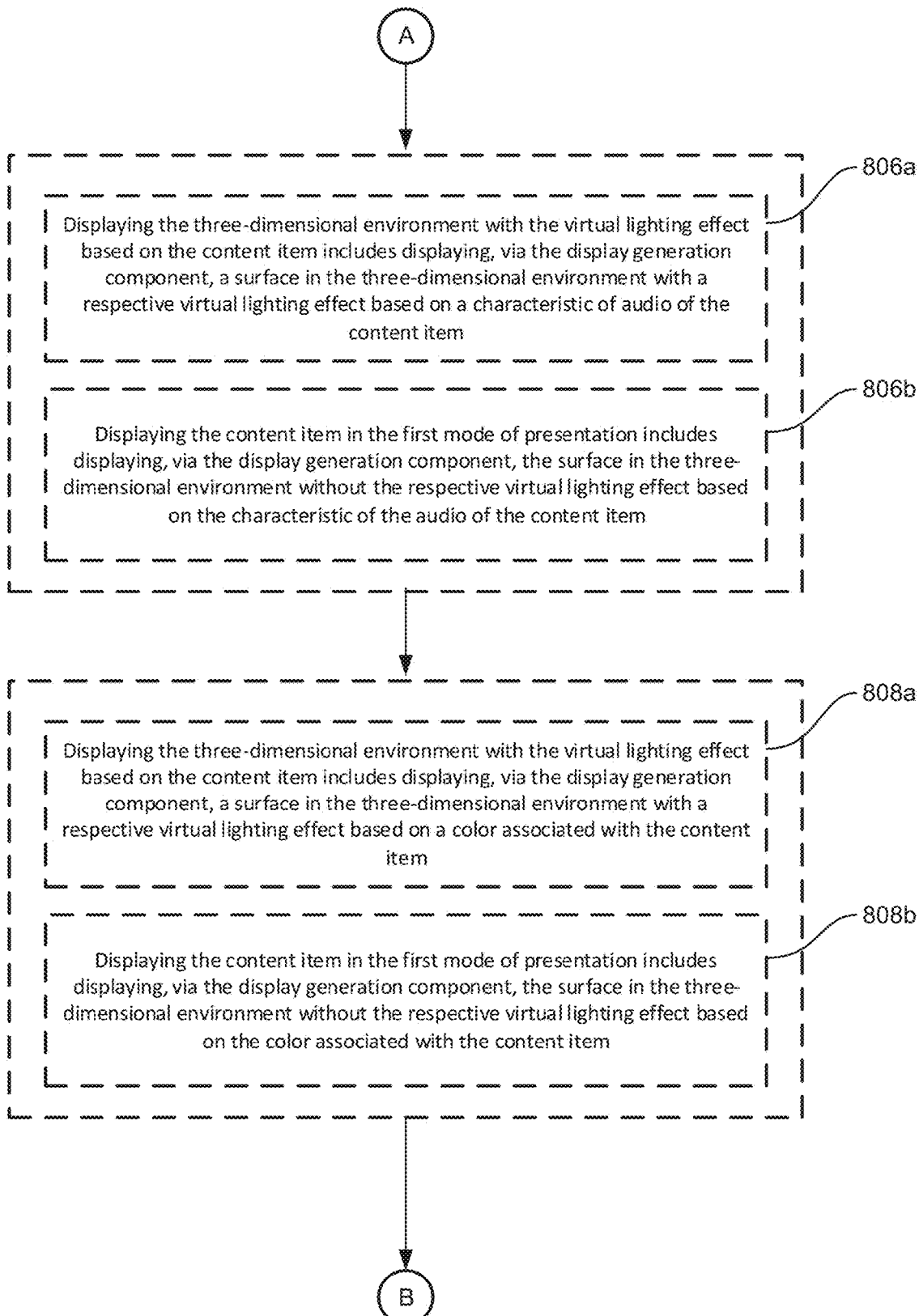
Figure 8C:
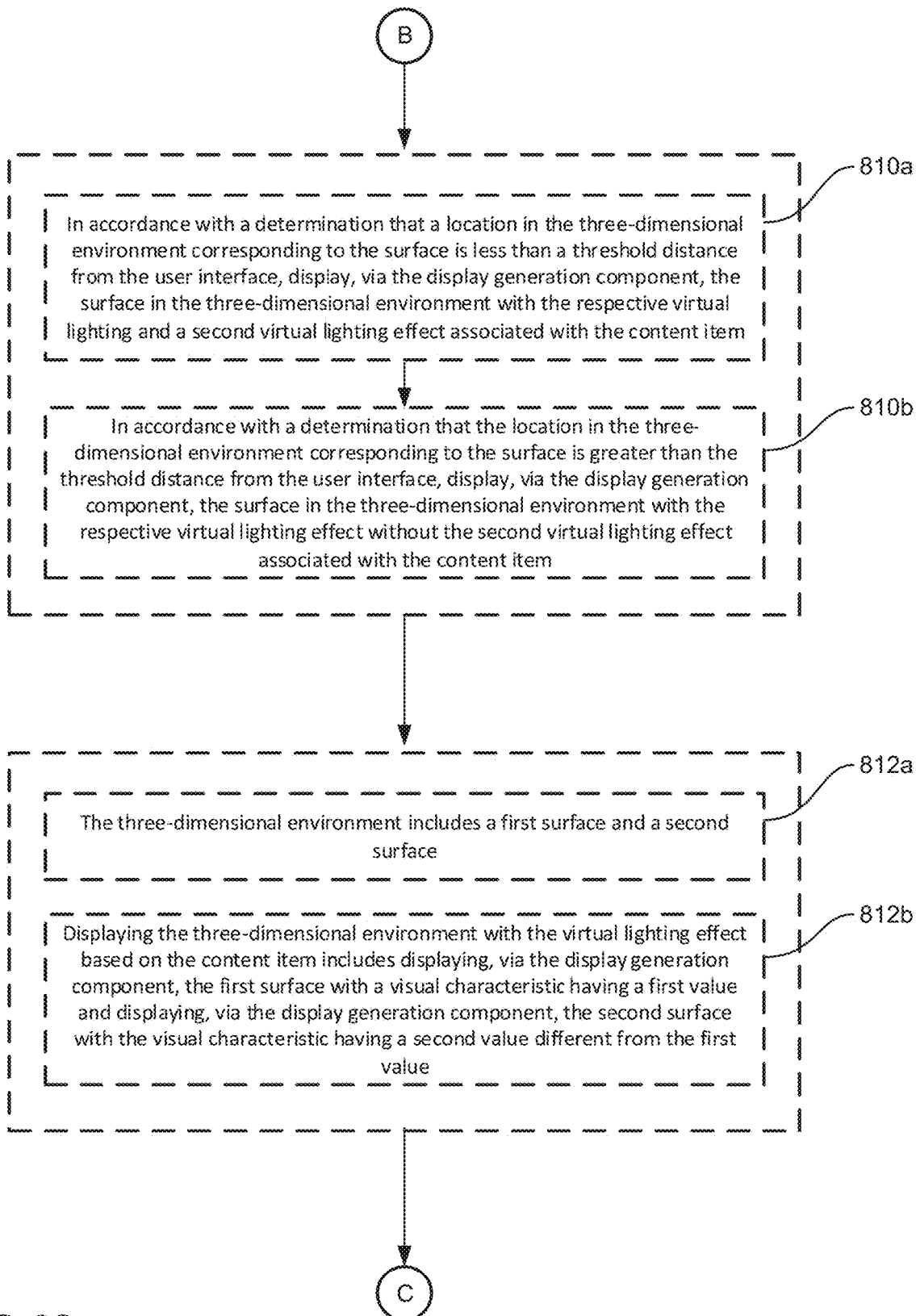
Figure 8D:
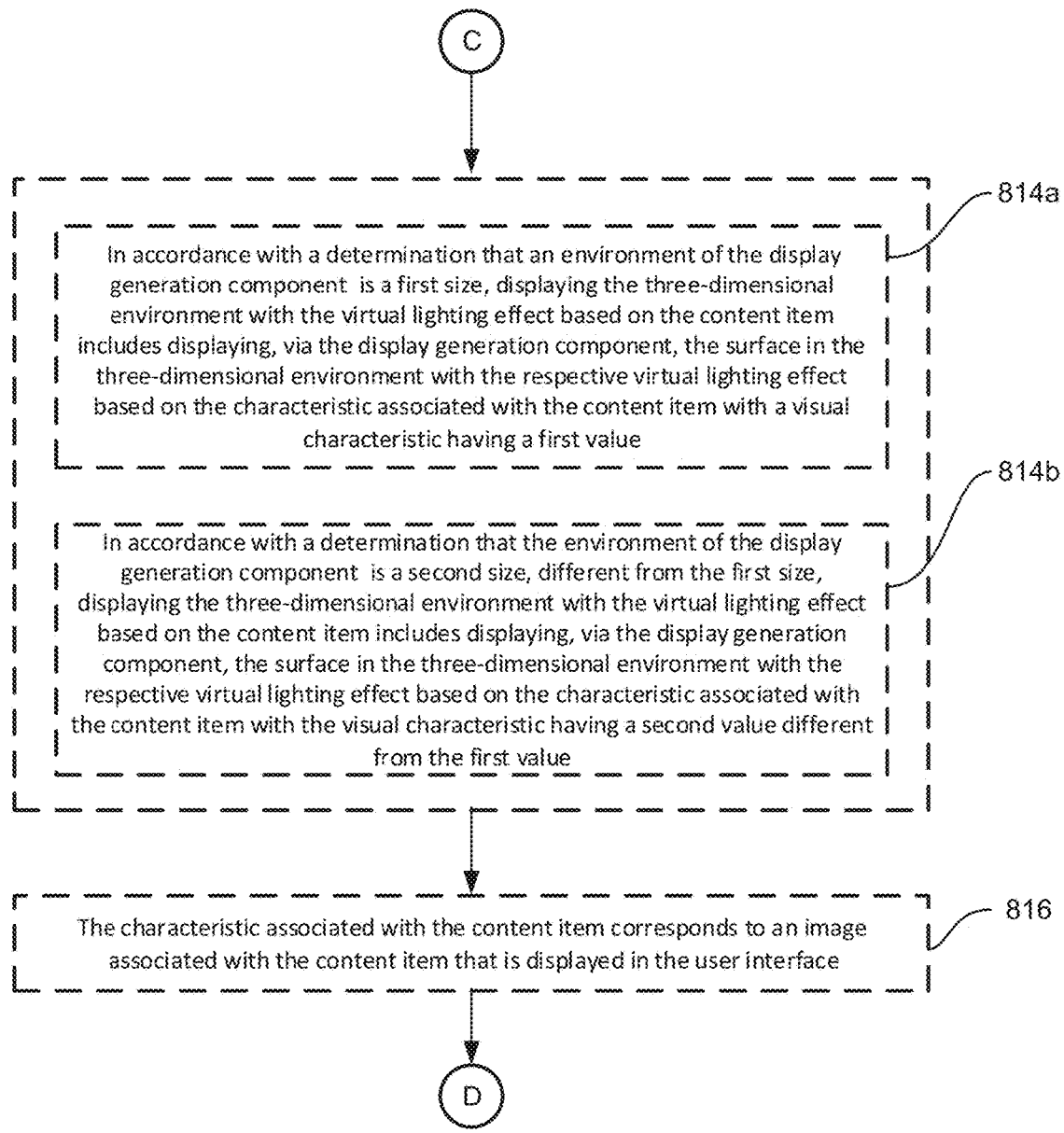
Figure 8E:
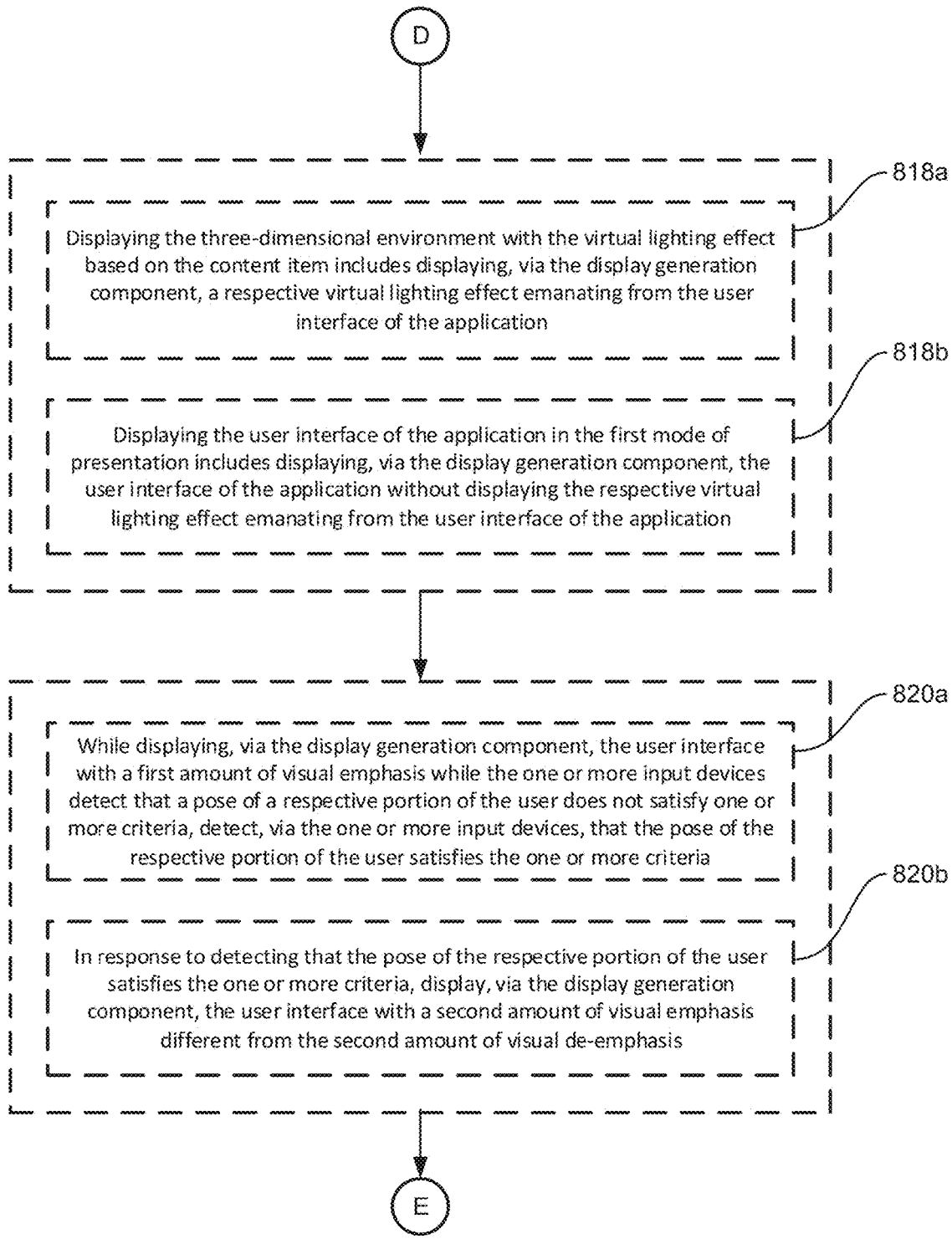
Figure 8F:
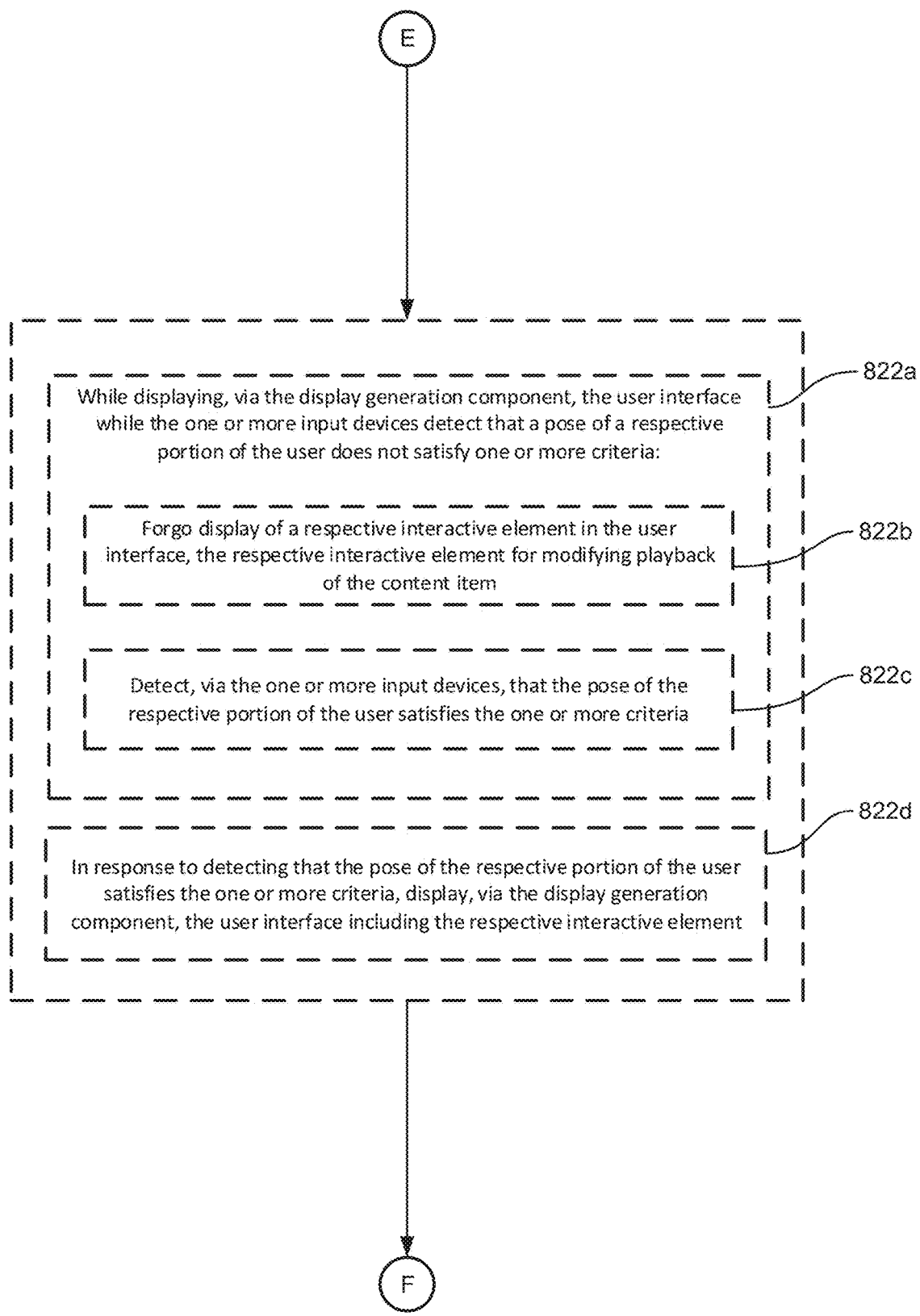
Figure 8G:
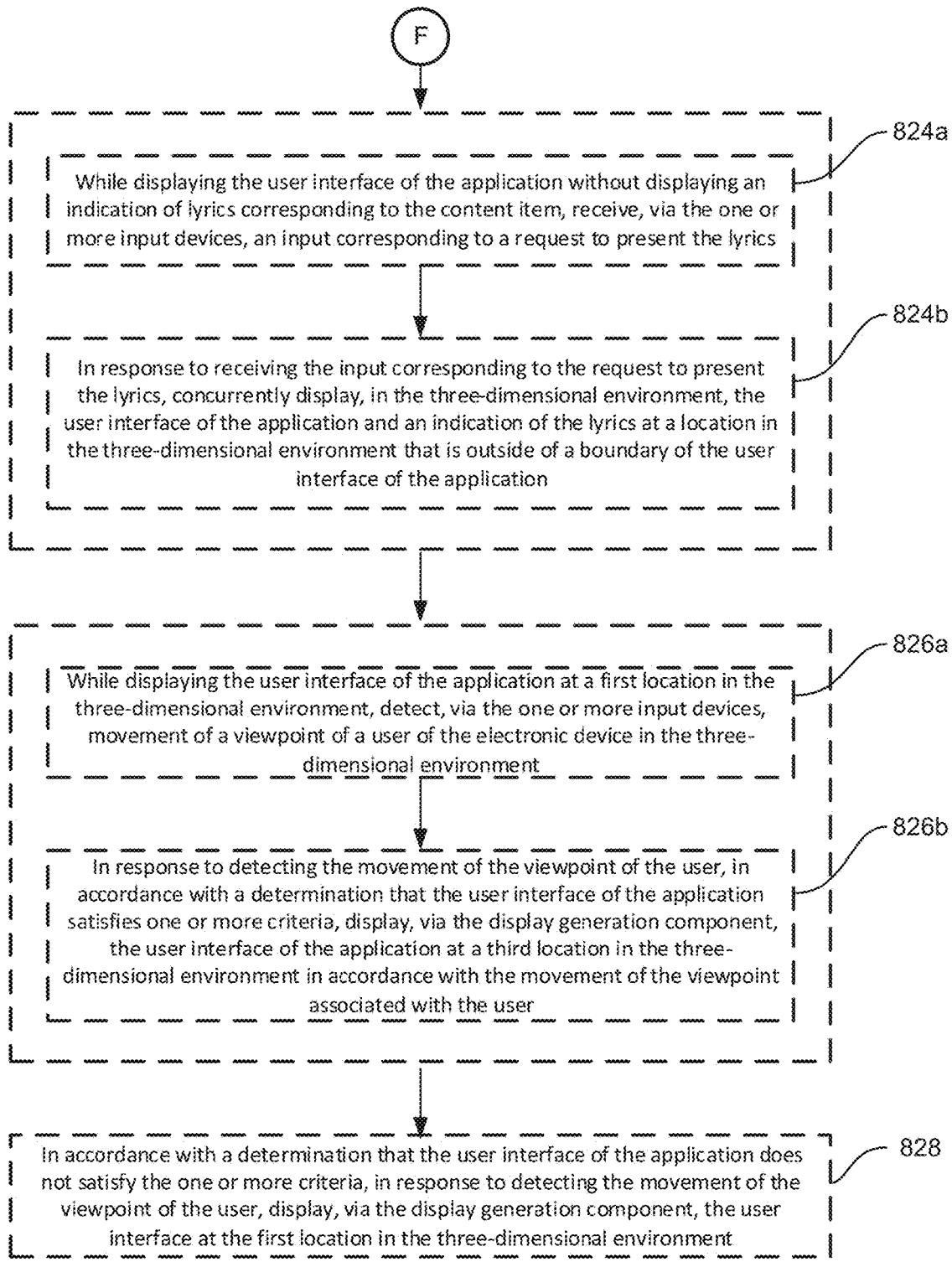

As another example, in FIG. 7H, the user moves themselves and the electronic device 101 (e.g., and/or the display generation component 120) to the hallway. In FIG. 7H, the electronic device 101 forgoes display of the expanded user interface of the content application because the electronic device 101 does not detect an input corresponding to a request to update the location of the expanded user interface in the three-dimensional environment 702, for example. In contrast, as described above with reference to FIG. 7E, the electronic device 101 updates the position of the mini player user interface 704 in the three-dimensional environment 702 to be displayed in the hallway in response to the user moving themselves and the electronic device 101 (e.g., and display generation component 120) to the hallway, without an additional input corresponding to a request to update the position in the three-dimensional environment 702 to the hallway.

In some embodiments, if, in FIG. 7G or 7H, the electronic device 101 detected an input corresponding to a request to update the position of the expanded user interface of the content application, the electronic device 101 would update the position of the expanded user interface of the content application in the three-dimensional environment 702 in accordance with the input. For example, in response to an input corresponding to a request for the electronic device 101 to automatically select a new position in the three-dimensional environment 702 for the expanded content user interface, the electronic device 101 would update the position of the expanded user interface to a location automatically selected based on one or more criteria (e.g., criteria for displaying user interfaces within the field of view of the electronic device, within a threshold distance of the user, without blocking the user's view of other virtual objects, etc.). As another example, in response to an input corresponding to a request to move the expanded user interface according to a movement metric of the input, the electronic device 101 updates the location of the expanded user interface in accordance with the movement metric of the input. For example, in response to selection of an element that initiates a process to move the expanded user interface in accordance with a movement component of the input (e.g., movement of the user's hand, for example), the electronic device 101 updates the position of the expanded user interface in accordance with the movement component of the input detected after detecting selection of the element.

Additional or alternative details regarding the embodiments illustrated in FIGS. 7A-7H are provided below in description of method 800 described with reference to FIGS. 8A-8G.

FIGS. 8A-8G is a flowchart illustrating a method of displaying a user interface of a content application in a three-dimensional environment with or without virtual lighting effects applied to the three-dimensional environment depending on whether the user interface is in a mode that does not include virtual lighting or a mode that includes virtual lighting in accordance with some embodiments. In some embodiments, the method 800 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at an electronic device in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 7A, while presenting (e.g., visual presentation, audio presentation, etc.) a content item in a first mode of presentation, the electronic device (e.g., 101) displays (802*a*), via the display generation component (e.g., 120), a user interface (e.g., 704) of an application associated with the content item in a three-dimensional environment (e.g., 702) (e.g., such as the user interface of the application described with reference to method 1000). In some embodiments, displaying the user interface of the application in the three-dimensional environment while presenting the content item in the first mode of presentation includes displaying the three-dimensional environment without a respective virtual lighting effect based on the content item (e.g., that will be displayed in response to receiving an input corresponding to a request to transition from a first mode of presentation to a second mode of transportation). In some embodiments, the content item includes audio content, such as music, a podcast, or audiobook. In some embodiments, the content item includes video content, such as a movie, video clip, or episode in a series of episodic content. In some embodiments, the user interface of the application associated with the content item includes an image associated with the content item (e.g., album artwork), one or more selectable options for modifying playback of the content item (e.g., play/pause, skip ahead, skip back), and one or more options for modifying the presentation mode of the content item. In some embodiments, the application associated with the content item is a content (e.g., browsing, streaming, playback, library, sharing) application. In some embodiments, the three-dimensional environment includes virtual objects, such as application windows, operating system elements, representations of other users, and/or content items and/or representations of physical objects or regions in the physical environment of the electronic device. In some embodiments, the representations of physical objects or regions are displayed in the three-dimensional environment via the display generation component (e.g., virtual or video passthrough). In some embodiments, the representations of physical objects or regions are views of the physical objects or regions in the physical environment of the electronic device visible through a transparent portion of the display generation component (e.g., true or real passthrough). In some embodiments, the electronic device displays the three-dimensional environment from the viewpoint of the user at a location in the three-dimensional environment corresponding to the physical location of the electronic device and/or the user in the physical environment of the electronic device. In some embodiments, the three-dimensional environment is generated, displayed, or otherwise caused to be viewable by the device (e.g., a computer-generated reality (XR) environment such as a virtual reality (VR) environment, a mixed reality (MR) environment, or an augmented reality (AR) environment, etc.). In some embodiments, presenting the content item in the first mode includes presenting the content item without applying a lighting effect based on the content item, as will be described in more detail below.

In some embodiments, such as in FIG. 7C, while displaying the user interface of the application (e.g., 704) in the three-dimensional environment (e.g., 702) while presenting the content item in the first mode of presentation, the electronic device (e.g., 101*a*) receives (802*b*), via the one or more input devices, an input (e.g., via gaze 713*b* and hand 703*b*) corresponding to a request to transition from presenting the content item in the first mode of presentation to presenting the content item in a second mode of presentation different from the first mode of presentation. In some embodiments, detecting the input corresponding to the request to transition from presenting the content item in the first mode of presentation to presenting the content item in the second mode of presentation includes detecting, via the one or more input devices, selection of a selectable option in the user interface of the application (e.g., selection of an option to toggle the respective virtual lighting effect on the three-dimensional environment).

In some embodiments, such as in FIG. 7D, in response to receiving the input, the electronic device (e.g., 101*a*) displays (802*c*), via the display generation component (e.g., 120), the user interface (e.g., 704) of the application in the three-dimensional environment (e.g., 702) while presenting the content item in the second mode of presentation, including displaying the three-dimensional environment (e.g., 702) with a virtual lighting effect (e.g., 722*a*, 722*b*) based on the content item that was not displayed while presenting the content item in the first mode of presentation. In some embodiments, the respective virtual lighting effect includes displaying one or more virtual objects or representations of physical objects in the three-dimensional environment with the virtual lighting effect, such as a simulation of colored lights that move and/or change color in sync with audio and/or visual content of the content item (e.g., having movements and/or color and/or brightness changes that are synchronized with beats in the audio content and/or motion in the video content). For example, the three-dimensional environment includes a user interface of a second application not associated with the content item (e.g., a user interface of a messaging application) and a representation of a sofa in the physical environment of the electronic device, and displaying the three-dimensional environment with the respective virtual lighting effect includes displaying simulated lights shining on the user interface of the second application and/or the representation of the sofa. In some embodiments, the colors of the simulated lights are colors included in and/or based on an image associated with the content item (e.g., album artwork displayed in the user interface of the application associated with the content item).

Toggling the presentation of the respective virtual lighting effect depending on the mode in which the content is being presented provides an efficient way of toggling between an immersive experience and a low-distraction virtual environment, thereby reducing cognitive burden on the user both when engaging with the content item and when engaging with other content or applications in the three-dimensional environment.

In some embodiments, such as in FIG. 7D, displaying the three-dimensional environment (e.g., 702) with the virtual lighting effect (e.g., 722a, 722b) based on the content item includes displaying, via the display generation component (e.g., 120), the user interface (e.g., 704) of the application with a simulated three-dimensional material having a first color (804a). For example, the three-dimensional material is virtual glass or another material behind or around the user interface elements of the user interface of the application that is displayed as though dispersing/scattering/transmitting light of the first color. In some embodiments, displaying the three-dimensional material with the first color includes displaying the three-dimensional material with a color that corresponds to (e.g., is included in) an image associated with the content item (e.g., album artwork associated with an item of music, an icon or other artwork associated with a podcast, a cover associated with an audiobook).

In some embodiments, such as in FIG. 7B, displaying the user interface (e.g., 704) of the application in the first mode of presentation includes displaying, via the display generation component (e.g., 120), the user interface (e.g., 704) of the application with the simulated three-dimensional material having a second color different from the first color (804b). In some embodiments, the second color does not correspond to the image associated with the content item. In some embodiments, the second color is based on a setting of an operating system of the electronic device and/or one or more (e.g., virtual or real) objects in the three-dimensional environment.

Updating the color of the three-dimensional material depending on whether or not the three-dimensional environment is displayed with the virtual lighting effect based on the content item provides an efficient way of toggling between an immersive experience and a consistent, low-distraction virtual environment, thereby reducing cognitive burden on the user both when engaging with the content item and when engaging with other content or applications in the three-dimensional environment.

In some embodiments, such as in FIG. 7D, displaying the three-dimensional environment (702) with the virtual lighting effect based on the content item includes displaying, via the display generation component (e.g., 120), a surface in the three-dimensional environment (e.g., 702) with a respective virtual lighting effect (e.g., 722a, 722b) (e.g., light spill from the user interface associated with the content item, other lighting effects) based on a characteristic (e.g., the beat) of audio of the content item (806a). In some embodiments, the respective virtual lighting effect includes virtual lighting that moves and/or is animated and the location, color, intensity, etc. of the virtual lighting effect varies at a rate that corresponds to the beat of the audio of the content item. In some embodiments, the respective virtual lighting effect is a light spill from the user interface of the application that flashes and/or pulses to the beat of the audio of the content item (e.g., an item of music). In some embodiments, the respective virtual lighting effect is a virtual light show that moves, changes color and/or intensity to the beat of the audio of the content item. In some embodiments, the virtual light spill appears as though a virtual light source is reflecting on a surface in the three-dimensional environment. In some embodiments, the virtual light show appears as though virtual lighting effects are directed to a surface in the three-dimensional environment. In some embodiments, the surface is a virtual surface of a virtual object in the three-dimensional environment. In some embodiments, the surface is a representation of a surface of a real object in the physical environment of the electronic device that is included in the three-dimensional environment (e.g., as true or video pass through).

In some embodiments, such as in FIG. 7B, displaying the content item in the first mode of presentation includes displaying, via the display generation component (e.g., 120), the surface in the three-dimensional environment without the respective virtual lighting effect based on the characteristic of the audio of the content item (806b). In some embodiments, while the three-dimensional environment is displayed without the virtual lighting effect, the electronic device forgoes display of a light spill from the user interface and/or a virtual light show on the surface in the three-dimensional environment.

Displaying the respective virtual lighting effect on a surface in the three-dimensional environment depending on whether or not the three-dimensional environment is displayed with the virtual lighting effect based on the content item provides an efficient way of toggling between an immersive experience and a consistent, low-distraction virtual environment, thereby reducing cognitive burden on the user both when engaging with the content item and when engaging with other content or applications in the three-dimensional environment.

In some embodiments, such as in FIG. 7D, displaying the three-dimensional environment (e.g., 702) with the virtual lighting effect based on the content item includes displaying, via the display generation component (e.g., 120), a surface in the three-dimensional environment with a respective virtual lighting effect (e.g., 722a, 722b) based on a color associated with the content item (808a). In some embodiments, the color associated with the content item is a color included in an image associated with the content item (e.g., album artwork associated with music, artwork or an icon associated with a podcast, a cover associated with an audiobook). In some embodiments, the respective virtual lighting effect is a light spill from the user interface of the application that includes the color associated with the content item. In some embodiments, the respective virtual lighting effect is a virtual light show that includes the color associated with the content item. In some embodiments, the virtual light spill appears as though a virtual light source is reflecting on a surface in the three-dimensional environment. In some embodiments, the virtual light show appears as though virtual lighting effects are directed to a surface in the three-dimensional environment. In some embodiments, the surface is a virtual surface of a virtual object in the three-dimensional environment. In some embodiments, the surface is a representation of a surface of a real object in the physical environment of the electronic device that is included in the three-dimensional environment (e.g., as true or video pass through).

In some embodiments, such as in FIG. 7B, displaying the content item in the first mode of presentation includes displaying, via the display generation component (e.g., 120), the surface in the three-dimensional environment without the respective virtual lighting effect based on the color associated with the content item (808b). In some embodiments, while the three-dimensional environment is displayed without the virtual lighting effect, the electronic device forgoes display of a light spill from the user interface and/or a virtual light show on the surface in the three-dimensional environment.

Displaying the respective virtual lighting effect on a surface in the three-dimensional environment depending on whether or not the three-dimensional environment is displayed with the virtual lighting effect based on the color associated with content item provides an efficient way of toggling between an immersive experience and a consistent, low-distraction virtual environment, thereby reducing cognitive burden on the user both when engaging with the content item and when engaging with other content or applications in the three-dimensional environment.

In some embodiments, such as in FIG. 7D, in accordance with a determination that a location in the three-dimensional environment corresponding to the surface is less than a threshold distance (e.g., 1, 2, 3, 5, 10, or 15 meters) from the user interface, the electronic device (e.g., 101) displays, via the display generation component (e.g., 120), the surface in the three-dimensional environment with the respective virtual lighting (e.g., 722b) and a second virtual lighting effect associated with the content item (722b). In some embodiments, the respective virtual lighting is a virtual light show described in more detail above. In some embodiments, if the surface is within the threshold distance of the user interface, the electronic device displays the surface with the respective virtual lighting and the second virtual lighting effect associated with the content item. In some embodiments, the threshold distance is associated with a second virtual lighting effect associated with the content item, such as a virtual light spill emanating from (e.g., a user interface, an image, etc. associated with) the content item. In some embodiments, the respective virtual lighting effect is displayed on surfaces further than the threshold distance associated with the second virtual lighting effect.

In some embodiments, such as in FIG. 7D, in accordance with a determination that the location in the three-dimensional environment (e.g., 702) corresponding to the surface is greater than the threshold distance from the user interface, the electronic device (e.g., 101) displays (810b), via the display generation component (e.g., 120), the surface in the three-dimensional environment with the respective virtual lighting effect (e.g., 722a) without the second virtual lighting effect associated with the content item. In some embodiments, the electronic device displays surfaces with the respective virtual lighting effect irrespective of the distance between the surfaces and the user interface. In some embodiments, the electronic device displays a respective surface without the respective virtual lighting effect if the respective surface is further than a second threshold distance from the user interface, the second threshold distance greater than the threshold distance.

Displaying the surface with the respective virtual lighting effect without the second virtual lighting effect when the surface is greater than the threshold distance from the user interface provides an immersive experience while presenting the content, thereby enhancing user interactions with the electronic device.

In some embodiments, such as in FIG. 7D, the three-dimensional environment includes a first surface and a second surface (812a). In some embodiments, the first surface and second surface include two or more of a representation of a real wall in the physical environment of the display generation component and/or electronic device, representation of a real floor in the physical environment of the display generation component and/or electronic device, representation of a real object in the physical environment of the display generation component and/or electronic device, a representation of a virtual object, a user interface of a second application, and/or a user interface of the operating system of the electronic device.

In some embodiments, such as in FIG. 7D, displaying the three-dimensional environment (e.g., 702) with the virtual lighting effect based on the content item includes displaying, via the display generation component (e.g., 120), the first surface with a visual characteristic (e.g., 722a) (e.g., color, translucency, intensity, animation) having a first value and displaying, via the display generation component, the second surface with the visual characteristic (e.g., 722b) having a second value different from the first value (812b). In some embodiments, the virtual lighting effect is a virtual light show and the color, translucency, intensity, and/or animation of the light show is different between the first surface and the second surface. In some embodiments, the virtual lighting effect includes a virtual light spill from the user interface of the application that is displayed on the first surface or the second surface but not the other surface (e.g., based on a distance between the other surface and the user interface, based on a (e.g., real, virtual) material of the other surface, etc.). In some embodiments, the virtual lighting effect varies depending on how reflective a respective surface is, such as having a high amount of brightness on a shiny and/or glossy surface and a lower amount of brightness on a matte and/or dull surface.

Displaying the first surface and second surface with a visual characteristic having different values for the first surface and the second surface provides an enhanced immersive experience, thereby reducing cognitive burden on the user when engaging with the content item with the virtual lighting effect.

In some embodiments, such as in FIG. 7D, in accordance with a determination that an environment (e.g., a physical environment, the three-dimensional environment) of the display generation component (e.g., 120) (and/or electronic device) is a first size, displaying the three-dimensional environment (e.g., 702) with the virtual lighting effect (e.g., 722a, 722b) based on the content item includes displaying, via the display generation component (e.g., 120), the surface in the three-dimensional environment (e.g., 702) with the respective virtual lighting effect (e.g., 722a, 722b) based on the characteristic associated with the content item with a visual characteristic (e.g., intensity, size, color, animation) having a first value (814a).

In some embodiments, such as in FIG. 7E, in accordance with a determination that the environment (e.g., a physical environment, the three-dimensional environment) of the display generation component (and/or electronic device) is a second size, different from the first size, the displaying the three-dimensional environment (e.g., 702) with the virtual lighting effect (e.g., 722c, 722d, 722e) based on the content item includes displaying, via the display generation component (e.g., 120), the surface in the three-dimensional environment with the respective virtual lighting effect (e.g., 722c, 722d, 722e) based on the characteristic associated with the content item with the visual characteristic having a second value different from the first value (814b). In some embodiments, the virtual lighting effect varies depending on the size of the three-dimensional environment, which is optionally based on the size of the physical environment of the display generation component and/or electronic device. For example, the virtual lighting effect spans a larger (e.g., virtual) area when the three-dimensional environment is a larger size. As another example, the intensity and/or brightness of the virtual lighting effect is higher for surfaces closer to the user interface and, therefore, higher for a smaller three-dimensional environment. In some embodiments, the size of the virtual lighting effect depends on the distance of a respective surface from the user interface of the application. For example, the lighting effect is larger for surfaces that are further from the user interface and smaller for surfaces closer to the user interface in the three-dimensional environment.

Displaying the three-dimensional environment with the virtual lighting effect that varies depending on the size of the environment of the display generation component provides an enhanced, realistic experience, thereby reducing cognitive burden on the user when engaging with the content item with the virtual lighting effect.

In some embodiments, such as in FIG. 7D, the characteristic associated with the content item corresponds to an image associated with the content item that is displayed in the user interface (e.g., 704) (816). In some embodiments, the image is album artwork associated with music. In some embodiments, the image is artwork and/or an icon associated with a podcast. In some embodiments, the image is cover artwork associated with an audiobook. In some embodiments, the characteristic is a color or color scheme (e.g., a plurality of colors present in a respective ratio relative to each other) included in the image.

Displaying the lighting effect with a characteristic corresponding to the image associated with the content item that is displayed in the user interface provides enhanced visual feedback to the user associating the virtual lighting effect with the content item, thereby reducing cognitive burden on the user when engaging with the content item with the virtual lighting effect.

In some embodiments, such as in FIG. 7D, displaying the three-dimensional environment (e.g., 702) with the virtual lighting effect (e.g., 722a, 722b) based on the content item includes displaying, via the display generation component (e.g., 120), a respective virtual lighting effect (e.g., 722b) (e.g., a virtual light spill) emanating from the user interface (e.g., 704) of the application (818a). In some embodiments, the virtual lighting effect including the respective virtual lighting effect (e.g., light spill) emanating from the user interface is displayed while displaying the content item in the second mode of presentation. In some embodiments, the second mode of presentation is a mode in which virtual lighting effects are displayed. In some embodiments, the second mode of presentation is available when displaying a mini-player user interface (e.g., including an image associated with the content item, playback controls for the content item, lyrics of the content item, without a content item library, playlist, playback queue or browsing user interface). In some embodiments, the second mode of presentation is not available when displaying a full user interface associated with the content item that includes one or more of a content item library, playlist, playback queue or browsing user interface.

In some embodiments, such as in FIG. 7C, displaying the user interface (e.g., 704) of the application in the first mode of presentation includes displaying, via the display generation component (e.g., 120), the user interface (e.g., 704) of the application without displaying the respective virtual lighting effect emanating from the user interface of the application (818b). In some embodiments, the first mode of presentation is a mode of presentation in which virtual lighting effects are not displayed. In some embodiments, while displaying the application in the first mode of presenting, the electronic device displays an image associated with the content item, but does not display a lighting effect in areas of the three-dimensional environment other than the user interface based on the content item. In some embodiments, the first mode of presentation is available when displaying the mini-player user interface or the full user interface described above.

Toggling display of the respective virtual lighting effect emanating from the user interface of the application depending on whether the user interface of the application is displayed in the first or second mode of presentation provides an efficient way of toggling between a more immersive experience and a low-distraction virtual environment, thereby reducing cognitive burden on the user both when engaging with the content item and when engaging with other content or applications in the three-dimensional environment.

In some embodiments, such as in FIG. 7B, while displaying, via the display generation component (e.g., 120), the user interface (e.g., 704) with a first amount of visual emphasis while the one or more input devices (e.g., 314) detect that a pose of a respective portion (e.g., hand, head) of the user (e.g., 703a) does not satisfy one or more criteria, the electronic device (e.g., 101) detects (820a) via the one or more input devices, that the pose of the respective portion of the user (e.g., 703a) satisfies the one or more criteria, such as in FIG. 7C. In some embodiments, detecting that the pose of the respective portion of the user satisfies the one or more criteria include detecting satisfaction of the one or more criteria described above. In some embodiments, displaying the user interface with the first amount of visual de-emphasis includes displaying the user interface without a blur effect and/or with relatively high color saturation and/or contrast. In some embodiments, the pose of the hand of the user satisfies the one or more criteria when the hand of the user is within a field of view of a hand tracking device in communication with the electronic device. In some embodiments, the pose of the hand of the user satisfies the one or more criteria when the hand of the user is within a predetermined area of the three-dimensional environment, such as being raised relative to the rest of the body of the user (e.g., by a threshold amount). In some embodiments, the pose of the hand of the user satisfies the one or more criteria when the hand of the user is in a pose corresponding to a ready state of the electronic device corresponding to the beginning of an input provided by the hand of the user, such as a pointing hand shape (e.g., in which one or more fingers are extended and one or more fingers are curled to the palm) or pre-pinch hand shape (e.g., a hand shape in which the thumb is within a predetermined threshold distance (e.g., 0.1, 0.2, 0.3, 0.5, 1, 2, or 3 centimeters) of another finger of the hand without touching the finger). In some embodiments, the pose of the hand does not satisfy the one or more criteria when the hand is not detected by the hand tracking device.

In some embodiments, such as in FIG. 7D, in response to detecting that the pose of the respective portion of the user (e.g., 703a) satisfies the one or more criteria, the electronic device (e.g., 101) displays (820b), via the display generation component (e.g., 120), the user interface (e.g., 704) with a second amount of visual emphasis different from (e.g., less than) the second amount of visual de-emphasis. In some embodiments, the electronic device blurs and/or reduces the contrast and/or brightness of (e.g., an image included in) the user interface in response to detecting the pose of the respective portion of the user satisfies the one or more criteria.

Changing the amount of visual emphasis of the user interface depending on whether the pose of the respective portion of the user satisfies the one or more criteria provides enhanced visual feedback to the user that the user is able to use the respective portion of the user to direct input to the user interface, which reduces the cognitive burden of the user and efficiently teaches the user how to interact with the user interface.

In some embodiments, such as in FIG. 7B, while displaying, via the display generation component (e.g., 120), the user interface while the one or more input devices (e.g., 314) detect that a pose of a respective portion (e.g., hand, head) of the user (e.g., 703a) does not satisfy one or more criteria (822a), the electronic device (e.g., 101) forgoes (822b) display of a respective interactive element (e.g., 718a in FIG. 7C) in the user interface (e.g., 704), the respective interactive element (e.g., 718a) for modifying playback of the content item. In some embodiments, the respective interactive element is an element that, when selected, causes the electronic device to play or pause the content item, skip ahead to the next content item in a content item playback queue, restart the content item from the beginning, or skip back to the previous content item in the content item playback queue. In some embodiments, while the respective interactive element is not included in the user interface, the user interface includes an image associated with the content item (e.g., album, podcast, or book cover artwork or an icon as described above). In some embodiments, the pose of the hand of the user satisfies the one or more criteria when the hand of the user is within a field of view of a hand tracking device in communication with the electronic device. In some embodiments, the pose of the hand of the user satisfies the one or more criteria when the hand of the user is within a predetermined area of the three-dimensional environment, such as being raised relative to the rest of the body of the user (e.g., by a threshold amount). In some embodiments, the pose of the hand of the user satisfies the one or more criteria when the hand of the user is in a pose corresponding to a ready state of the electronic device corresponding to the beginning of an input provided by the hand of the user, such as a pointing hand shape (e.g., in which one or more fingers are extended and one or more fingers are curled to the palm) or pre-pinch hand shape (e.g., a hand shape in which the thumb is within a predetermined threshold distance (e.g., 0.1, 0.2, 0.3, 0.5, 1, 2, 3, etc. centimeters) of another finger of the hand without touching the finger). In some embodiments, the pose of the hand does not satisfy the one or more criteria when the hand is not detected by the hand tracking device.

In some embodiments, such as in FIG. 7C, while displaying, via the display generation component (e.g., 120), the user interface (e.g., 704) while the one or more input devices (e.g., 314) detect that a pose of a respective portion (e.g., hand, head) of the user (e.g., 703b) does not satisfy one or more criteria (822a), the electronic device (e.g., 101) detects (822c), via the one or more input devices, that the pose of the respective portion of the user (e.g., 703b) satisfies the one or more criteria. In some embodiments, detecting that the pose of the respective portion of the user satisfies the one or more criteria include detecting satisfaction of the one or more criteria described above.

In some embodiments, such as in FIG. 7C, in response to detecting that the pose of the respective portion of the user (e.g., 703b) satisfies the one or more criteria, the electronic device (e.g., 101) displays (822d), via the display generation component (e.g., 120), the user interface including the respective interactive element (e.g., 718a). In some embodiments, the respective interactive element is displayed overlaid on the image associated with the content item.

Toggling display of the interactive element in the user interface depending on whether the pose of the respective portion of the user satisfies the one or more criteria provides an efficient way to toggle between a more immersive experience with fewer interactive elements displayed and a more utilitarian experience with more interactive elements displayed, which reduces the cognitive burden of the user.

In some embodiments, such as in FIG. 7C, while displaying the user interface (e.g., 704) of the application without displaying an indication (e.g., 720 in FIG. 7D) of lyrics corresponding to the content item, the electronic device (e.g., 101) receives (824a), via the one or more input devices, an input (e.g., via gaze 718f and hand 703b in FIG. 7C) corresponding to a request to present the lyrics. In some embodiments, the input includes selection of a selectable option displayed in the user interface. In some embodiments, the selectable option is not displayed unless and until the pose of a respective portion of the user satisfies one or more criteria as described above.

In some embodiments, such as in FIG. 7D, in response to receiving the input corresponding to the request to present the lyrics, the electronic device (e.g., 101) concurrently displays (824b), in the three-dimensional environment (e.g., 702), the user interface (e.g., 702) of the application and an indication (e.g., 720) of the lyrics at a location in the three-dimensional environment (e.g., 702) that is outside of a boundary of the user interface (e.g., 704) of the application (e.g., the boundary of the user interface of the application prior to receiving the input corresponding to the request to present the lyrics). In some embodiments, displaying the user interface without the indication of lyrics includes displaying a respective element (e.g., window, container, platter) having a respective boundary that does not include the lyrics, also without displaying the lyrics outside of that boundary. In some embodiments, displaying the user interface with the lyrics includes concurrently displaying the respective element (e.g., without changing the size of the boundary of the respective element) and the lyrics beyond the boundary of the respective element. In some embodiments, the indication of the lyrics corresponding to the content item includes a time synchronized indication of lyrics corresponding to a portion of the content item that is currently playing. In some embodiments, as the content item continues to play, the indication of the lyrics updates to include an indication of the lyrics corresponding to the portion of the content item that is currently playing. In some embodiments, the electronic device concurrently displays the other (e.g., virtual, real) objects in the three-dimensional environment concurrently with the lyrics.

Toggling display of the lyrics outside of the boundary of the user interface provides an efficient way of toggling the amount of content displayed in the three-dimensional environment, thereby reducing the cognitive burden on the user both when engaging with the content and when engaging with other content or applications in the three-dimensional environment.

In some embodiments, such as in FIG. 7A, while displaying the user interface (e.g., 704) of the application at a first location in the three-dimensional environment (e.g., and while displaying, via the display generation component a respective virtual object at a second location in the three-dimensional environment), the electronic device (e.g., 101) detects (826*a*), via the one or more input devices (e.g., 314), movement of a viewpoint of a user of the electronic device (e.g., 101) in the three-dimensional environment. In some embodiments, the viewpoint of the user moves in accordance with movement of the user and/or movement of the electronic device and/or display generation component in a physical environment of the electronic device and/or display generation component. In some embodiments, the first location of the user interface of the application is a location corresponding to the location of the viewpoint of the user in the three-dimensional environment.

In some embodiments, such as in FIG. 7B, in response to detecting the movement of the viewpoint of the user, in accordance with a determination that the user interface (e.g., 704) of the application satisfies one or more criteria (e.g., the user interface is the mini-player user interface described above), the electronic device (e.g., 101) displays (826*b*), via the display generation component (e.g., 120), the user interface (e.g., 704) of the application at a third location in the three-dimensional environment (e.g., 702) in accordance with the movement of the viewpoint associated with the user (e.g., without updating a location in the three-dimensional environment associated with the respective virtual object). In some embodiments, the electronic device maintains display of the respective virtual object at the second location in the three-dimensional environment. In some embodiments, the movement of the viewpoint of the user causes the second location of the three-dimensional environment to be outside of a field of view of the three-dimensional environment presented by the electronic device (e.g., via the display generation component) and the electronic device ceases display of the respective virtual object. In some embodiments, while the user interface satisfies the one or more criteria, the user interface is "body locked" to the user of the electronic device and is displayed at a location in the three-dimensional environment that is within a threshold distance (e.g., 5, 10, 15, 20, 30, 50, or 100 centimeters) of the viewpoint of the user and moves in the three-dimensional environment to remain within the threshold distance of the viewpoint of the user within a field of view of the user. In some embodiments, the electronic device updates the position of the user interface in response to detecting the viewpoint of the user remaining within a threshold distance (e.g., 10, 15, 20, 30, 50, 100, 200, or 300 centimeters) of a single respective location for a threshold period of time (e.g., 1, 2, 3, 5, or 10 seconds). In some embodiments, the electronic device updates the location of the user interface by initiating display of the user interface at the updated location with a fade-in animation effect. In some embodiments, other virtual objects are "world locked" and remain at respective locations in the three-dimensional environment unless and until an input to update their locations is received.

Updating the location of the user interface of the application in accordance with the movement of the viewpoint of the user provides efficient access to the user interface, thereby reducing the cognitive burden on the user when moving around the three-dimensional environment and interacting with the application.

In some embodiments, such as in FIGS. 7F-7G, in accordance with a determination that the user interface (e.g., 724, 726, 728) of the application does not satisfy the one or more criteria (e.g., the user interface is a full user interface, and not a mini-player user interface, as described above), in response to detecting the movement of the viewpoint of the user (and in accordance with a determination that the first location is in the field of view of the display generation component after the movement of the viewpoint of the user), the electronic device (e.g., 101) displays (828), via the display generation component (e.g., 120), the user interface (e.g., 724, 726, 728) at the first location in the three-dimensional environment. In some embodiments, if the first location is no longer in the field of view of the display generation component after the viewpoint of the user moves, the electronic device forgoes displaying the user interface of the application, though the user interface of the application remains at the first location in the three-dimensional environment. In some embodiments, the mini-player user interface is "body locked" in the three-dimensional environment to the viewpoint of the user and the full user interface is "world locked" in the three-dimensional environment.

Maintaining the location in the three-dimensional environment at which the user interface is displayed when the user interface does not satisfy the one or more criteria provides an efficient way of allowing the user to view other user interfaces and content in the three-dimensional environment by changing their viewpoint without obstruction or distraction by the user interface of the application, thereby reducing cognitive burden on the user.

FIGS. 9A-9F illustrate examples of how an electronic device updates user interface elements in a user interface in response to detecting a change in pose of a respective portion of a user of the electronic device in accordance with some embodiments.

Figure 9A:
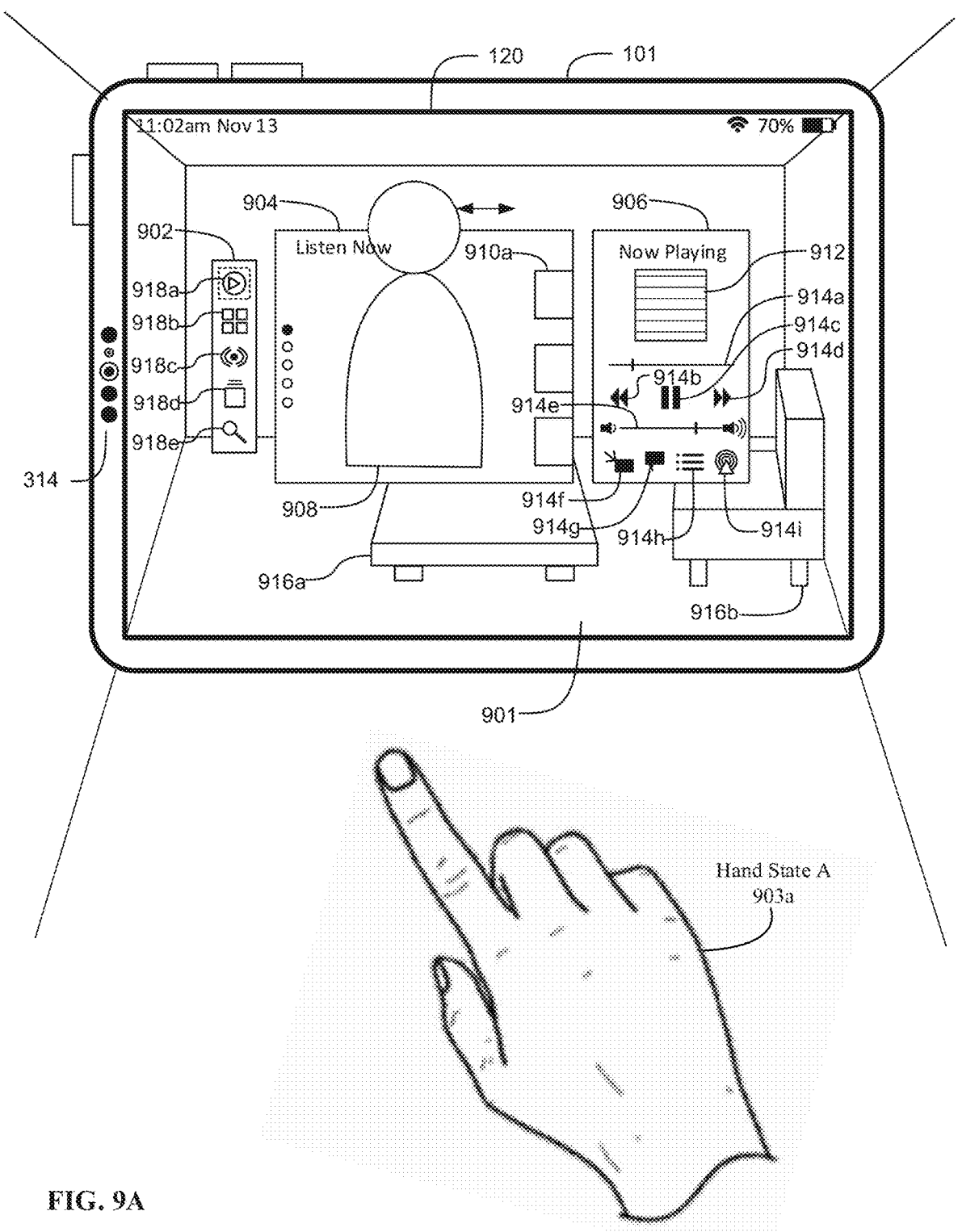
FIGS. 9A-9F illustrate examples of how an electronic device updates display of interactive user interface elements in response to detecting a respective pose of a respective portion of a user of the electronic device in accordance with some embodiments.

FIG. 9A illustrates an electronic device 101 displaying, via a display generation component 120, a three-dimensional environment 901. It should be understood that, in some embodiments, electronic device 101 utilizes one or more techniques described with reference to FIGS. 9A-9F in a two-dimensional environment without departing from the scope of the disclosure. As described above with reference to FIGS. 1-6, the electronic device 101 optionally includes a display generation component 120 (e.g., a touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

In some embodiments, the electronic device 101 displays user interfaces of a content (e.g., streaming, delivery, playback, browsing, library, sharing, etc.) application in the three-dimensional environment 901. In some embodiments, the content application includes a mini-player user interface and an expanded user interface. In some embodiments, the mini player user interface includes playback control elements that, in response to user inputs directed to the playback control elements, cause the electronic device 101 to modify playback of a content item playing via the content application, and artwork (e.g., album artwork) associated with the content item currently playing via the content application. In some embodiments, the expanded user interface includes a greater number of user interface elements (e.g., containers such as windows, platters, or backplanes; selectable options, content, etc.) than the mini player user interface. In some embodiments, the expanded user interface includes a navigation element 902, a content browsing element 904, and a playback element 906. In some embodiments, the electronic device 101 updates selectable user interface elements included in the expanded user interface of the content application in response to detecting a change in a pose of a respective portion of a user of the electronic device 101 (e.g., hand 903a of the user of the electronic device 101). The expanded user interface is described in more detail below with reference to FIGS. 9A-9F and additionally with reference to method 800 above.

As shown in FIG. 9A, the three-dimensional environment 901 includes representations of real objects, such as a representation 916a of a table and a representation 916b of a sofa in addition to the elements 902, 904, and 906 of the expanded user interface of the content application. In some embodiments, the representations of real objects are displayed via the display generation component 120 (e.g., virtual or video passthrough) or are views of the real objects through a transparent portion of the display generation component 120 (e.g., real passthrough).

In some embodiments, the expanded user interface of the content application includes navigation element 902. The navigation element 902 includes a plurality of selectable options 918a-e that, when selected, causes the electronic device 101 to navigate to a different user interface of the content application in the content browsing element 904 of the expanded user interface. In FIG. 9A, the "listen now" option 918a is currently selected, so the electronic device 101 presents a user interface for browsing content items recommended to the user based on the content consumption history of the user. In some embodiments, in response to detecting selection of a "browse" option 918b, the electronic device 101 presents a content browsing user interface in the content browsing element 904 that includes user interface elements for browsing content items based on genre, artist, playback charts for all users of the content delivery service associated with the content application, and the like. In some embodiments, in response to detecting selection of a "radio" option 918c, the electronic device 101 presents a radio user interface in the content browsing element 904 that includes information about and selectable options to initiate playback of internet-based radio shows and stations available via the content delivery service associated with the content application. In some embodiments, in response to detecting selection of a "library" option 918d, the electronic device 101 presents a user interface in the content browsing element 904 that includes representations of content items in a content library associated with a user account of the user of the electronic device 101. In some embodiments, in response to detecting selection of a "search" option 918e, the electronic device 101 displays a search user interface in the content browsing element 904 that includes a user interface element for providing a search term to be searched in the content delivery service associated with the content application.

In some embodiments, the expanded user interface of the content application includes a content browsing element 904 displaying the "Listen Now" user interface described above. FIG. 9A illustrates the electronic device 101 displaying the expanded user interface of the content application while the hand 903a of the user is in a pose that does not correspond to a ready state or a selection input (e.g., Hand State A). While the hand 903a of the user is in Hand State A, the content browsing element 904 includes a three-dimensional image 908 corresponding to a content item recommended for playback by the user and a plurality of representations 910a of content items recommended for playback by the user. In some embodiments, three-dimensional image 908 extends beyond the boundaries of the content browsing element 904 and is displayed with a parallax effect that causes the three-dimensional image 908 to shift and/or rotate in accordance with movement of the viewpoint of the user corresponding to movement of a portion of the user (e.g., the user's gaze, head, torso, body, etc.). In some embodiments, while the hand 903a of the user is in Hand State A, the electronic device 101 displays the representations 910a of content items at locations in the content browsing element 904 that do not overlap the three-dimensional image 908. In some embodiments, the electronic device 101 displays portions of the representations 910a of content items while the hand 903a of the user is in Hand State A without displaying additional portions of the representations 910a that extend beyond the right boundary of the content browsing element 904. In some embodiments, one of the representations 910a corresponds to the same content item as the content item corresponding to image 908. In some embodiments, the image 908 corresponds to a content item different from the content items corresponding to representations 910a.

As described above, FIG. 9A includes an illustration of the hand 903a of the user in Hand State A, which corresponds to hand shape, pose, location, etc. that does not correspond to a ready state or an input, such as the hand of the user near the user's lap or torso or in a hand shape that does not correspond to a ready state. In some embodiments, the electronic device 101 is able to detect an indirect ready state, a direct ready state, an air gesture ready state, and/or an input device ready state. In some embodiments, detecting the indirect ready state includes detecting (e.g., via one or more of input devices 314) the hand 903a of the user in a ready state pose, such as a pre-pinch gesture in which the thumb is within a threshold distance (e.g., 0.5, 1, 2, 3, 4, or 5 centimeters) of, but not touching, another finger of the hand or a pointing hand shape in which one or more fingers are extended and one or more fingers are curled towards the palm while the hand 903a is within a predefined threshold distance (e.g., 1, 2, 3, 5, 10, 15, or 30 centimeters) of a respective interactive user interface element. In some embodiments, detecting the indirect ready state includes detecting (e.g., via one or more of input devices 314) the hand 903a of the user in a ready state pose, such as the pre-pinch hand shape, while detecting (e.g., via one or more of input devices 314) the gaze of the user is directed to a respective interactive user interface element. In some embodiments, detecting an air gesture ready state includes detecting (e.g., via one or more of input devices 314) the hand 903a in the ready state pose, such as the pointing hand shape within a threshold distance (e.g., 1, 2, 3, 5, 10, 15, or 30 centimeters) of an input element displayed via display generation component 120 while detecting (e.g., via one or more of input devices 314) the gaze of the user directed to a respective interactive user interface element. In some embodiments, detecting the input device ready state includes detecting a predefined portion of the user (e.g., a hand 903a of the user) proximate to, but not providing input to, a mechanical input device in communication with the electronic device 101 (e.g., a stylus, trackpad, mouse, keyboard, etc.), optionally while a cursor controlled by the input device corresponds to a respective interactive user interface element or optionally while detecting (e.g., via one or more of input devices 314) the gaze of the user directed to the respective interactive user interface element. As will be described in more detail below with reference to FIG. 9C, in response to detecting the ready state directed to a portion of the user interface (e.g., the content browsing element 906, the content playback element 908), the electronic device 101 updates a plurality of selectable elements of the portion of the user interface to which the ready state is directed.

In some embodiments, the electronic device 101 detects selection of a respective user interface element by detecting an indirect selection input, a direct selection input, an air gesture selection input, or an input device selection input. In some embodiments, detecting a selection input includes first detecting a ready state corresponding to the type of selection input being detected (e.g., detecting an indirect ready state before detecting an indirect selection input, detecting a direct ready state before detecting a direct selection input). In some embodiments, detecting an indirect selection input includes detecting, via input devices 314, the gaze of the user directed to a respective user interface element while detecting the hand of the user make a selection gesture, such as a pinch hand gesture in which the user touches their thumb to another finger of the hand. In some embodiments, detecting a direct selection input includes detecting, via input devices 314, the hand of the user makes a selection gesture, such as the pinch gesture within a predefined threshold distance (e.g., 1, 2, 3, 5, 10, 15, or 30 centimeters) of the location of the respective user interface element or a pressing gesture in which the hand of the user "presses" the location of the respective user interface element while in a pointing hand shape. In some embodiments, detecting an air gesture input includes detecting the gaze of the user directed to a respective user interface element while detecting a pressing gesture at the location of an air gesture user interface element displayed in the three-dimensional environment 901 via display generation component 120. In some embodiments, detecting an input device selection includes detecting manipulation of a mechanical input device (e.g., a stylus, mouse, keyboard, trackpad, etc.) in a predefined manner corresponding to selection of a user interface element while a cursor controlled by the input device is associated with the location of the respective user interface element and/or while the gaze of the user is directed to the respective user interface element.

Returning to FIG. 9A, in some embodiments, the expanded user interface of the content application includes a content playback element 906 that includes an image 912 corresponding to a content item currently playing via the content application on the electronic device 101 (e.g., album artwork) and a plurality of user interface elements 914a-914i that, in response to detecting an input directed to one of the user interface elements 914a-914i, cause the electronic device 101 to modify playback of the content item currently playing via the content application. In some embodiments, the content playback element 906 includes a scrubber bar 914a that indicates the playback position of the electronic device 101 in a content item currently being played via the content application and, in response to an input directed to the scrubber bar 914a, causes the electronic device 101 to update the playback position in accordance with the input, as opposed to in accordance with continued playback of the content item. In some embodiments, the content playback element 906 includes a skip back option 914b that, when selected, causes the electronic device 101 to restart the content item that is currently playing and/or play a previous content item in a playback queue of the content application. In some embodiments, the content playback element 906 includes a pause option 914c that, when selected, causes the electronic device 101 to pause playback of the content item and update the option 914c to be a play option that, when selected, causes the electronic device 101 to resume playback of the content item (e.g., from the playback position at which the content item was paused). In some embodiments, the content playback element 906 includes a skip ahead option 914d that, when selected, causes the electronic device 101 to play the next content item in the content item playback queue of the content application. In some embodiments, the content playback element 906 includes a slider 914e that, in response to an input manipulating the slider 914e, causes the electronic device 101 to modify the playback volume of the content item on the electronic device 101. In some embodiments, the content playback element 906 includes an option 914f that, when selected, causes the electronic device 101 to cease display of the expanded user interface of the content application and display the mini player user interface of the content application described above with reference to method 800. In some embodiments, the content playback element 906 includes an option 914g that, when selected, causes the electronic device 101 to display time-synced lyrics of the content item (e.g., within the content playback element 906). The time-synced lyrics are optionally generated and/or displayed in accordance with one or more steps of method 800. In some embodiments, the content playback element 906 includes a playback queue option 914h that, when selected, causes the electronic device 101 to display indications of content items included in a content playback queue that the electronic device 101 is configured to play, in the order in which they are displayed, after playing the content item currently playing via the content application. In some embodiments, the electronic device 101 displays the content item playback queue in the content playback element 906. In some embodiments, the content playback element 906 includes an option 914i for displaying one or more audio output settings to configure the output of the audio portion of the content item (e.g., selecting an output device).

Figure 9B:
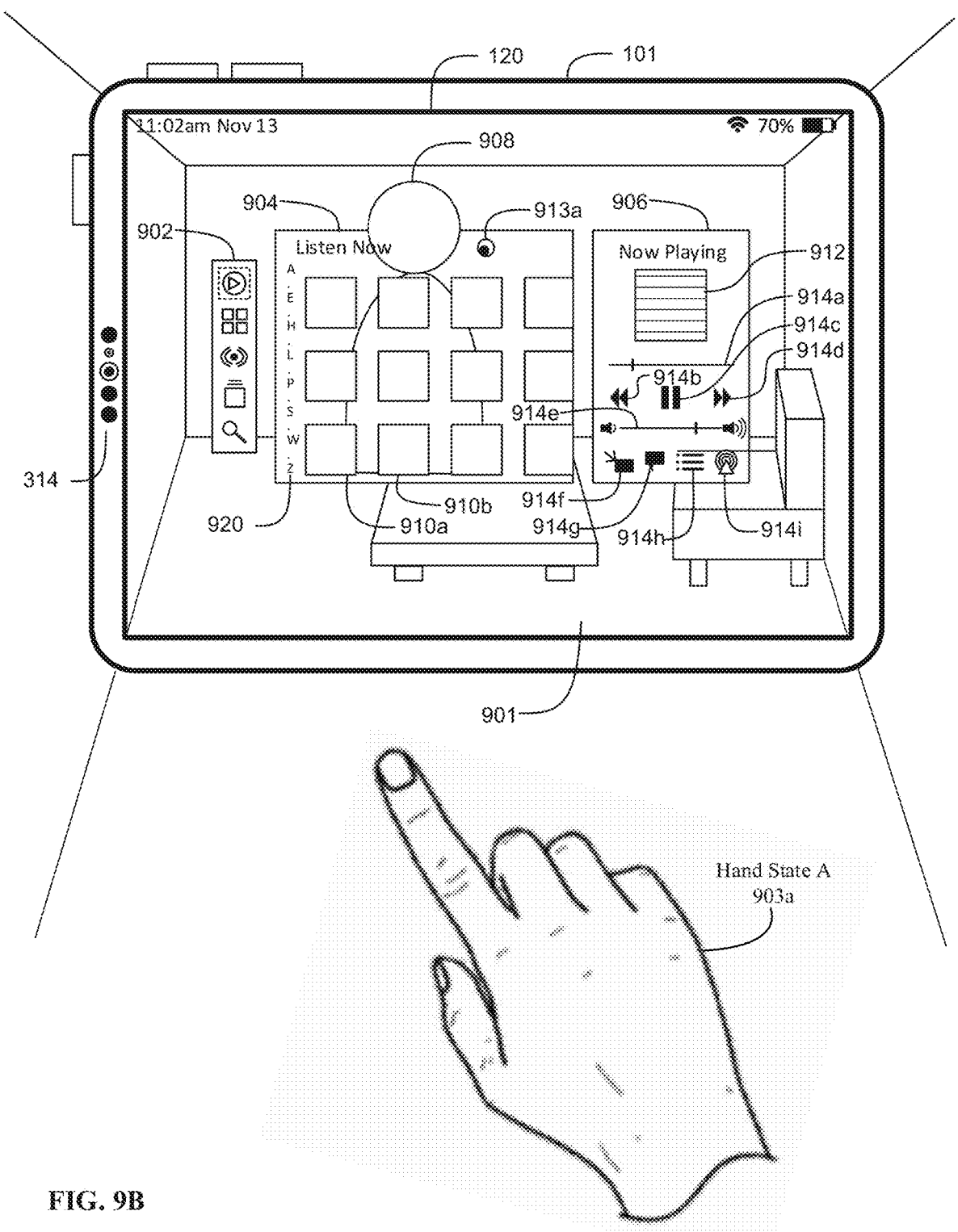

FIG. 9B illustrates an example of the electronic device 101 updating the content browsing element 904 in response to detecting the gaze 913a of the user directed to the content browsing element 904 while the hand 903a is in Hand State A. In some embodiments, in response to detecting the gaze 913a of the user directed to the content browsing element 904 while the hand 903a is in Hand State A, the electronic device 101 updates the positions of the representations 910a of content items illustrated in FIG. 9A by sliding the representations 910a from right to left, for example, including displaying the portions of the representations 910a that were displayed in FIG. 9A and portions of the representations 910a that were not displayed in FIG. 9A. Also, in some embodiments, in response to detecting the gaze 913a of the user directed to the content browsing element 904 while the hand 903a is in Hand State A, the electronic device 101 displays additional representations 910b of content items not displayed in FIG. 9A and an alphabetical scroll bar 920. In some embodiments, the representations 910a and 910b are arranged alphabetically (e.g., by artist, content item title, content item collection (e.g., album, playlist) title) and, in response to detecting selection of a respective portion of the alphabetical scroll bar 920, the electronic device 101 scrolls the representations 910a and 910b to representations of content items corresponding to the letter of the respective portion of the alphabetical scroll bar 920. User interactions with the alphabetical scroll bar 920 are described in more detail below with reference to FIGS. 9C-9D. In some embodiments, because the hand 903a is still in Hand State A, the electronic device 101 displays the representations 910a and 910b and the alphabetical scroll bar 920 without visual separation from the background of content browsing element 904. In some embodiments, as shown in FIG. 9B, the representations 910a and 910b are displayed overlaid on the three-dimensional image 908.

Figure 9C:
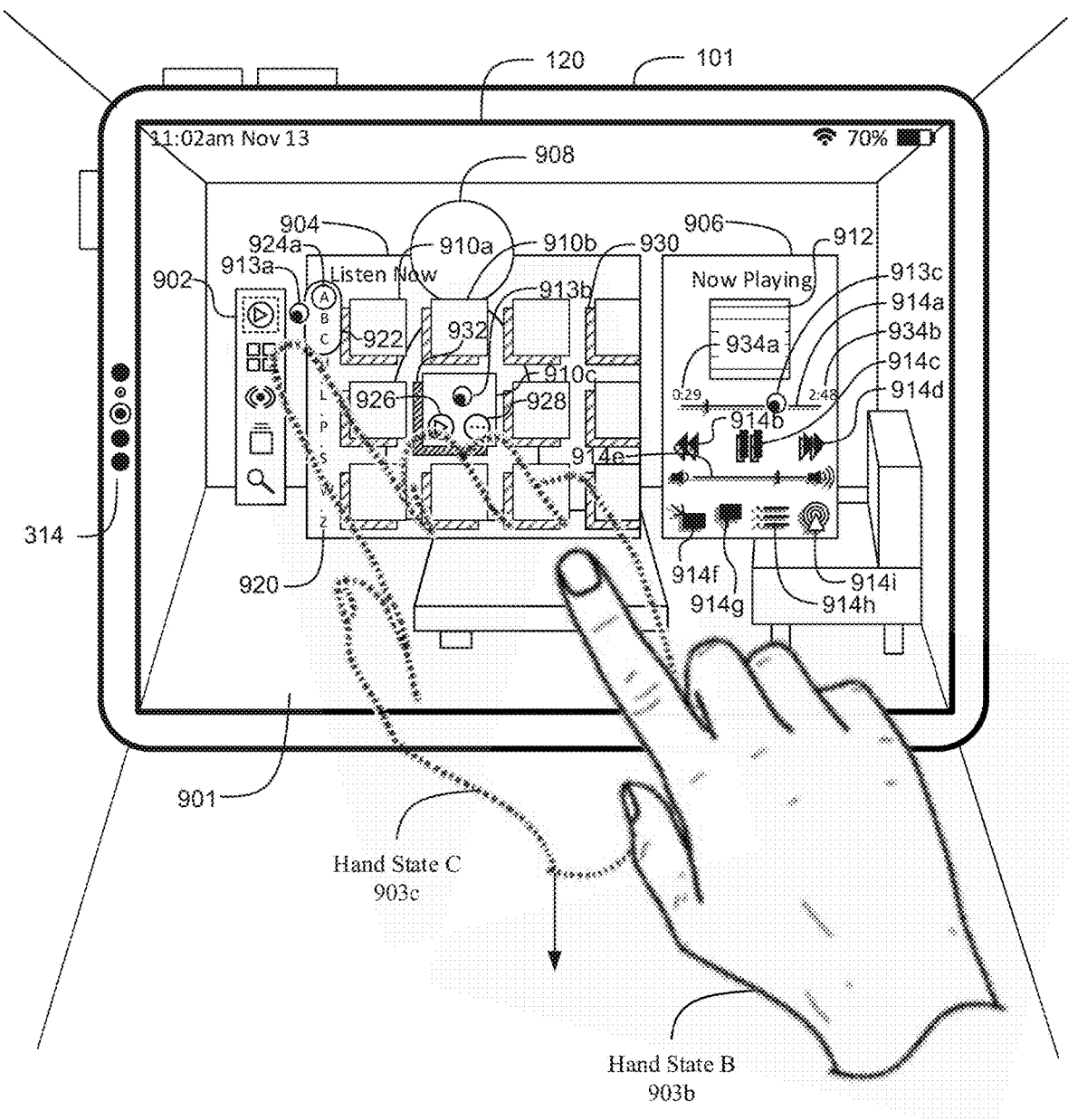
Figure 10A:
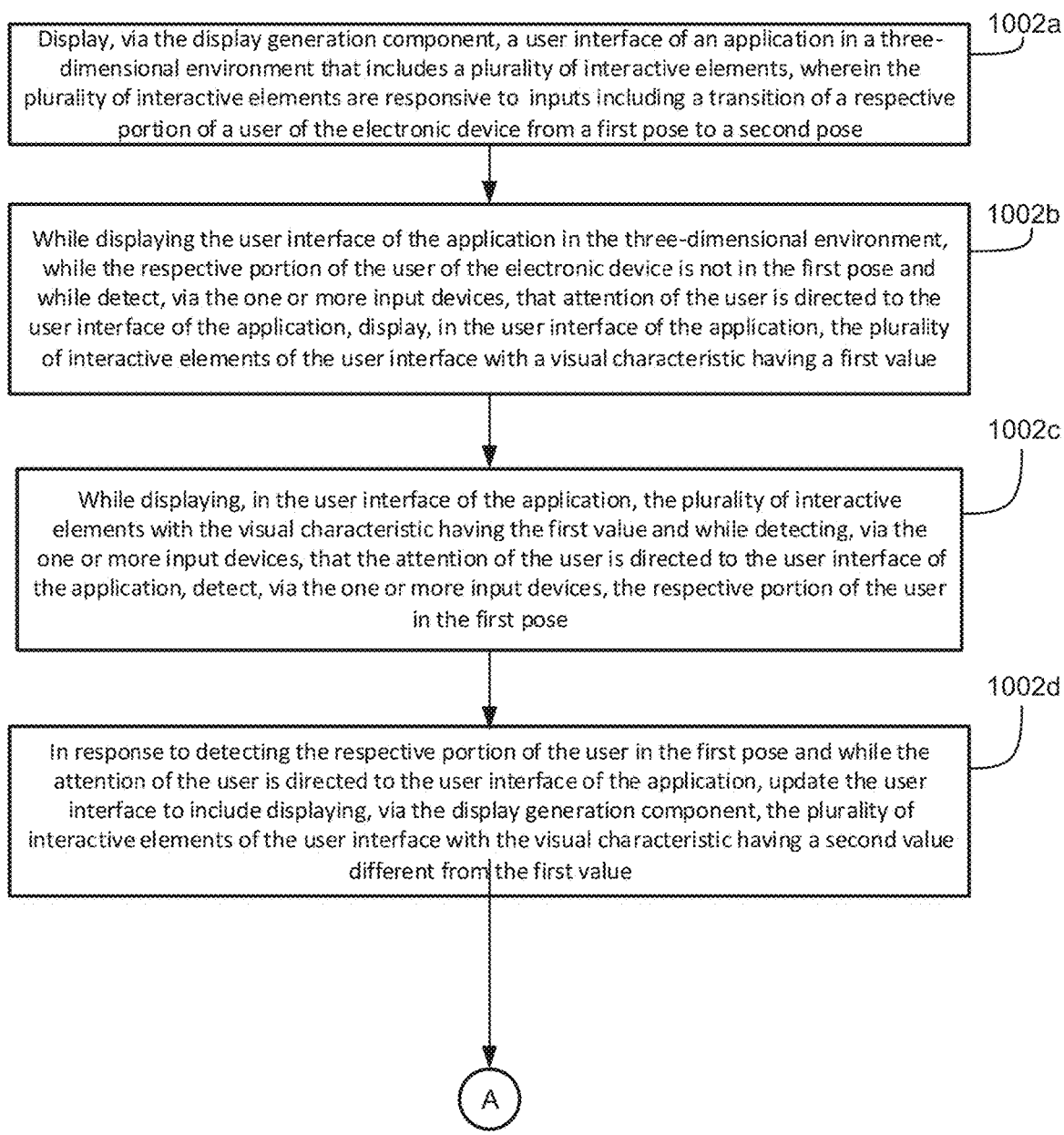
FIGS. 10A-10O is a flowchart illustrating a method of updating display of interactive user interface elements in response to detecting a respective pose of a respective portion of a user of an electronic device in accordance with some embodiments.
Figure 10B:
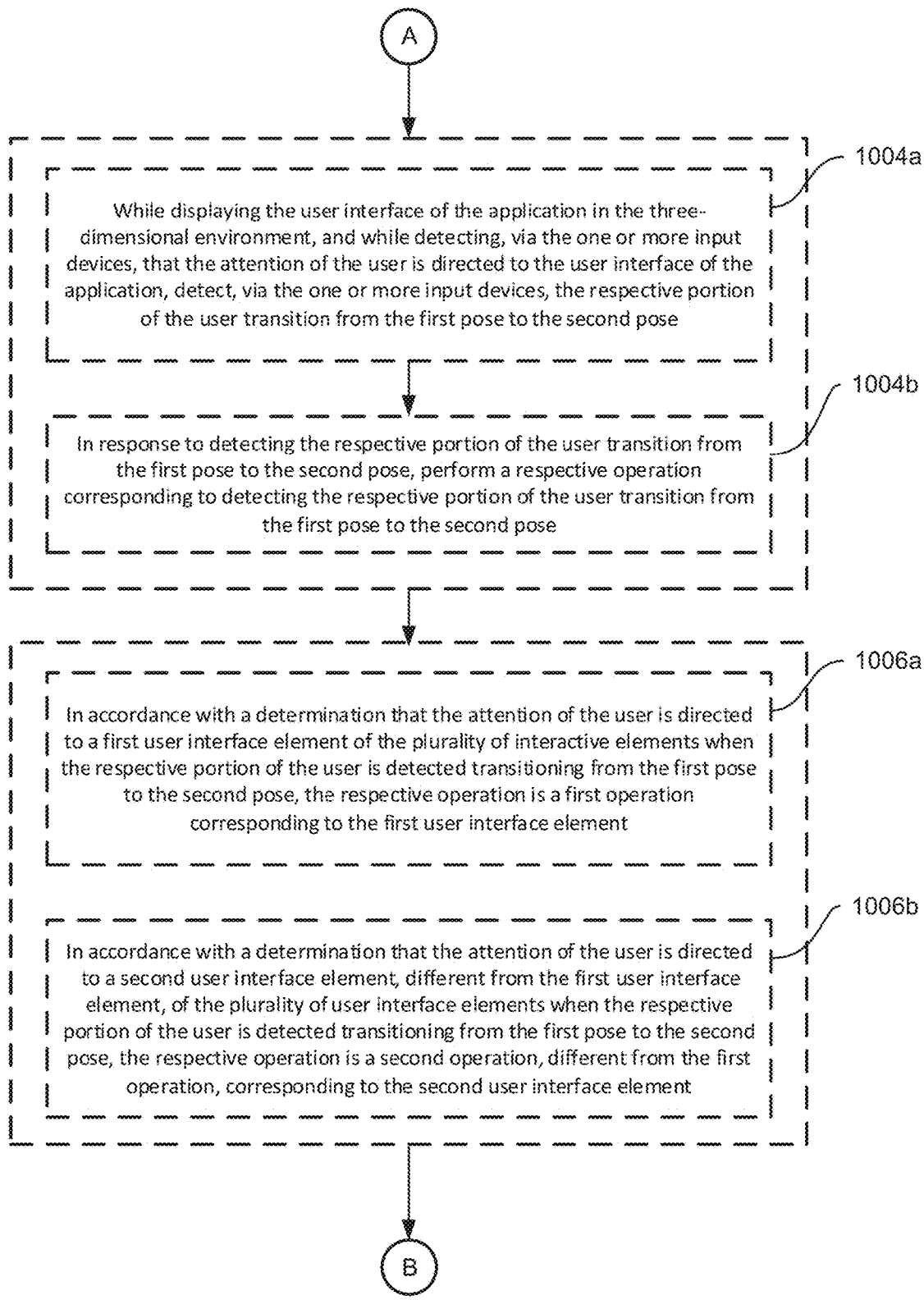
Figure 10C:
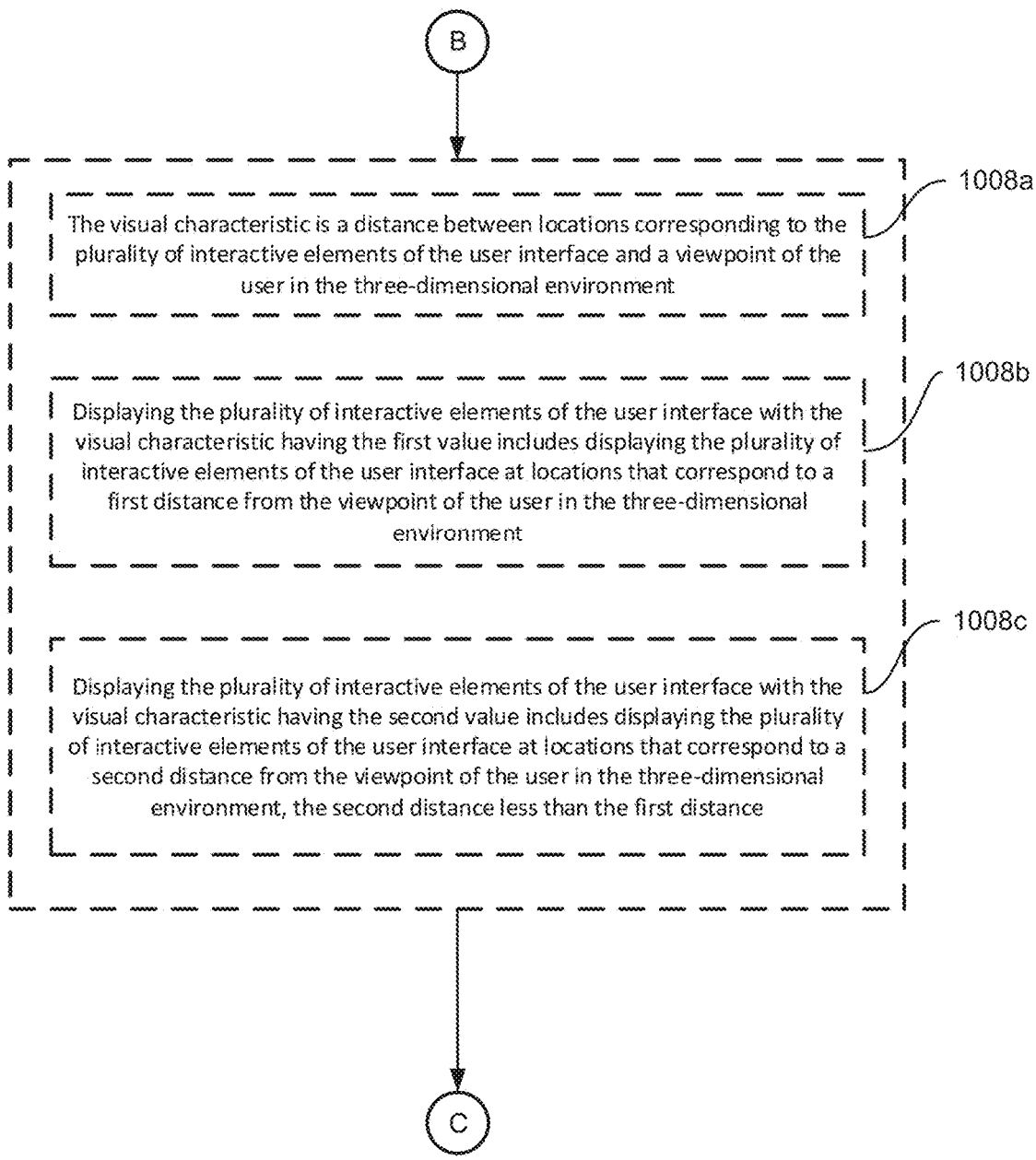
Figure 10D:
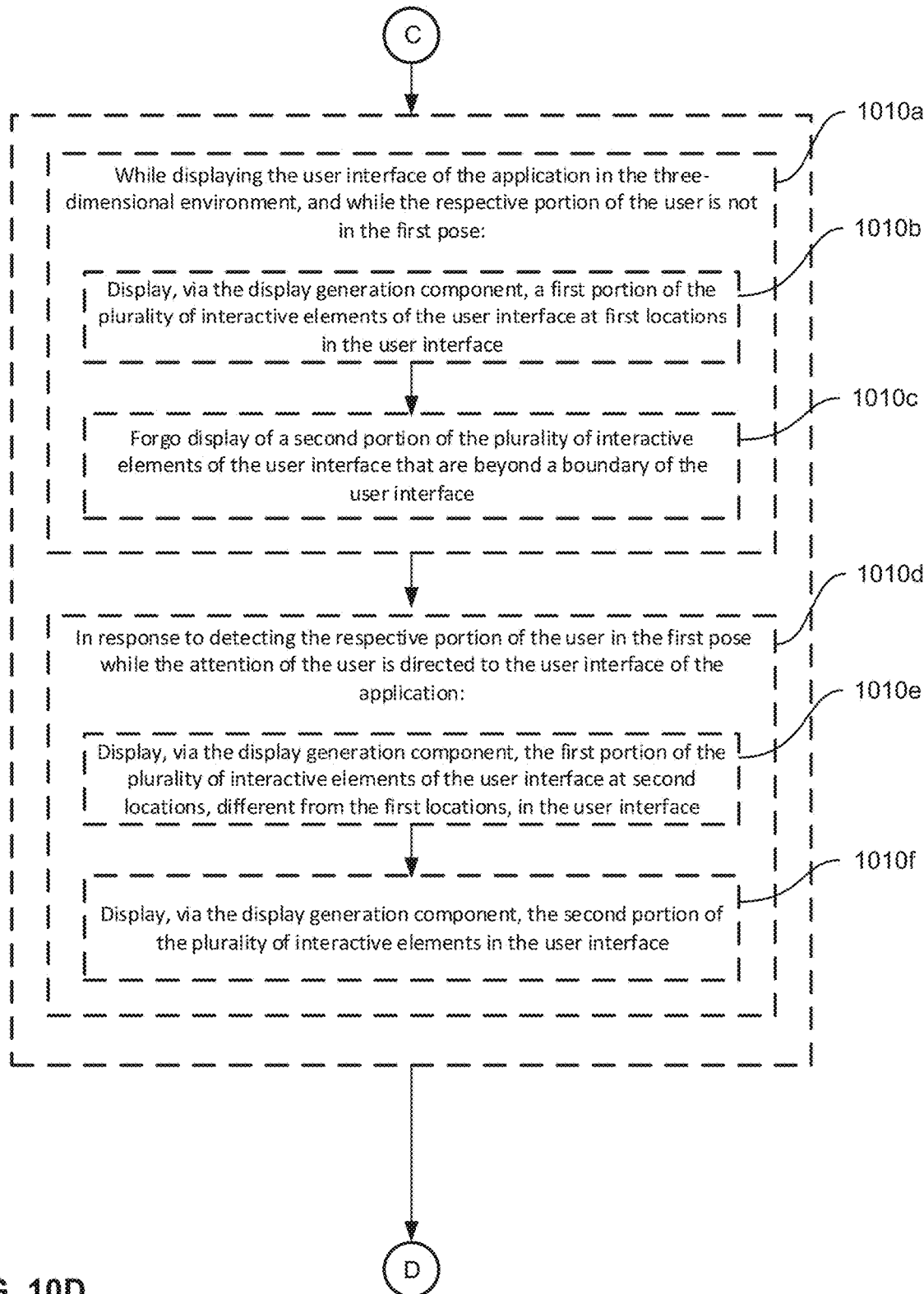
Figure 10E:
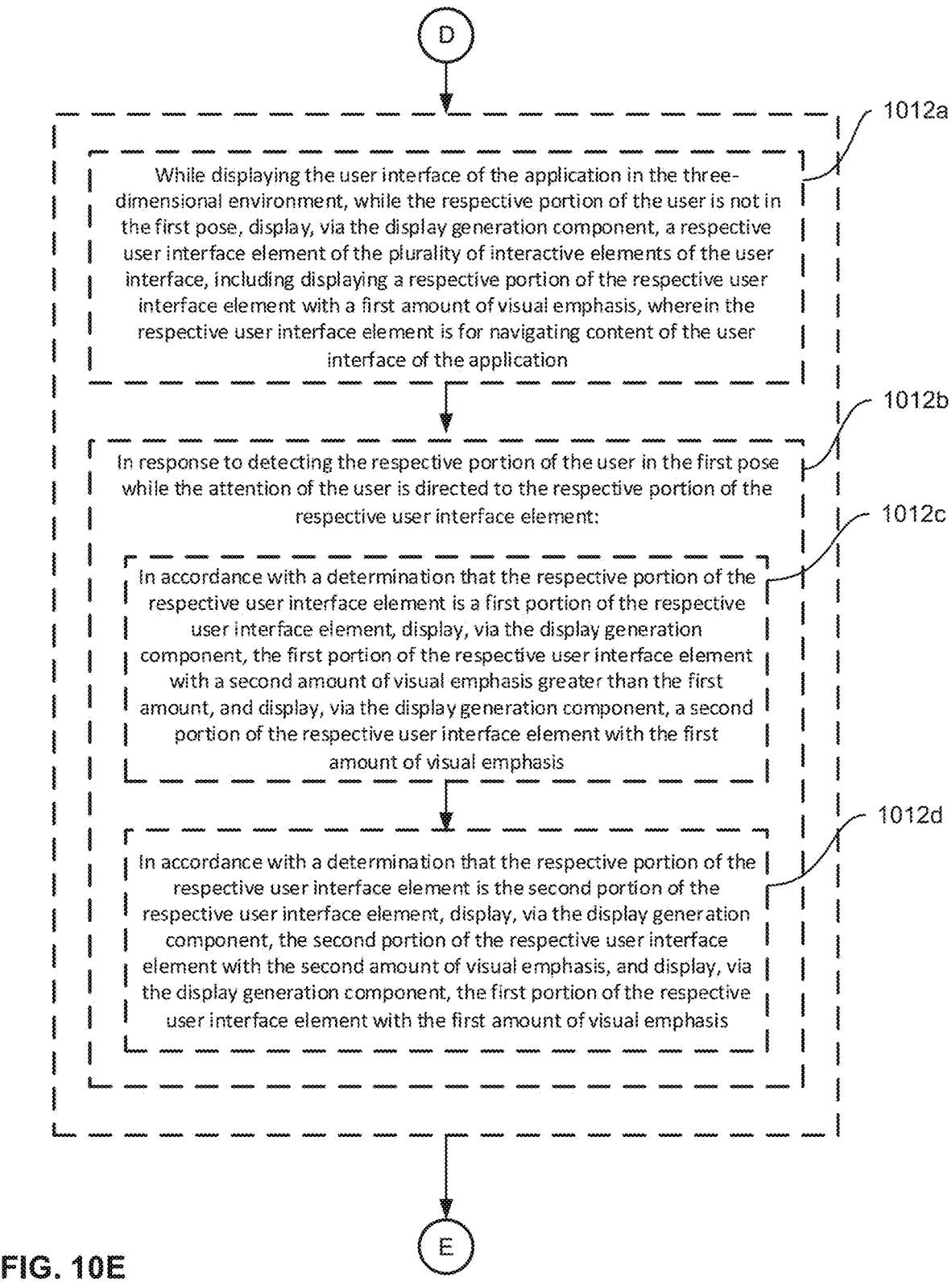
Figure 10F:
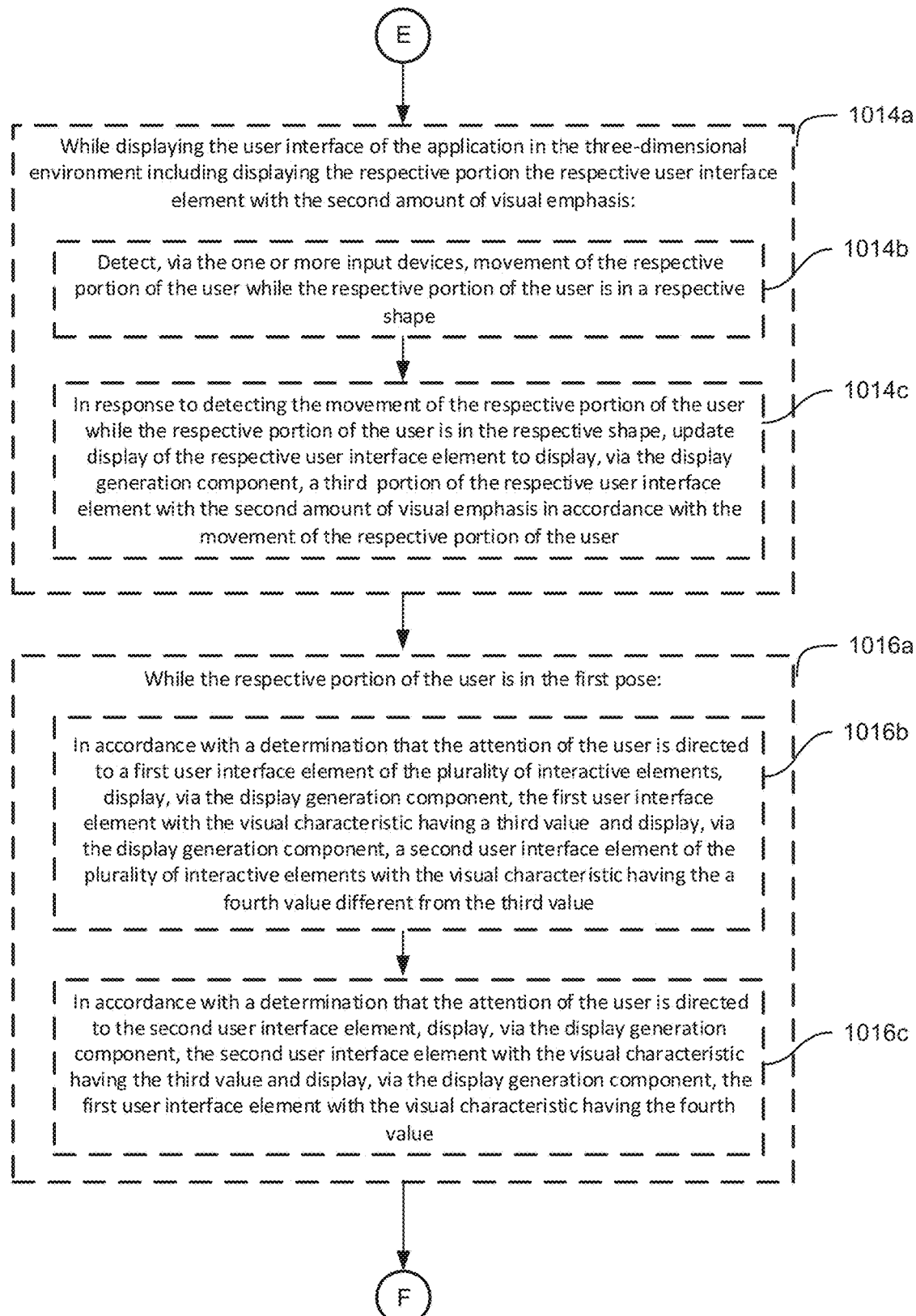
Figure 10G:
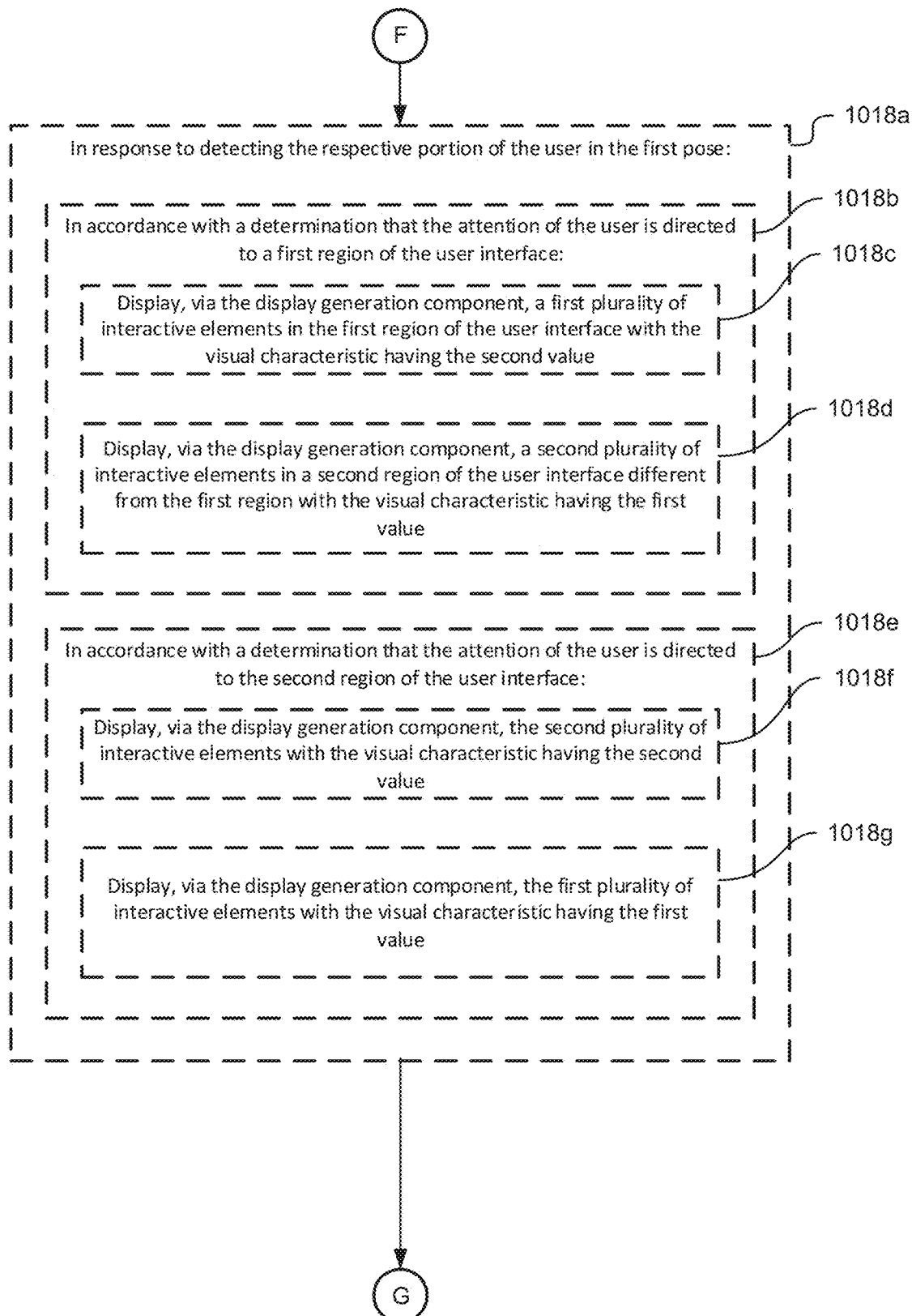
Figure 10H:
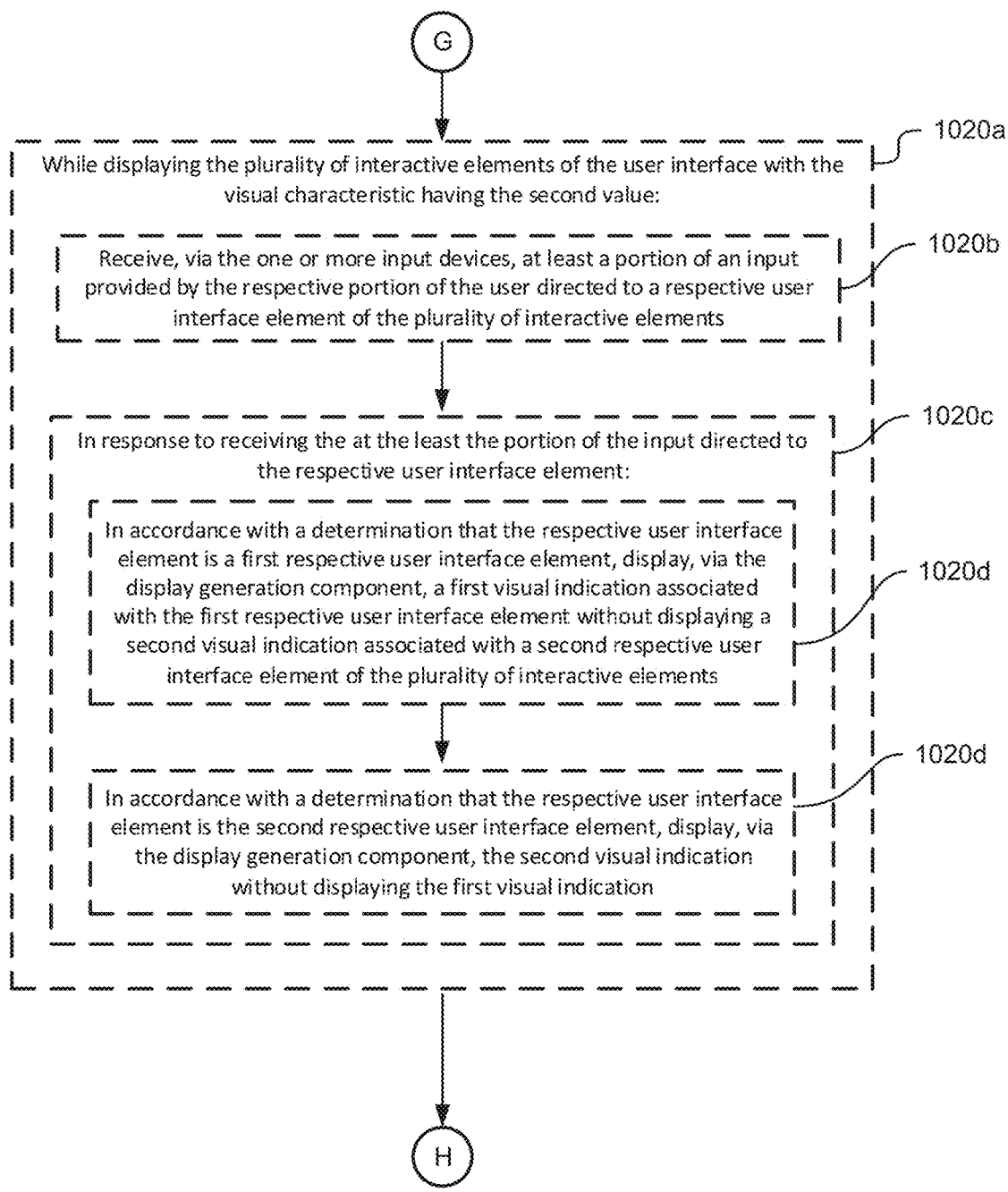
Figure 10I:
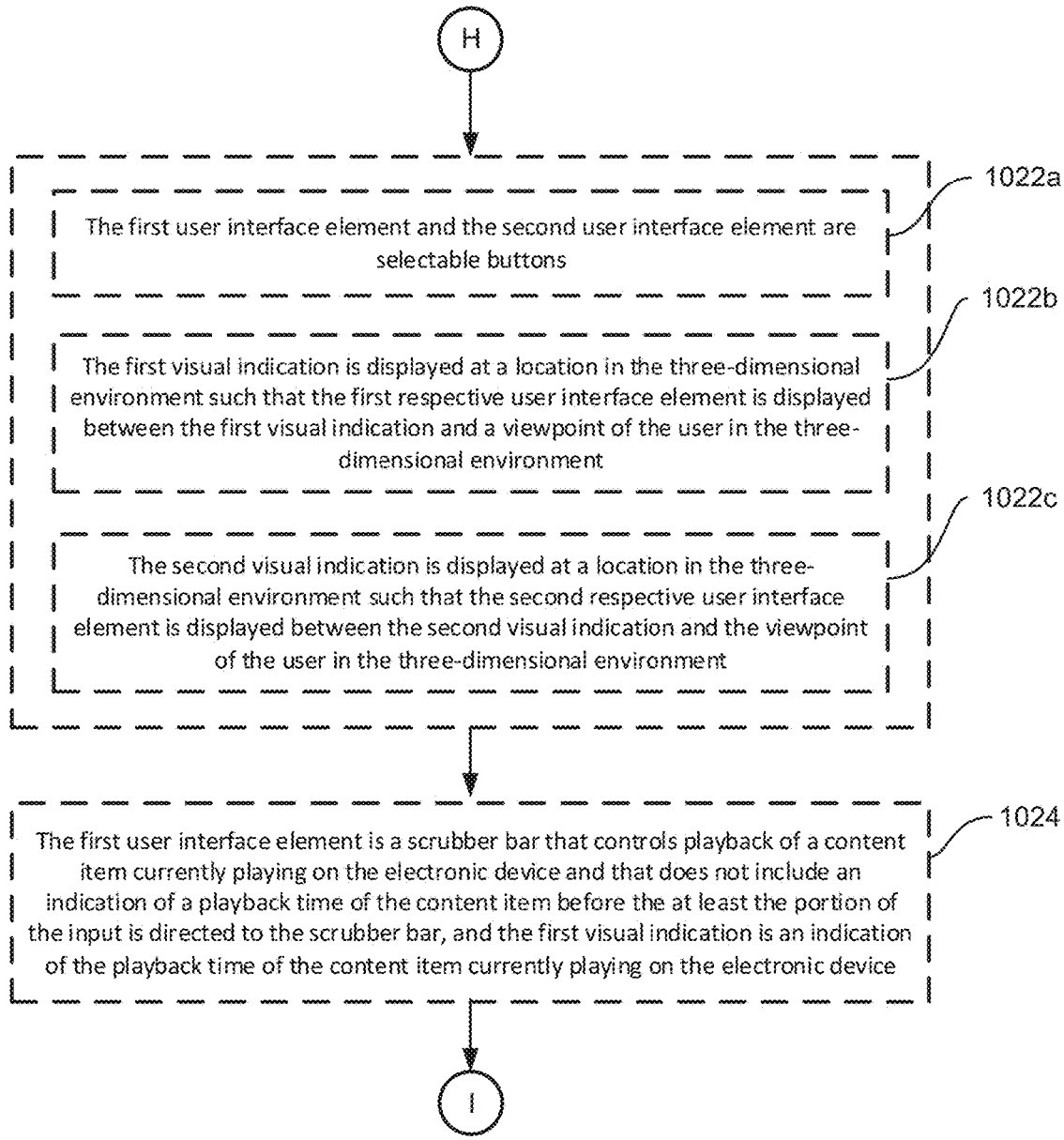
Figure 10J:
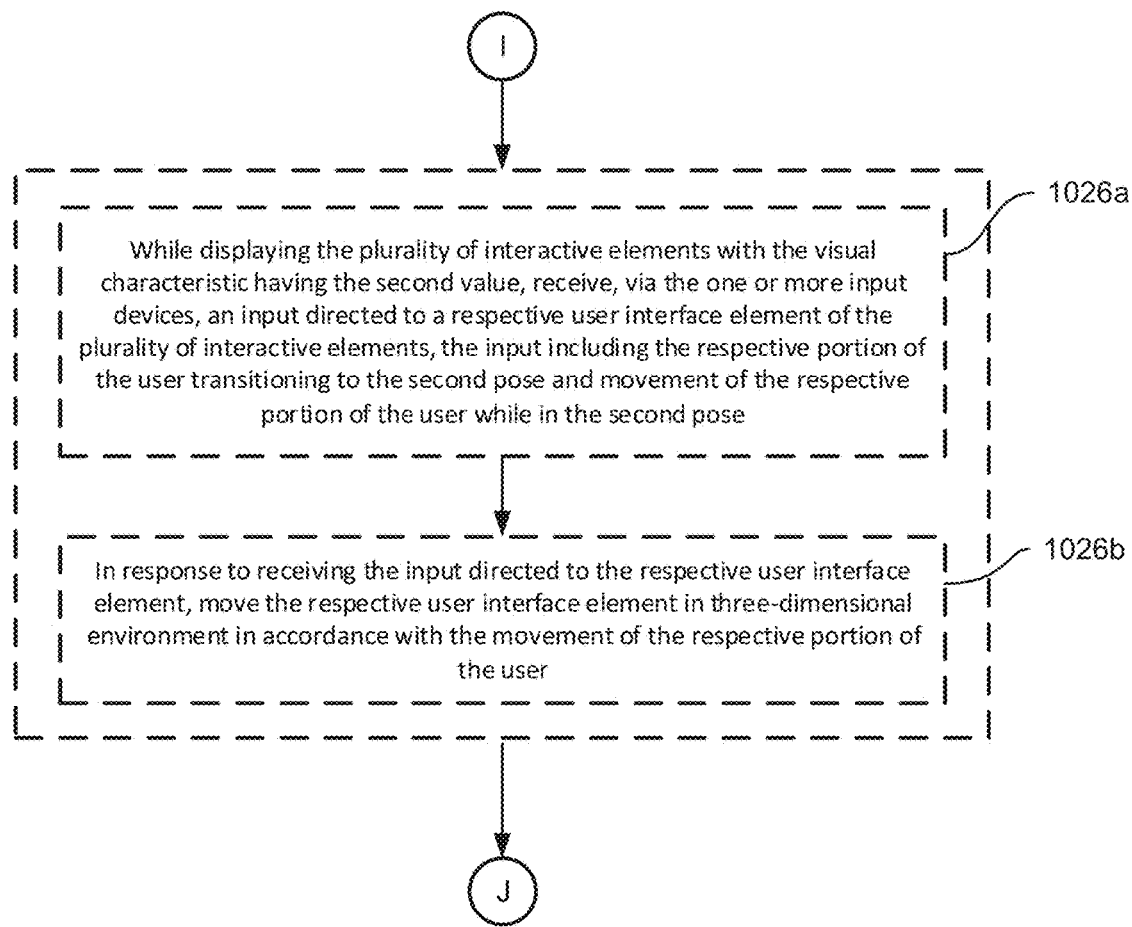
Figure 10K:
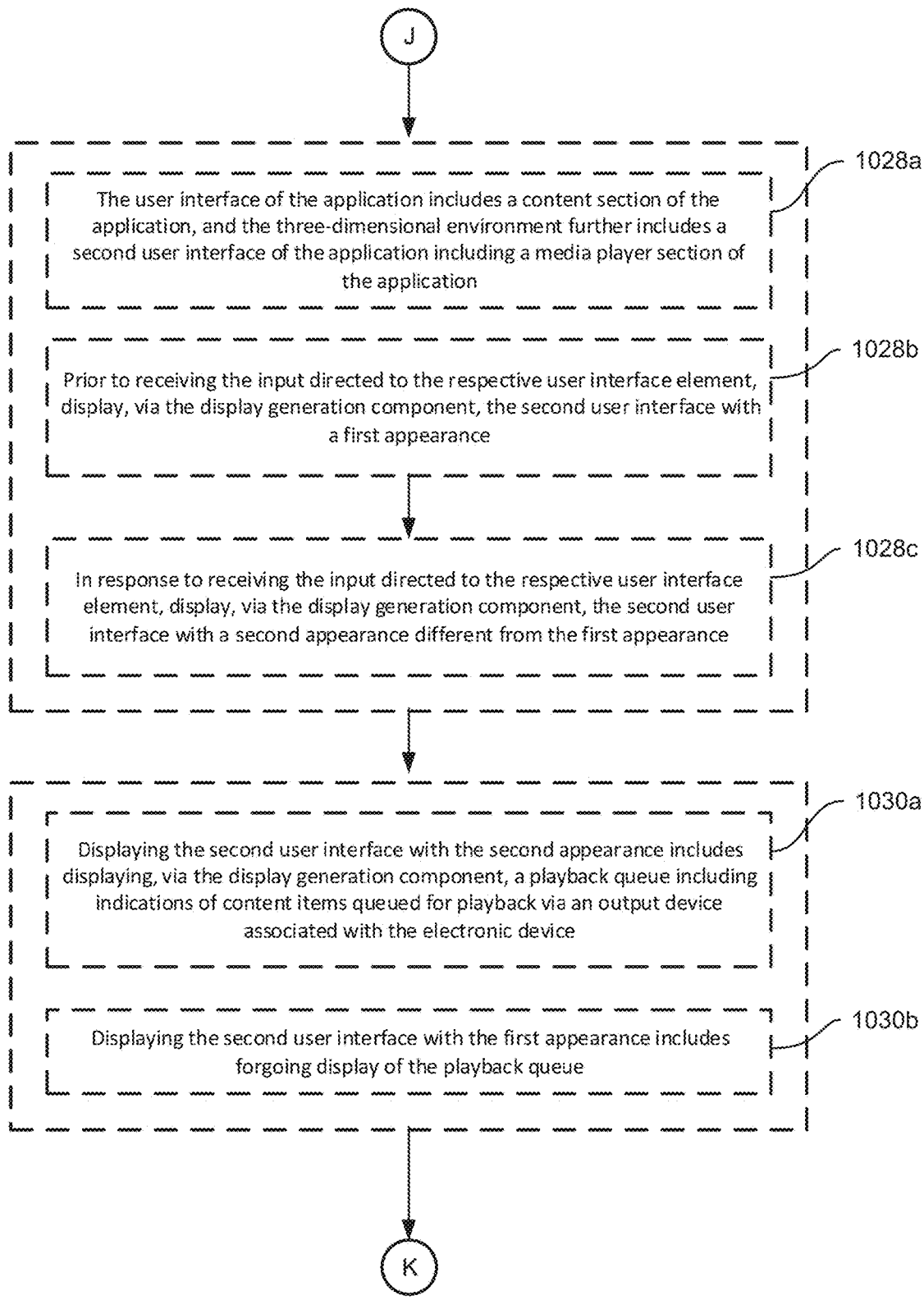
Figure 10L:
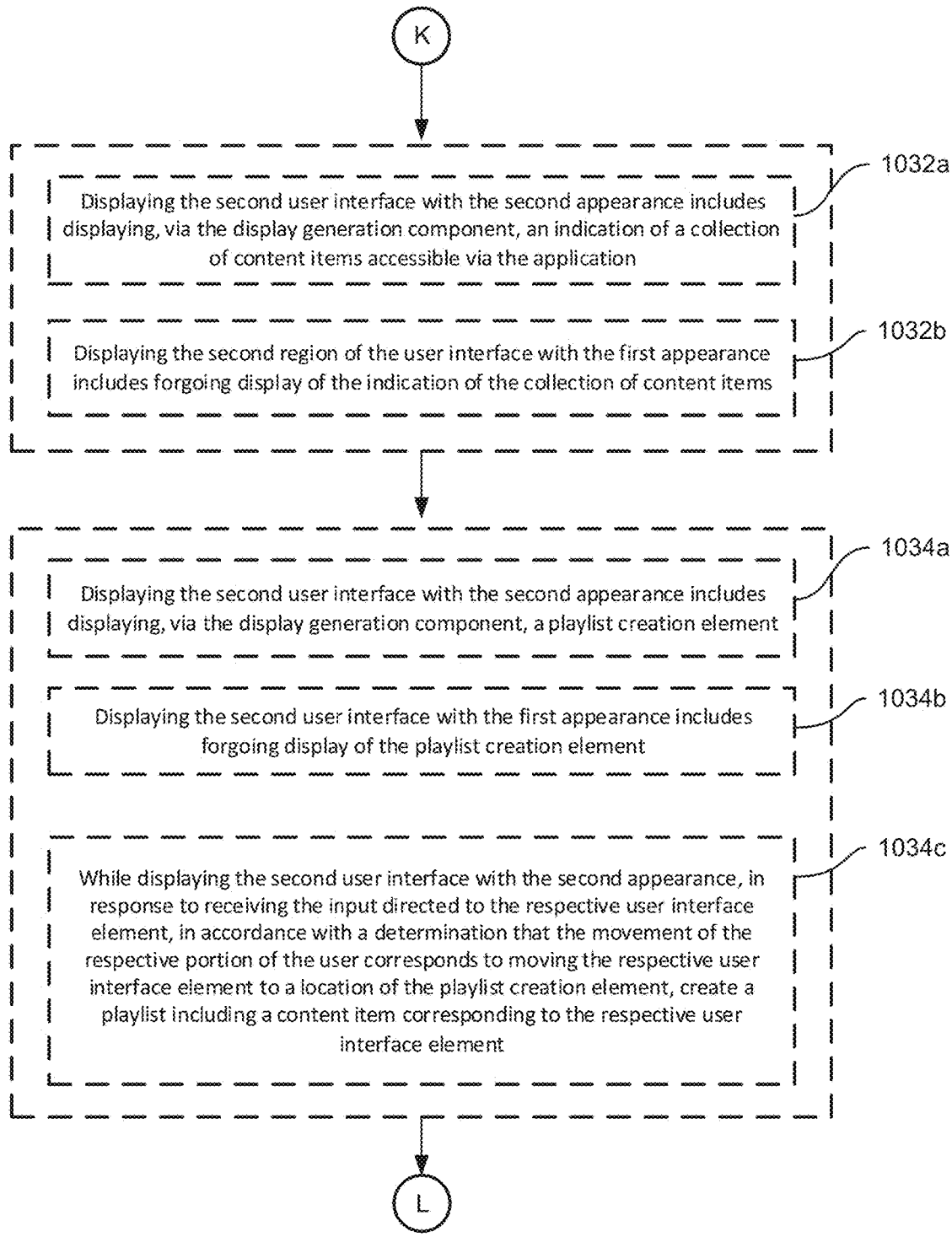
Figure 10M:
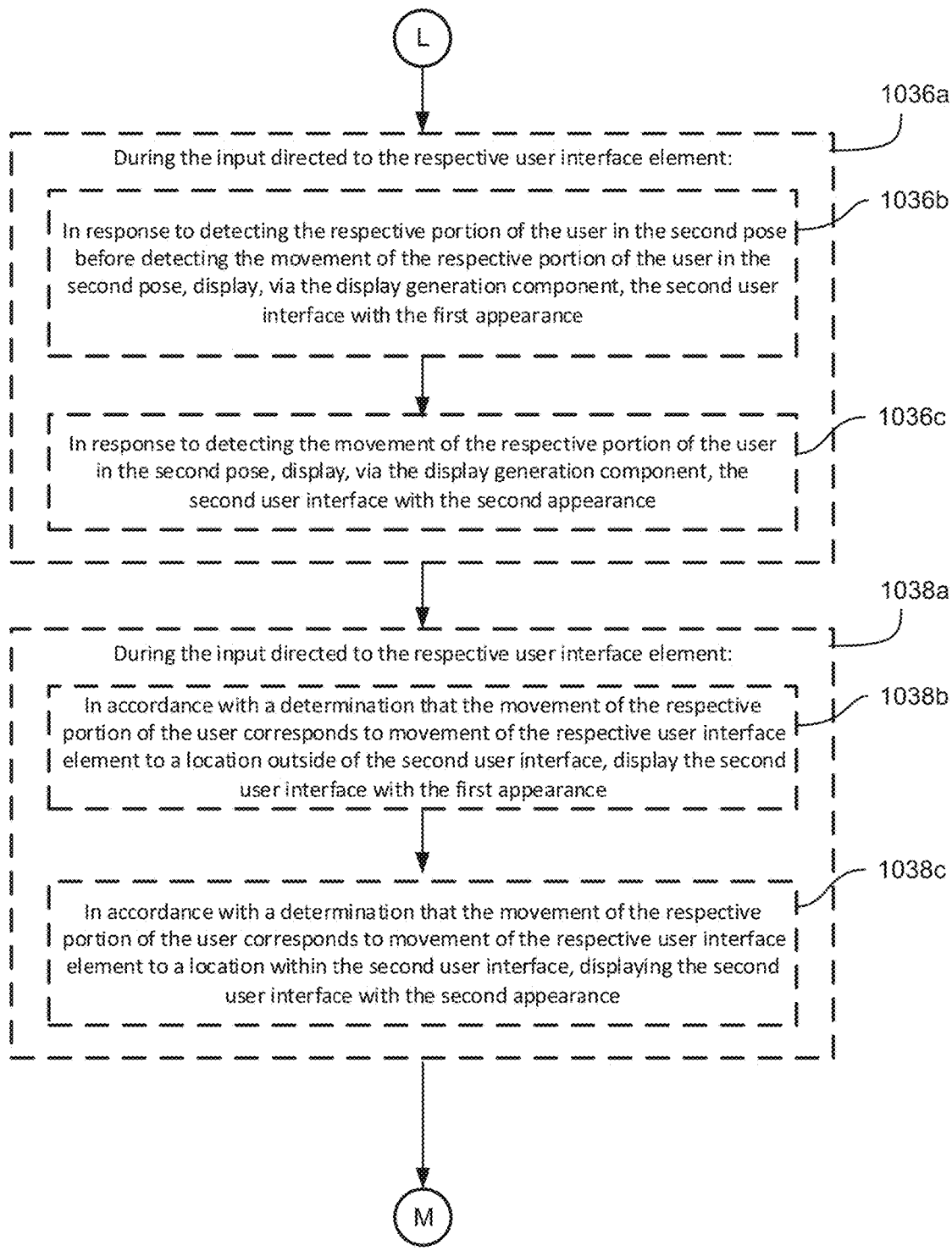
Figure 10N:
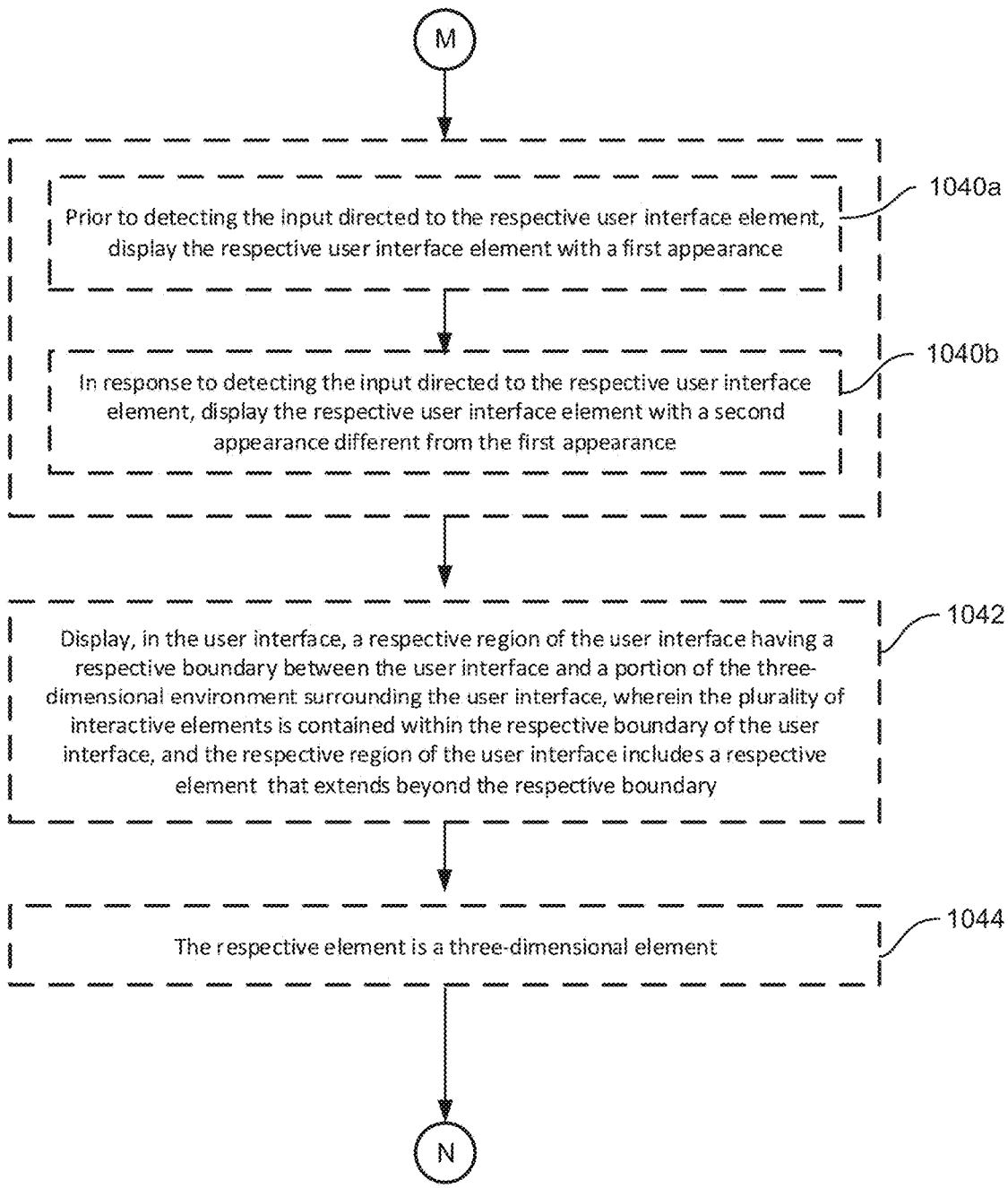
Figure 10O:
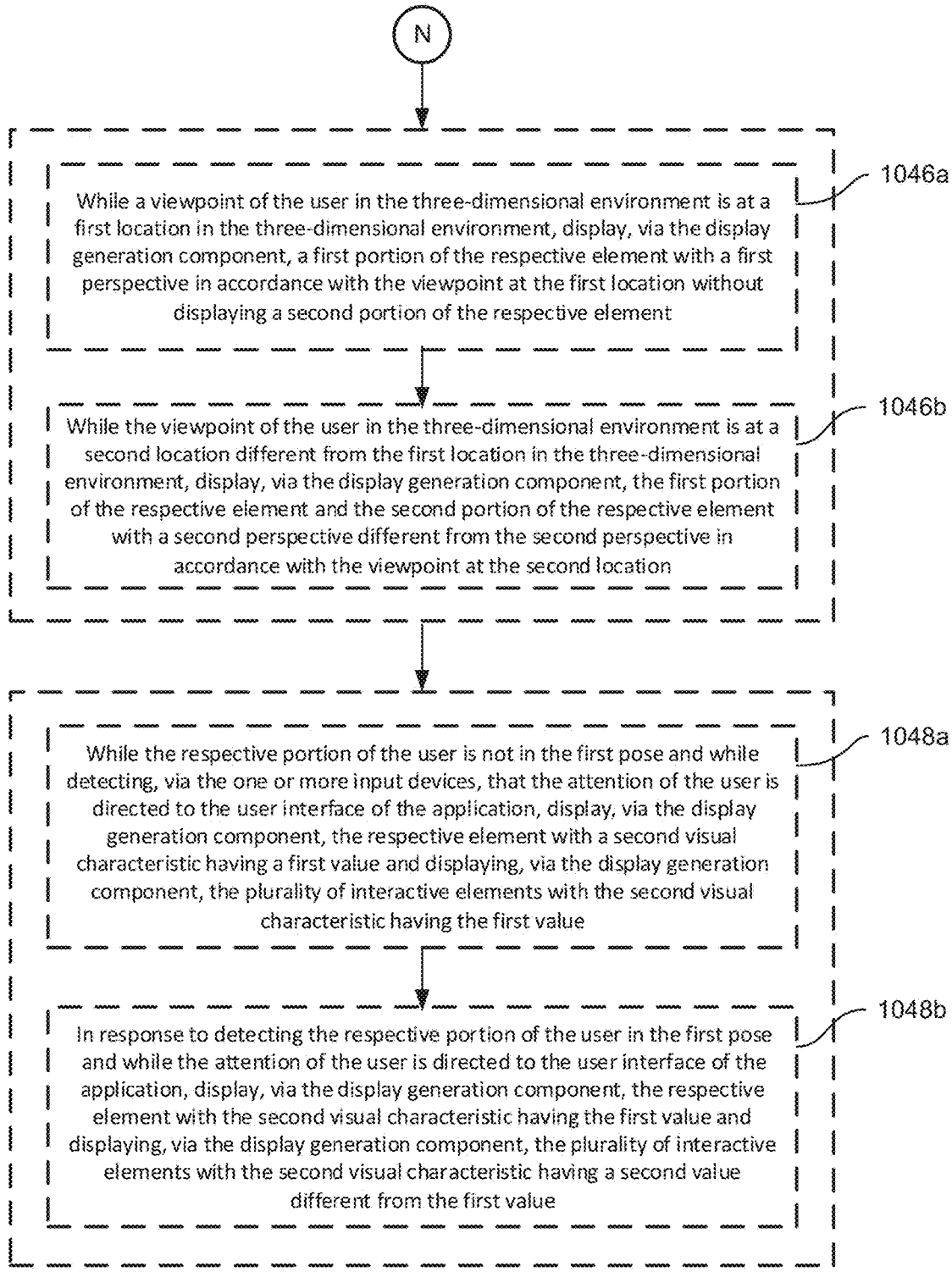

FIG. 9C illustrates an example of the electronic device 101 updating the expanded user interface of the content application in response to detecting the ready state directed to the expanded user interface and an example of user interaction with the alphabetical scroll bar 920. In some embodiments, in response to detecting the gaze of the user directed to one of the elements of the expanded user interface while hand 903b makes a ready state hand shape described above (e.g., Hand State B), the electronic device 101 updates positions of selectable user interface elements within the element of the expanded user interface at which the user is looking to move the selectable elements closer to the viewpoint of the user in the three-dimensional environment, thereby increasing visual separation between the selectable elements and the background of the element of the expanded user interface. For example, in response to a ready state directed to the content browsing element 904, the electronic device 101 updates the positions of representations 910a and 910b to move the representations 910a and 910b closer to the viewpoint of the user. As another example, in response to a ready state directed to content playback element 906, the electronic device 101 updates the positions of selectable options 914a-h to move the selectable options 914a-h closer to the viewpoint of the user.

Although FIG. 9C shows user interface elements in both the content browsing element 904 and the content playback element 906 at updated positions in the three-dimensional environment 901 closer to the viewpoint of the user, it should be understood that, in some embodiments, the electronic device 101 only updates the positions of selectable elements in the element towards which the gaze of the user is directed, which is generally one element at a time. For example, in response to detecting gaze 913b within the content browsing element 904, the electronic device 101 displays the representations 910a-c of content items closer to the viewpoint of the user and increases visual separation between representations 910a-c of content items and the (e.g., background of) content browsing element 904 without displaying the options 914a-i in the content playback element 906 closer to the viewpoint of the user. As another example, in response to detecting the gaze 913c of the user directed to the content playback element 906, the electronic device displays the options 914a-i for modifying playback of the content item with increased visual separation from the (e.g., background of the) content playback element 906 without displaying the representations 910a-c in the content browsing element 904 closer to the viewpoint of the user.

In some embodiments, the electronic device 101 further updates the appearance of a particular selectable element to which the ready state is directed; that is, the particular selected element to which the gaze of the user is directed (e.g., within the content browsing element 904 or content playback element 906) while detecting the hand 903b in the ready state hand shape (e.g., Hand State B). For example, in response to detecting the ready state directed to a respective representation 910c of a content item included in the content browsing element 904, the electronic device 101 updates the respective representation 910c to distinguish it from the other representations 910a and 910b. In some embodiments, the respective representation 910c is displayed closer to the viewpoint of the user than the other representations 910a-b, as demonstrated by the larger size with which respective representation 910c is illustrated in FIG. 9C compared to representations 910a-b. In some embodiments, the size of the respective representation 910c is the same as the size of other representations 910a-b, but respective representation 910c looks larger than the other representations 910a-b because the respective representation 910c is closer to the viewpoint of the user in the three-dimensional environment 901 than the other representations 910a-b. In some embodiments, the respective representation 910c is displayed with a backplane 932 and/or virtual shadow that is different from the virtual shadows 930 with which the other representations 910a and 910b are displayed in response to detecting the ready state directed to the respective representation 910c. For example, the backplane 932 has a different color, size, shape, translucency, or other visual characteristic than the virtual shadows 930. In some embodiments, instead of displaying the other representations 910a and 910b at the positions illustrated in FIG. 9C in response to detecting the ready state directed to the respective representation, the electronic device 101 displays the other representations 910a and 910b even further from the viewpoint of the user, such as at the positions shown in FIG. 9D in which there is less (e.g., no) visual separation between the representations 910a and 910b and the background of the content browsing element 904. Additionally, in some embodiments, the electronic device 101 updates the respective representation 910c to include a selectable option 926 that, when selected, causes the electronic device 101 to initiate playback of the content item corresponding to respective representation 910c and a selectable option 928 that, when selected, causes the electronic device 101 to display a menu of actions with respect to the content item corresponding to respective representation. As shown in FIG. 9C, the electronic device 101 does not display corresponding playback and menu options overlaid on the other representations 910a and 910b.

As another example, FIG. 9C illustrates gaze 913c of the user directed to the scrubber bar 914a (e.g., while hand 903b is in Hand State B). In response to detecting the ready state directed to the scrubber bar 914a, the electronic device 101 displays an indication 934a of the elapsed playback time of the content item and an indication 934b of the time remaining in the content item (e.g., or an indication of the total duration of the content item in some embodiments). In some embodiments, the electronic device 101 displays the scrubber bar 914a closer to the viewpoint of the user than the other selectable options 914b-i. In some embodiments, the electronic device 101 displays the scrubber bar 914a at the location closer to the viewpoint of the user as illustrated in FIG. 9C and displays the other selectable options 914b-914i at the positions illustrated in FIGS. 9A-9B without visual separation from the (e.g., background of the) content playback element 906 in response to detecting the ready state directed to the scrubber bar 914a.

In some embodiments, in response to detecting the ready state, the electronic device 101 distinguishes interactive user interface elements from user interface elements that are not interactive. For example, in response to detecting the ready state directed to the content browsing element 904 (e.g., with gaze 913b and hand 903b in Hand State B), the electronic device 101 updates the positions of the representations 910a-910c to be displayed closer to the viewpoint of the user, but does not update the position of three-dimensional image 908 because the three-dimensional image 908 is not interactive. As another example, in response to detecting the ready state directed to the content playback element 906, the electronic device 101 displays the selectable elements 914a-i closer to the viewpoint of the user with visual separation from the (e.g., background of the) content playback element 906 but does not update the position of the image 912 corresponding to the content item that is currently playing because the image 912 is not interactive.

Figure 9D:
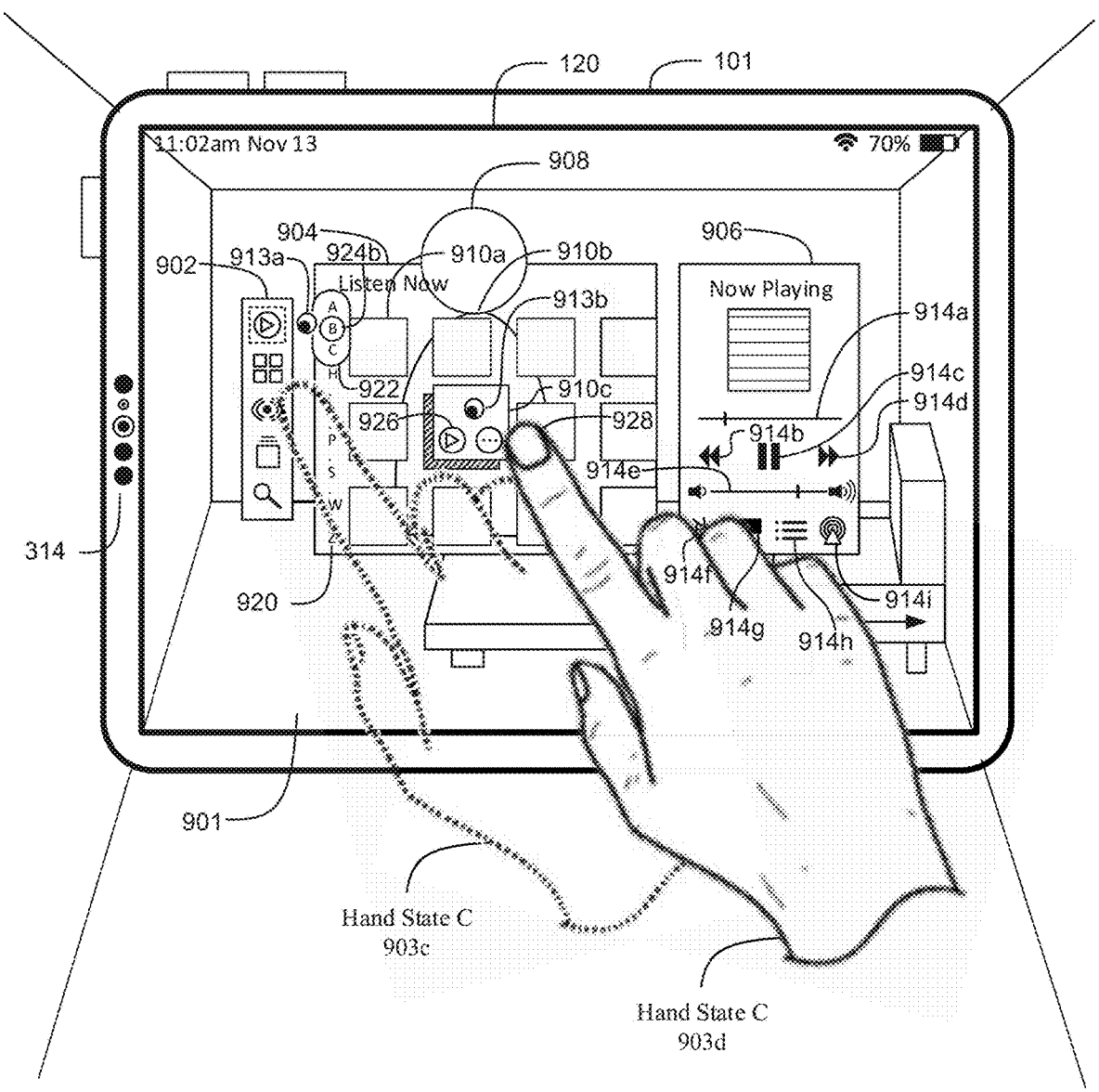

As described above with reference to FIG. 9B, in some embodiments, the content browsing element 904 includes an alphabetical scroll bar 920 that, in response to receiving an input directed to alphabetical scroll bar 920, causes the electronic device 101 to scroll the representations 910a-910c of content items in the content browsing element 904. In response to detecting a ready state directed to a portion of the alphabetical scroll bar 920, the electronic device 101 updates the scroll bar to enlarge the portion of the alphabetical scroll bar 920 to which the ready state is directed. For example, in FIG. 9C, in response to detecting the ready state (e.g., of gaze 913a and hand 903b in Hand State B) directed to portion 922 of scroll bar 920, the electronic device 101 enlarges the portion 922 of the alphabetical scroll bar. For example, enlarging portion 922 includes displaying additional letters (e.g., B, C) in portion 922 that were not displayed before the ready state was detected, such as in FIG. 9B, and/or displaying a respective letter 924a with additional visual emphasis indicating that detecting a selection input directed to the alphabetical scroll bar will cause the electronic device 101 to navigate the content browsing element 904 to representations 910a-910b starting with the emphasized letter. As described above, in some embodiments, detecting selection directed to a respective element, such as the alphabetical scroll bar, includes detecting the gaze 913a of the user directed to the alphabetical scroll bar 920 while detecting the hand 903c of the user making a respective gesture, that includes a respective hand shape (e.g., Hand State C), such as a pinch gesture. For example, making the pinch gesture described above includes making the pinch hand shape described above. In some embodiments, in response to detecting movement of the hand 903c while in the pinch hand shape during the selection input, the electronic device 101 refines the letter to which the selection input is directed, as shown in FIG. 9D. For example, in FIG. 9C, the user moves hand 903c down while maintaining the pinch hand shape (e.g., Hand State C) and, in response, the electronic device 101 updates the letter to which the selection input will be directed, as shown in FIG. 9D. In some embodiments, the electronic device 101 updates the letter to which further input will be directed in response to detecting downward movement of the hand while the hand is in the ready state pose (e.g., a pre-pinch hand shape).

FIG. 9D illustrates the electronic device 101 updating the alphabetical scroll bar 920 to update the respective letter 924b of the alphabetical scroll bar 920 to which the selection input (e.g., via gaze 913a and hand 903c) is directed in response to the movement of hand 903c illustrated in FIG. 9C while the hand 903c was in the predefined shape (e.g., the pinch hand shape, the pre-pinch hand shape). For example, in FIG. 9C, the letter "A" is selected and in FIG. 9D, the letter "B" is selected in response to the downward movement of the hand 903c. If the electronic device 101 were to detect the end of the selection input, such as the hand 903c moving out of the pinch hand shape, the electronic device 101 would optionally scroll the representations 910a-c of content items in the content browsing element 904 to scroll to representations 910a-c of content items starting with the letter B. In some embodiments, as described above, the electronic device 101 updates the emphasized letter in response to movement of the hand 903c in the ready state hand shape (e.g., pre-pinch hand shape) and scrolls to a location corresponding to a selected letter in response to detecting selection, such as detecting the pinch gesture.

FIG. 9D also illustrates display of the representations 910a and 910b without visual separation from the background of the content browsing element 904 in response to an input directed to respective representation 910c. In some embodiments, the representations 910a and 910b are displayed without visual separation from (e.g., the background of) the content browsing element 904 at a further distance from the viewpoint of the user than the distance between the respective representation 910c and the viewpoint of the user. In some embodiments, the electronic device 101 displays the representations 910a and 910b in this manner in response to detecting the ready state directed to the respective representation 910c illustrated in FIG. 9C. In FIG. 9D, the electronic device 101 detects selection of the respective representation 910c with gaze 913b and hand 903d. In some embodiments, hand 903d makes a selection gesture described above. In some embodiments, making the selection gesture includes making a respective hand shape (e.g., Hand State C), such as making a pinch hand shape as part of performing the pinch gesture.

Figure 9E:
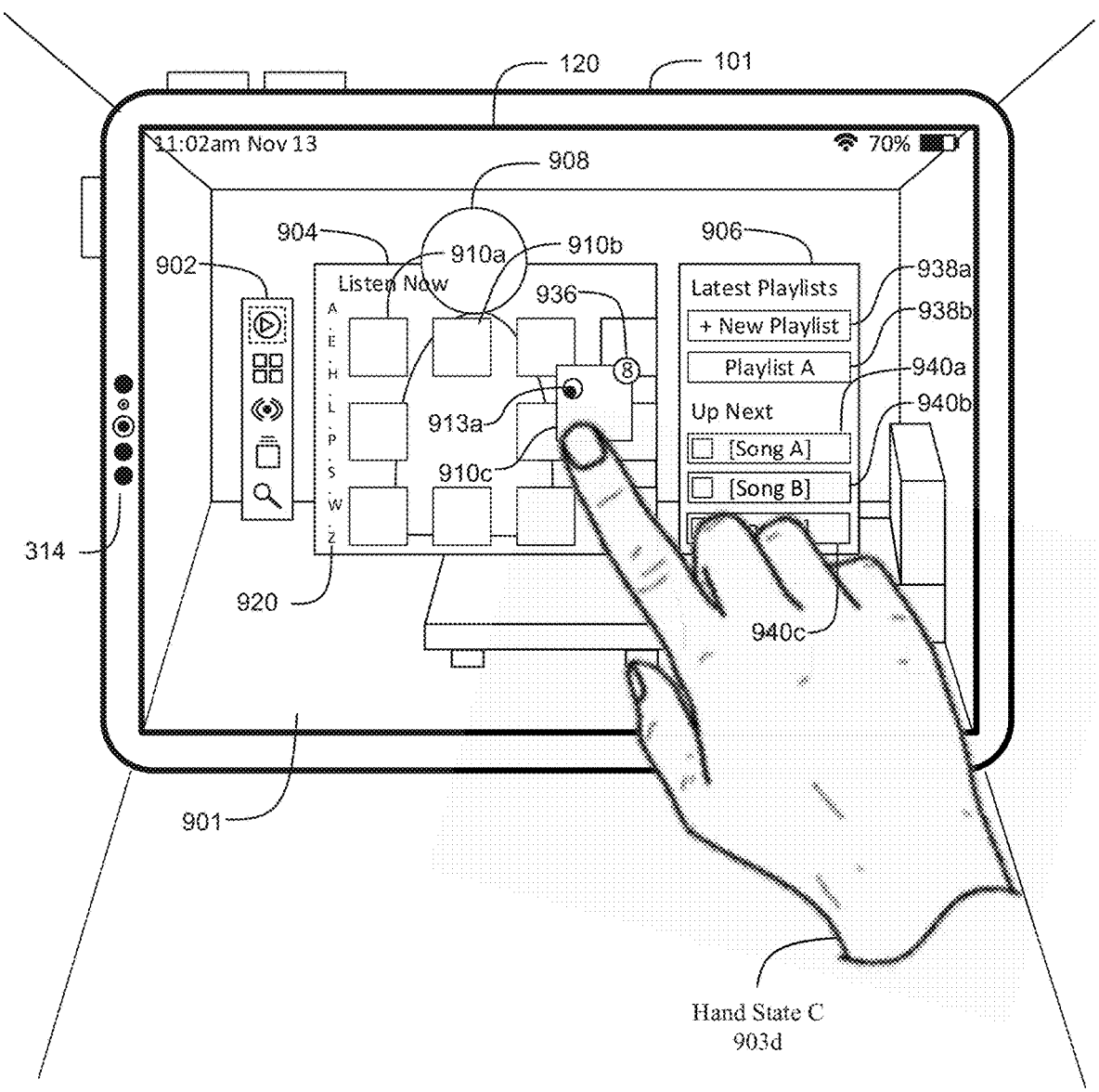

In FIG. 9E, the user moves hand 903d while maintaining the respective hand shape (e.g., Hand State C) after beginning to select representation 910c in FIG. 9D. In some embodiments, in response to detecting the movement of hand 903d while in Hand State C, the electronic device 101 removes representation 910c from element 904 and moves the respective representation 910c in the three-dimensional environment 901 in accordance with movement of the hand 903d. For example, the hand 903d moves to the right, so the electronic device 101 updates the position of the respective representation 910c to the right. While moving the respective representation 910c in accordance with movement of hand 903d, the electronic device 101 optionally updates the appearance of representation 910c to include an indication 936 of the number of content items in the collection of content items (e.g., album, playlist) corresponding to the respective representation 910c. In some embodiments, while moving the respective representation 910c in accordance with movement of hand 903d, the electronic device 101 displays the other representations 910a and 910b and the alphabetized scroll bar 920 without visual separation from the (e.g., background of) content browsing element 904, but displays the respective representation 910c with visual separation from the (e.g., background of the) content browsing element 904 and closer to the viewpoint of the user in the three-dimensional environment 901. In some embodiments, while updating the position of representation 910c in accordance with movement of hand 903d, the electronic device 101 maintains display of the other representations 910a and 910b.

In some embodiments, in response to the input illustrated in FIG. 9E, the electronic device 101 updates the content playback element 906 to include indications 938a and 938b of playlists associated with the user account of the electronic device 101 and indications 940a-c of content items included in a playback queue of the electronic device 101 and updates the playback control element 906 to no longer include the playback control elements 914a-i illustrated in FIG. 9D. In some embodiments, the electronic device 101 updates the content playback element 906 in response to detecting the beginning of movement of the hand 903d to move the representation 910c. In some embodiments, the electronic device 101 updates the content playback element 906 in response to detecting the user move the representation 910c to a location over or corresponding to the content playback element 906.

In some embodiments, playlists are collections of content items. In some embodiments, the user is able to create one or more playlists of content items. In some embodiments, the electronic device 101 is able to access playlists made by other users or otherwise available via the content delivery service associated with the content application. In some embodiments, in response to detecting the user drag the representation 910c to indication 938a, the electronic device 101 creates a new playlist including the content items included in the collection of content items corresponding to representation 910c. In some embodiments, in response to detecting the user drag the representation 910c to indication 938b, the electronic device 101 adds the content items included in the collection of content items corresponding to representation 910c to the playlist corresponding to indication 938b. In some embodiments, if the electronic device 101 has access to additional playlists, the electronic device 101 presents additional indications of additional playlists in 906. In some embodiments, the electronic device 101 displays indications of a subset of playlists the electronic device 101 has access to in 906, such as a predefined number of playlists (e.g., 2, 3, 5, or 10) selected based on how recently the playlists were played or updated.

In some embodiments, the electronic device 101 is configured to play a plurality of content items in a predefined order of a content playback queue. In some embodiments, after finishing playback of a currently-playing content item, the electronic device 101 plays the next content item in the playback queue. For example, after finishing playback of a currently-playing content item, the electronic device 101 will play the content item corresponding to indication 940a. In some embodiments, the user is able to reposition indications 940a-c to re-order the content items in the queue. Moreover, in some embodiments, in response to detecting the user drag the representation 910c to a location of the content playback element 906 overlapping one or more indications 940a-c of content items in the playback queue, the electronic device 101 adds the content items included in the collection of content items corresponding to representation 910c to the playback queue. In some embodiments, the electronic device 101 adds the content items corresponding to representation 910c at a position in the playback queue corresponding to the location to which the user drags representation 910c. For example, if the user drags the representation 910c to a location between indications 940a and 940b, the electronic device 101 adds the content items corresponding to representation 910c to the playback queue between the content items corresponding to indications 940a and 940b. As another example, if the user drags the representation 910c to a location between indications 940b and 940c, the electronic device 101 adds the content items corresponding to representation 910c to the playback queue between the content items corresponding to indications 940b and 940c.

Figure 9F:
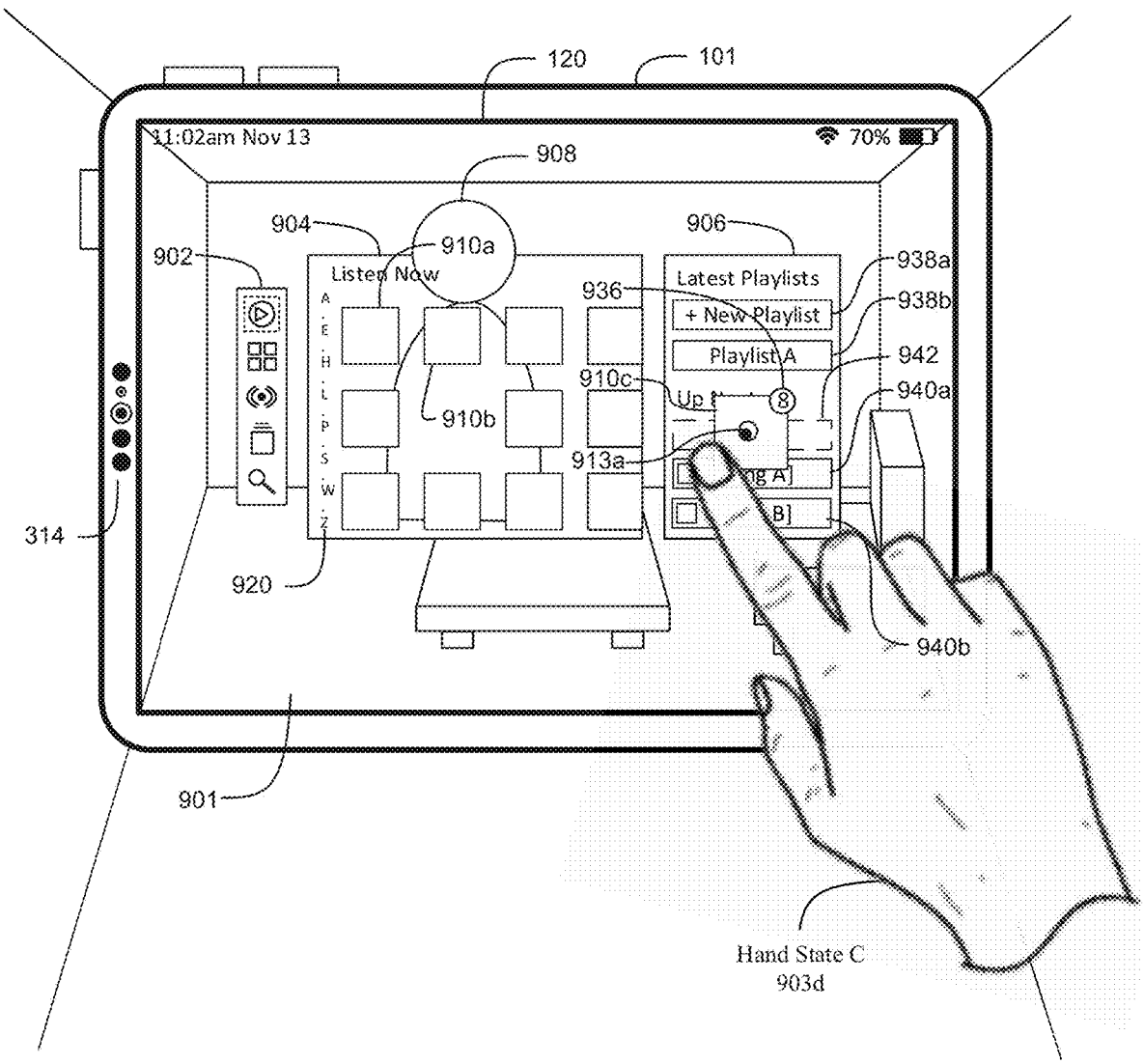

In FIG. 9F, the electronic device 101 detects the user continuing to drag the respective representation 910c to the location illustrated in FIG. 9F. In response to detecting the user drag the representation 910c to a location in the content playback element corresponding to the playback queue, the electronic device 101 updates the content playback element 906 to include an indication 942 of adding the content items corresponding to representation 910c to the content playback queue at a location at which indication 940a was previously displayed as shown in FIG. 9E. In some embodiments, because the user drags the representation 910c to a location corresponding to adding the content items corresponding to representation 910c before the content item corresponding to indication 940a, the electronic device 101 displays the indication 942 ahead of indication 940a in the queue. In some embodiments, in response to detecting the hand 903d complete the selection gesture, such as by moving the thumb away from the finger to stop making the pinch hand shape, the electronic device 101 adds the content items corresponding to representation 910c to the content item playback queue ahead of the content item corresponding to indication 940a. In some embodiments, in response to detecting the hand 903d complete the selection gesture, the electronic device 101 updates the content playback element 906 to include the elements illustrated in FIG. 9D and updates the content browsing element 904 to include the respective representation 910c at the location illustrated in FIG. 9B or to display representations 910a at the locations illustrated in FIG. 9A. Additional or alternative details regarding the embodiments illustrated in FIGS. 9A-9F are provided below in description of method 1000 described with reference to FIGS. 10A-10O.

FIGS. 10A-10O is a flowchart illustrating a method of updating display of interactive user interface elements in response to detecting a respective pose of a respective portion of a user of an electronic device in accordance with some embodiments. In some embodiments, the method 1000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at an electronic device (e.g., 101) in communication with a display generation component (e.g., 120) and one or more input devices (e.g., 314) (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, a hand motion sensor), etc. In some embodiments, the electronic device is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, such as in FIG. 9A, the electronic device (e.g., 101) displays (1002a), via the display generation component (e.g., 120), a user interface (e.g., 902, 904, 906) of an application (e.g., such as the user interface of the application described with reference to method 800 or a different user interface of the same application associated with the user interface described with reference to method 800) in a three-dimensional environment (e.g., 901) that includes a plurality of interactive elements (e.g., 918a, 910a, 914a), wherein the plurality of interactive elements (e.g., 918a, 910a, 914a) are responsive to (e.g., are configured to perform a respective operation in response to detecting) inputs including a transition of a respective portion of a user (e.g., 903a) of the electronic device (e.g., 101) from a first pose to a second pose. In some embodiments, the three-dimensional environment includes virtual objects, such as application windows, operating system elements, representations of other users, and/or content items and/or representations of physical objects or regions in the physical environment of the electronic device. In some embodiments, the representations of physical objects or regions are displayed in the three-dimensional environment via the display generation component (e.g., virtual or video passthrough). In some embodiments, the representations of physical objects or regions are views of the physical objects or regions in the physical environment of the electronic device visible through a transparent portion of the display generation component (e.g., true or real passthrough). In some embodiments, the electronic device displays the three-dimensional environment from the viewpoint of the user at a location in the three-dimensional environment corresponding to the physical location of the electronic device and/or the user in the physical environment of the electronic device. In some embodiments, the three-dimensional environment is generated, displayed, or otherwise caused to be viewable by the device (e.g., a computer-generated reality (XR) environment such as a virtual reality (VR) environment, a mixed reality (MR) environment, or an augmented reality (AR) environment, etc.). In some embodiments, the user interface includes a plurality of interactive user interface elements that, when selected, cause the electronic device to perform respective functions, such as navigating to different pages of the user interface, initiating or modifying playback of content items associated with the application of the user interface, performing other actions with respect to content items associated with the application of the user interface, initiating communication with one or more other electronic devices, and/or changing a setting of the application or electronic device. In some embodiments, the application is a content (e.g., streaming, playback, library, sharing) application. In some embodiments, the user interface of the application is an extended user interface of the content application and the user interface described above with reference to method 800 is a scaled down and/or miniature user interface associated with the content application (e.g., a miniplayer user interface of the content application).

In some embodiments, such as in FIG. 9B, while displaying the user interface of the application (e.g., 902, 904, 906) in the three-dimensional environment (e.g., 901), while the respective portion (e.g., hand, head) of the user (e.g., 903a) of the electronic device (e.g., 101) is not in the first pose (e.g., a respective pose corresponding to a ready state that precedes a user input provided via the respective portion of the user) and while detecting, via the one or more input devices (e.g., 314) (e.g., a sensor configured to detect attention of the user, such as an eye tracking device or a head tracking device), that attention (e.g., gaze 913a) of the user is directed to the user interface (e.g., 904) of the application, the electronic device (e.g., 101) displays (1002b), in the user interface (e.g., 913a) of the application, the plurality of interactive elements (e.g., 910a, 910b) of the user interface with a visual characteristic having a first value. In some embodiments, the respective portion of the user is in the first pose when the user's hand is raised compared to being at the user's side. In some embodiments, the respective portion of the user is not in the first pose when the user's hand is at the user's side. In some embodiments, the electronic device detects the respective portion of the user in a pose that is not the first pose. In some embodiments, the electronic device does not detect the respective portion of the user (e.g., because the respective portion of the user is out of range an input device that detects the pose of the respective portion of the user (e.g., a hand tracking device)) when the respective portion of the user is not in the first pose. For example, the hand of the user is in the first pose when the location of the hand is in a predetermined region of the three-dimensional environment relative to the user's torso. In some embodiments, the predefined pose is associated with a ready state that is detected prior to detecting further input from the respective portion of the user. In some embodiments, detecting the ready state includes detecting the hand of the user in a predetermined hand shape, such as a pre-pinch hand shape in which the thumb is within a predefined distance (e.g., 0.1, 0.2, 0.3, 0.5, 1, 2, 3, or 5 centimeters) of another finger of the hand without touching the finger or a pointing hand shape in which one or more fingers are extended and one or more fingers are curled towards the palm of the hand. In some embodiments, the visual characteristic of the interactive elements is an amount of visual separation between the interactive elements and a container user interface element (e.g., backplane, window, other region) in which the interactive elements are displayed. In some embodiments, while the plurality of interactive elements are displayed with the visual characteristic having the first value, the interactive elements have a first amount (e.g., zero or a non-zero amount having a first value) of visual separation from the container user interface element.

In some embodiments, while displaying, in the user interface (e.g., 904) of the application, the plurality of interactive elements (e.g., 910a, 910b) with the visual characteristic having the first value and while detecting, via the one or more input devices (e.g., 314), that the attention (e.g., gaze 913a) of the user is directed to the user interface (e.g., 904) of the application, such as in FIG. 9B, the electronic device (e.g., 101) detects (1002c), via the one or more input devices (e.g., 314), the respective portion of the user (e.g., 903a) in the first pose, such as in FIG. 9B. In some embodiments, detecting the respective portion of the user in the first pose includes detecting the hand of the user in a predefined region relative to the user's torso or elbow or detecting the hand of the user within range of a hand tracking device in communication with the electronic device.

In some embodiments, such as in FIG. 9C, in response to detecting the respective portion of the user (e.g., 903b) in the first pose and while the attention (e.g., 913a, 913b, 913c) of the user is directed to the user interface (e.g., 904, 906) of the application, the electronic device (e.g., 101) updates (1002d) the user interface to include displaying, via the display generation component (e.g., 120), the plurality of interactive elements (e.g., 910a, 910b, 914a) of the user interface with the visual characteristic having a second value different from the first value. In some embodiments, the visual characteristic of the interactive elements is an amount of visual separation between the interactive elements and a container user interface element (e.g., backplane, window, other region) in which the interactive elements are displayed. In some embodiments, while the plurality of interactive elements are displayed with the visual characteristic having the second value, the interactive elements have a second (e.g., non-zero) amount of visual separation from the container user interface element that is greater than the amount of visual separation from the container with which the interactive elements are displayed while being displayed with the visual characteristic having the first value. In some embodiments, the visual characteristic is the color of the user interface elements and the color of the user interface elements changes in response to detecting the respective portion of the user in the first pose. In some embodiments, the visual characteristic is an animation that is not presented unless and until the electronic device detects the respective portion of the user in the first pose. In some embodiments, the visual characteristic is the size of the user interface elements and the electronic device changes (e.g., increases or decreases) the sizes of the user interface elements in response to detecting the respective portion of the user in the first pose. In some embodiments, the visual characteristic is highlighting and the electronic device displays the user interface elements without highlighting unless and until the respective portion of the user is in the first pose.

Updating the value of the visual characteristic with which the interactive user interface elements are displayed in response to detecting the change of the pose of the respective portion of the user provides visual feedback to the user about which elements are interactable while the user is interacting with the user interface, thereby enabling the user to use the device more quickly and efficiently with enhanced visual feedback.

In some embodiments, while displaying the user interface (e.g., 902, 904, 906) of the application in the three-dimensional environment (e.g., 901), and while detecting, via the one or more input devices (e.g., 314) (e.g., an eye tracking device), that the attention (e.g., 913b) (e.g., gaze) of the user is directed to (e.g., a respective interactive user interface element of) the user interface (e.g., 904) of the application, the electronic device (e.g., 101) detects (1004a), via the one or more input devices (e.g., 314), the respective portion (e.g., hand 903d) of the user transition from the first pose to the second pose, such as in FIG. 9D. In some embodiments, the second pose corresponds to selection of a respective user interface element towards which the attention (e.g., gaze) of the user is directed. In some embodiments, the second pose is the hand of the user in or moving towards a pinch hand shape in which the thumb touches another finger of the hand. In some embodiments, the second pose is the hand of the user in a pointing hand shape in which one or more fingers are extended and one or more fingers are curled towards the palm of the hand, and/or the extended finger moving to and selecting the respective interactive user interface element.

In some embodiments, such as in FIG. 9D, in response to detecting the respective portion of the user (e.g., hand 903d) transition from the first pose to the second pose, the electronic device (e.g., 101) performs (1004b) a respective operation corresponding to detecting the respective portion of the user (e.g., hand 903d) transition from the first pose to the second pose. In some embodiments, the respective operation corresponds to a respective interactive user interface element to which the user's attention (e.g., gaze) is directed when the second pose is detected. For example, in response to detecting the second pose of the respective portion (e.g., hand) of the user while the attention (e.g., gaze) of the user is directed to an option to play a respective item of content, the electronic device initiates playback of the respective item of content in response to detecting the respective portion (e.g., hand) of the user transition from the first pose to the second pose.

Performing the respective operation in response to detecting the second pose of the respective portion (e.g., hand) of the user provides an efficient way of continuing to interact with the user interface with the respective portion of the user, thereby enabling the user to use the device more quickly and efficiently.

In some embodiments, such as in FIG. 9D, in accordance with a determination that the attention (e.g., gaze 913b) of the user is directed to a first user interface element (e.g., 910c) of the plurality of interactive elements when the respective portion (e.g., hand 913d) of the user is detected transitioning from the first pose to the second pose, the respective operation is a first operation corresponding to the first user interface element (e.g., 910c) (1006a). For example, in response to detecting the respective portion (e.g., hand) of the user transition from the first pose to the second pose while the attention (e.g., gaze) of the user is directed to a user interface element associated with initiating playback of a respective content item, in response to detecting the respective portion of the user transition to the second pose, the electronic device initiates playback of the respective content item.

In some embodiments, such as in FIG. 9D, in accordance with a determination that the attention (e.g., gaze 913a) of the user is directed to a second user interface element (e.g., 920), different from the first user interface element, of the plurality of user interface elements when the respective portion of the user (e.g., hand 903c) is detected transitioning from the first pose to the second pose, the respective operation is a second operation, different from the first operation, corresponding to the second user interface element (e.g., 920) (1006b). For example, in response to detecting the respective portion (e.g., hand) of the user transition from the first pose to the second pose while the attention (e.g., gaze) of the user is directed to a user interface element associated with navigating to a respective page in the user interface, in response to detecting the respective portion of the user transition to the second pose, the electronic device navigates to the respective page in the user interface.

Performing an operation that corresponds to the user interface element to which the user's attention is directed when the electronic device detects the transition of the respective portion of the user from the first pose to the second pose provides an efficient way of selecting user interface elements to cause the electronic device to perform actions, thereby enabling the user to use the electronic device quickly and efficiently.

In some embodiments, such as in FIG. 9C, the visual characteristic is a distance between locations corresponding to the plurality of interactive elements (e.g., 910a, 914a) of the user interface and a viewpoint of the user in the three-dimensional environment (e.g., 901) (1008a).

In some embodiments, such as in FIG. 9B, displaying the plurality of interactive elements (e.g., 910a, 914a) of the user interface (e.g., 904, 906) with the visual characteristic having the first value includes displaying the plurality of interactive elements (e.g., 910*a*, 914*a*) of the user interface at locations that correspond to a first distance from the viewpoint of the user in the three-dimensional environment (e.g., 901) (1008*b*). In some embodiments, displaying the plurality of interactive elements at locations that correspond to the first distance from the viewpoint of the user include displaying the plurality of interactive elements at locations that are the same distance from the viewpoint of the user as a backplane of the user interface. For example, the plurality of interactive elements appear "flat" or within the two-dimensional plane of the backplane of the user interface while the plurality of interactive elements of the user interface are displayed with the visual characteristic having the first value.

In some embodiments, such as in FIG. 9C, displaying the plurality of interactive elements (e.g., 910*a*, 914*a*) of the user interface (e.g., 904, 906) with the visual characteristic having the second value includes displaying the plurality of interactive elements (e.g., 910*a*, 914*a*) of the user interface (e.g., 904, 906) at locations that correspond to a second distance from the viewpoint of the user in the three-dimensional environment (e.g., 901), the second distance less than the first distance (1008*c*). In some embodiments, displaying the plurality of interactive elements with the visual characteristic having the second value includes increasing the distance between the locations corresponding to the interactive elements and the location corresponding to the backplane of the user interface. For example, the interactive elements appear to "pop forward" (e.g., towards the viewpoint of the user) and separate from the backplane of the user interface. In some embodiments, the backplane of the user interface stays the same distance from the viewpoint of the user when updating the user interface from displaying the plurality of interactive elements with the visual characteristic having the first value to displaying the plurality of interactive elements with the visual characteristic having the second value.

Moving the interactive elements to locations corresponding to locations closer to the viewpoint of the user in the three-dimensional environment provides an efficient way of indicating to the user which elements are interactive and will respond to user input, which enhances visual feedback to the user while using the electronic device.

In some embodiments, such as in FIG. 9A, while displaying the user interface of the application in the three-dimensional environment (e.g., 901), and while the respective portion of the user (e.g., 903*a*) is not in the first pose (1010*a*), the electronic device (e.g., 101) displays (1010*b*), via the display generation component (e.g., 120), a first portion of the plurality of interactive elements (e.g., 910*a*) of the user interface (e.g., 904) at first locations in the user interface. In some embodiments, the first portion of the plurality of interactive elements are displayed at first locations at the edge of the (e.g., container, window, etc. of the) user interface (e.g., adjacent to a boundary of the user interface).

In some embodiments, such as in FIG. 9A, while displaying the user interface (e.g., 904) of the application in the three-dimensional environment (e.g., 901), and while the respective portion of the user (e.g., 903*a*) is not in the first pose (1010*a*), the electronic device (e.g., 101) forgoes (1010*c*) display of a second portion of the plurality of interactive elements (e.g., 910) of the user interface (e.g., 904) that are beyond a boundary of the user interface (e.g., 904). In some embodiments, the plurality of interactive elements are displayed such that the second portion of the plurality of interactive elements are "cut off" by the boundary of the (e.g., container, window, etc. of the) user interface.

In some embodiments, such as in FIG. 9C, in response to detecting the respective portion of the user (e.g., 903*b*) in the first pose while the attention (e.g., gaze 913*b*) of the user is directed to the user interface (e.g., 904) of the application (1010*d*), the electronic device (e.g., 101) displays (1010*e*), via the display generation component (e.g., 120), the first portion of the plurality of interactive elements (e.g., 910*a*) of the user interface at second locations, different from the first locations, in the user interface. In some embodiments, the second locations are further from the boundary of the user interface at which the interactive elements were displayed at the first locations than the first locations. For example, the interactive elements move towards the center of the user interface.

In some embodiments, such as in FIG. 9C, in response to detecting the respective portion of the user (e.g., 903*b*) in the first pose while the attention (e.g., 913*b*) of the user is directed to the user interface of the application (1010*d*), the electronic device (e.g., 101) displays (10100, via the display generation component (e.g., 120), the second portion of the plurality of interactive elements (e.g., 910*a*, 910*b*) in the user interface. In some embodiments, displaying the interactive elements at the second locations enables the electronic device to display the second portion of the interactive elements (e.g., displaying the entire interactive elements). In some embodiments, the electronic device also displays a plurality of additional interactive elements that were not displayed while the interactive elements were displayed at the first location.

Displaying the second portion of the interactive elements in response to detecting the respective portion of the user in the first pose provides an efficient way of revealing the full functionality of the interactive elements when the user indicates that they may provide input to the user interface, which enables the user to use the device quickly and efficiently with enhanced visual feedback.

In some embodiments, such as in FIG. 9B, while displaying the user interface (e.g., 904) of the application in the three-dimensional environment (e.g., 901), while the respective portion of the user (e.g., 903*a*) is not in the first pose, the electronic device (101) displays (1012*a*), via the display generation component (e.g., 120), a respective user interface element (e.g., 920) of the plurality of interactive elements of the user interface, including displaying a respective portion of the respective user interface element (e.g., 920) with a first amount of visual emphasis, wherein the respective user interface element (e.g., 920) is for navigating content of the user interface (e.g., 904) of the application. In some embodiments, the respective user interface element is a scroll bar. For example, the user interface includes an alphabetized list of content items and the scroll bar includes indications of letters of the alphabet corresponding to the portion of the alphabetized list visible at respective locations in the user interface corresponding to respective locations of the scroll bar. In some embodiments, displaying the respective portion of the respective user interface element includes displaying the respective user interface element without emphasizing the respective portion relative to other portions of the respective user interface element.

In some embodiments, such as in FIG. 9C, in response to detecting the respective portion of the user (e.g., 903*c*) in the first pose while the attention (e.g., gaze 913*a*) of the user is directed to the respective portion (e.g., 924*a*) of the respective user interface element (e.g., 920) (1012*b*), in accordance with a determination that the respective portion of the respective user interface element (e.g., 920) is a first portion (e.g., 924*a*) of the respective user interface element, the electronic device (e.g., 101) displays (1012*c*), via the display generation component (e.g., 120), the first portion (e.g., 924*a*) of the respective user interface element (e.g., 920) with a second amount of visual emphasis greater than the first amount, and displays, via the display generation component (e.g., 120), a second portion of (e.g., the rest of) the respective user interface element with the first amount of visual emphasis. In some embodiments, displaying the first portion of the respective user interface element with the second amount of visual emphasis includes increasing the size of the first portion of the respective user interface element relative to the size at which the first portion of the respective user interface element was displayed with the first amount of visual emphasis (e.g., increasing the size of the first portion of the respective user interface element). In some embodiments, displaying the first portion of the respective user interface element with the second amount of visual emphasis includes decreasing the distance between a location corresponding to the first portion of the respective user interface element and the viewpoint of the user (e.g., moving the first portion of the respective user interface element closer to the user). In some embodiments, displaying the first portion of the respective user interface element with the second amount of visual emphasis includes displaying the first portion of the respective user interface element with a different color than the color with which the first portion of the respective user interface element was displayed with the first amount of visual emphasis (e.g., changing the color of first portion of the respective user interface element (e.g., to a brighter, lighter, darker, etc. color)). In some embodiments, the electronic device detects the attention (e.g., gaze) of the user via the one or more input devices (e.g., an eye tracking device).

In some embodiments, such as in FIG. 9D, in response to detecting the respective portion of the user (e.g., 903*c*) in the first pose while the attention (e.g., gaze 913*a*) of the user is directed to the respective portion of the respective user interface element (e.g., 920) (1012*b*), in accordance with a determination that the respective portion of the respective user interface element is the second portion (e.g., 924*b*) of the respective user interface element, the electronic device (e.g., 101) displays (1012*d*), via the display generation component (e.g., 120), the second portion of the respective user interface element (e.g., 920) with the second amount of visual emphasis, and the electronic device (e.g., 101) displays, via the display generation component (e.g., 120), the first portion of the respective user interface element (e.g., 920) with the first amount of visual emphasis. In some embodiments, displaying the second portion of the respective user interface element with the second amount of visual emphasis includes increasing the size of the second portion of the respective user interface element relative to the size at which the second portion of the respective user interface element was displayed with the first amount of visual emphasis (e.g., increasing the size of the second portion of the respective user interface element). In some embodiments, displaying the second portion of the respective user interface element with the second amount of visual emphasis includes decreasing the distance between a location corresponding to the second portion of the respective user interface element and the viewpoint of the user relative to the distance between a location corresponding to second portion of the respective user interface element and the viewpoint of the user at which the second portion of the respective user interface element was displayed with the first amount of visual emphasis (e.g., moving the second portion of the respective user interface element closer to the user). In some embodiments, displaying the second portion of the respective user interface element with the second amount of visual emphasis includes displaying the second portion of the respective user interface element with a different color than the color with which the second portion of the respective user interface element was displayed with the first amount of visual emphasis (e.g., changing the color of second portion of the respective user interface element (e.g., to a brighter, lighter, darker, etc. color)). In some embodiments, in response to detecting the respective portion of the user in the predefined pose, the electronic device increases the amount of visual emphasis of the portion of the respective user interface element to which the user's attention (e.g., gaze) is directed. In some embodiments, in response to detecting selection input directed to the respective user interface element while displaying the respective portion of the respective user interface element with the second amount of visual emphasis, the electronic device navigates the user interface to a location corresponding to the respective portion of the user interface element and displays the respective portion (e.g., and all portions) of the respective user interface element with the first amount of visual emphasis. For example, if the gaze 913*a* of the user in FIG. 9D is directed to a different portion of alphabetical scroll bar 920 (e.g., such as the letter "S"), the electronic device displays the other portion of the alphabetical scroll bar 920 in the manner in which portion 922 is displayed and displays one or more letters in portion 922 (e.g., letter "A") in the same style as the other portion of the alphabetical scroll bar 920. Visually emphasizing the respective portion of the respective user interface element to which the attention of the user is directed provides enhanced visual feedback to the user indicating the portion of the respective user interface element to which further input will be directed, thereby enabling the user to use the device more quickly and efficiently with fewer errors.

In some embodiments, such as in FIG. 9C, while displaying the user interface (e.g., 904) of the application in the three-dimensional environment (e.g., 910) including displaying the respective portion (e.g., 924*a*) the respective user interface element (e.g., 920) with the second amount of visual emphasis (1014*a*), the electronic device (e.g., 101) detects (1014*a*), via the one or more input devices (e.g., 314), movement of the respective portion of the user (e.g., 903*c*) while the respective portion of the user (e.g., 903*c*) is in a respective shape (e.g., the first or second pose). For example, the electronic device detects, via the one or more input devices (e.g., a hand tracking device), movement of the hand of the user while the hand is in a pinch hand shape in which the thumb touches another finger of the hand or while the hand is in a pointing hand shape in which one or more fingers are extended and one or more fingers are curled towards the palm while the hand is within a predetermined threshold distance (e.g., 1, 2, 3, 5, 10, 15, 30, or 50 centimeters) of the respective user interface element.

In some embodiments, such as in FIG. 9D, while displaying the user interface (e.g., 904) of the application in the three-dimensional environment (e.g., 901) including displaying the respective portion the respective user interface element (e.g., 920) with the second amount of visual emphasis (1014*a*), in response to detecting the movement of the respective portion of the user (e.g., 903*c*) while the respective portion of the user (e.g., 903*c*) is in the respective shape, the electronic device (e.g., 101) updates (1014*c*) display of the respective user interface element (e.g., 920) to display, via the display generation component (e.g., 120), a third portion of the respective user interface element (e.g., 920) with the second amount of visual emphasis in accordance with the movement of the respective portion of the user (e.g., 903c) (e.g., and displaying the respective portion of the respective user interface element with the first amount of visual emphasis). In some embodiments, displaying the third portion of the respective user interface element with the second amount of visual emphasis includes one or more of the techniques described above with respect to the first and second portions of the respective user interface element (e.g., updating the distance to the viewpoint of the user, the size, and/or color of the third portion of the respective user interface element). In some embodiments, the third portion of the respective user interface element has a spatial relationship to the respective portion of the respective user interface element that corresponds to movement of the respective portion of the user. In some embodiments, the third portion of the respective user interface element is located in a direction from the respective portion of the respective user interface element corresponding to the direction of the movement of the respective portion of the user. In some embodiments, the third portion of the respective user interface element is located a distance from the respective portion of the respective user interface element corresponding to the (e.g., speed, distance, duration, etc. of) movement of the respective portion of the user. In some embodiments, in response to detecting selection input directed to the respective user interface element while displaying the third portion of the respective user interface element with the second amount of visual emphasis, the electronic device navigates the user interface to a location corresponding to the third portion of the user interface element and displays the third portion (e.g., and all portions) of the respective user interface element with the first amount of visual emphasis.

Visually emphasizing the third portion of the respective user interface element in response to detecting the movement of the respective portion of the user provides an efficient way of enabling the user to refine the portion of the respective user interface element towards which to direct further input, thereby enabling the user to use the electronic device more quickly and efficiently with fewer errors and enhanced visual feedback.

In some embodiments, such as in FIG. 9D, while the respective portion of the user (e.g., 903d) is in the first pose (1016a), in accordance with a determination (e.g., by detecting via the one or more input devices (e.g., an eye tracking device) that the attention (e.g., gaze 913b) of the user is directed to a first user interface element (e.g., 910c) of the plurality of interactive elements (e.g., 910a, 910b), the electronic device (e.g., 101) displays (1016b), via the display generation component (e.g., 120), the first user interface element (e.g., 910c) with the visual characteristic having a third value (e.g., different from the first value and the second value, the same as the second value) and displays, via the display generation component (e.g., 120), a second user interface element (e.g., 910a) of the plurality of interactive elements (e.g., 910a, 910b, 910c) with the visual characteristic having a fourth value different from the third value (e.g., the same as the first value or second value). In some embodiments, the visual characteristic is the distance between the locations corresponding to the interactive elements and the viewpoint of the user or the amount of visual separation between a respective user interface element and another user interface element. In some embodiments, displaying the interactive elements with the visual characteristic having the second value includes moving the interactive elements closer to the viewpoint of the user than they were while displayed with the visual characteristic having the first value. In some embodiments, in response to detecting that the attention of the user is directed to the first user interface element, the electronic device moves the first user interface element even closer to the viewpoint of the user and either maintains the distance between the other elements and the viewpoint of the user at locations corresponding to the second value of the visual characteristic or moves the other elements back to the locations corresponding to the first value of the visual characteristic or some other distance further from the viewpoint of the user than the distance corresponding to the second value of the visual characteristic. In some embodiments, in response to detecting that the attention of the user is directed to the first user interface element, the electronic device maintains the distance of the first user interface element from the viewpoint of the user at a distance corresponding to the second value of the visual characteristic and moves the other user interface elements back to the distance corresponding to the first value of the visual characteristic or to another distance further from the viewpoint of the user than the distance corresponding to the second value of the visual characteristic.

In some embodiments, while the respective portion of the user is in the first pose (1016a), in accordance with a determination that the attention (e.g., gaze) of the user is directed to the second user interface element, the electronic device (e.g., 101) displays (1016c), via the display generation component, the second user interface element with the visual characteristic having the third value and displays, via the display generation component, the first user interface element with the visual characteristic having the fourth value, such as displaying a different user interface element (e.g., 910a) with the visual characteristics of the user interface element 910c to which gaze 913b is directed in FIG. 9D in response to detecting the gaze of the user directed to the different user interface element (e.g., 910a), for example. In some embodiments, the visual characteristic is the distance between the locations corresponding to the interactive elements and the viewpoint of the user or the amount of visual separation between a respective user interface element and another user interface element. In some embodiments, displaying the interactive elements with the visual characteristic having the second value includes moving the interactive elements closer to the viewpoint of the user than they were while displayed with the visual characteristic having the first value. In some embodiments, in response to detecting that the attention of the user is directed to the second user interface element, the electronic device moves the second user interface element even closer to the viewpoint of the user and either maintains the distance between the other elements and the viewpoint of the user at locations corresponding to the second value of the visual characteristic or moves the other elements back to the locations corresponding to the first value of the visual characteristic or some other distance further from the viewpoint of the user than the distance corresponding to the second value of the visual characteristic. In some embodiments, in response to detecting that the attention of the user is directed to the second user interface element, the electronic device maintains the distance of the second user interface element from the viewpoint of the user at a distance corresponding to the second value of the visual characteristic and moves the other user interface elements back to the distance corresponding to the first value of the visual characteristic or to another distance further from the viewpoint of the user than the distance corresponding to the second value of the visual characteristic.

Displaying the interactive element to which the attention (e.g., gaze) of the user is directed with the visual characteristic having the third value provides enhanced visual feedback to the user indicating to which user interface element further input will be directed, thereby enabling the user to user the electronic device quickly and efficiently with fewer errors.

In some embodiments, such as in FIG. 9D, in response to detecting the respective portion (e.g., hand) of the user (e.g., 903*d*) in the first pose (1018*a*), in accordance with a determination that the attention (e.g., gaze 913*b*) of the user is directed to a first region (e.g., 904) (e.g., user interface element or container, such as a window, backplane, or platter) of the user interface (e.g., 904) (1018*b*), the electronic device (e.g., 101) displays (1018*c*), via the display generation component (e.g., 120), a first plurality of interactive elements (e.g., 910*a*, 910*b*) in the first region of the user interface with the visual characteristic having the second value. In some embodiments, the electronic device displays the first plurality of interactive elements within the first region with the visual characteristic having the second value because the attention of the user is directed to the first region. In some embodiments, while the electronic device does not detect the respective portion of the user in the first pose, the electronic device displays the first plurality of interactive elements within the region to which the gaze of the user is directed with the visual characteristic having the first value.

In some embodiments, such as in FIG. 9D, in response to detecting the respective portion (e.g., hand 903*d*) of the user in the first pose (1018*a*), in accordance with a determination that the attention (e.g., gaze 913*b*) of the user is directed to a first region (e.g., 904) (e.g., user interface element or container, such as a window, backplane, or platter) of the user interface (e.g., 904) (1018*b*), the electronic device (e.g., 101) displays (1018*d*), via the display generation component (e.g., 120), a second plurality of interactive elements (e.g., 914*a*, 914*b*) in a second region (e.g., 906) (e.g., user interface element or container, such as a window, backplane, or platter) of the user interface different from the first region (e.g., 904) with the visual characteristic having the first value. In some embodiments, while the electronic device does not detect the respective portion of the user in the first pose, the electronic device displays the second plurality of interactive elements within the region to which the gaze of the user is not directed with the visual characteristic having the first value. In some embodiments, the electronic device maintains display of the second plurality of interactive elements within the second region with the visual characteristic having the first value because the gaze of the user is not directed to the second region.

In some embodiments, such as in FIG. 9C, in response to detecting the respective portion (e.g., hand 903*b*) of the user in the first pose (1018*a*), in accordance with a determination that the attention (e.g., gaze 913*c*) of the user is directed to the second region (e.g., 906) of the user interface (1018*e*), the electronic device (e.g., 101) displays (10180, via the display generation component (e.g., 120), the second plurality of interactive elements (e.g., 914*a*, 914*b*) with the visual characteristic having the second value. In some embodiments, the electronic device displays the second plurality of interactive elements with the visual characteristic having the second value because the attention of the user is directed to the second region. In some embodiments, while the electronic device does not detect the respective portion of the user in the first pose, the electronic device displays the second plurality of interactive elements with the visual characteristic having the first value.

In some embodiments, such as in FIG. 9C, in response to detecting the respective portion (e.g., hand 903*b*) of the user in the first pose (1018*a*), in accordance with a determination that the attention (e.g., gaze 913*c*) of the user is directed to the second region (e.g., 906) of the user interface (1018*e*), the electronic device (e.g., 101) displays (1018*g*), via the display generation component (e.g., 120), the first plurality of interactive elements (e.g., 910*a*, 910*b*, 910*c*) with the visual characteristic having the first value, such as in FIG. 9B. In some embodiments, while the electronic device does not detect the respective portion of the user in the first pose, the electronic device displays the first plurality of interactive elements with the visual characteristic having the first value. In some embodiments, the electronic device maintains display of the first plurality of interactive elements with the visual characteristic having the first value because the gaze of the user is not directed to the first region. In some embodiments, in response to detecting the respective portion of the user in the first pose, the electronic device maintains display of interactive elements with the first visual characteristic in regions of the user interface to which the user's attention is not directed and displays interactive elements in the region to which the user's attention is directed with the visual characteristic having the second value.

Updating the visual characteristic of user interface elements in the region to which the user's attention is directed and maintaining the visual characteristic of user interface elements in the region to which the user's attention is not directed provides enhanced visual feedback to the user, which enables the user to use the electronic device more quickly and efficiently with fewer errors and distractions.

In some embodiments, such as in FIG. 9C, while displaying the plurality of interactive elements (e.g., 910*a*, 910*b*, 910*c*) of the user interface (e.g., 904) with the visual characteristic having the second value (1020*a*), the electronic device (e.g., 101) receives (1020*b*), via the one or more input devices, at least a portion of an input provided by the respective portion (e.g., eyes (gaze 913*b*), hand 903*b*) of the user directed to a respective user interface element (e.g., 910*c*) of the plurality of interactive elements (e.g., 910*a*, 910*b*, 910*c*). In some embodiments, the input includes the gaze of the user being directed to the respective user interface element while the hand of the user performs a predefined gesture, such as a pinch gesture in which the thumb touches another finger of the hand or a press gesture in which one or more extended fingers move to touch a location in the user interface corresponding to the respective user interface element or corresponding to an input (e.g., a visual indication of a remote air gesture input). In some embodiments, detecting a portion of the input includes detecting one or more of the gaze of the user directed to the respective user interface element and detecting a predefined pose of the hand of the user, such as a pre-pinch shape in which the thumb is within a predefined threshold (e.g., 0.1, 0.2, 0.3, 0.5, 1, 2, 3, or 5 centimeters) of another finger of the hand without touching the finger or a pointing shape in which one or more fingers are extended and one or more fingers are curled towards the palm. In some embodiments, the electronic device identifies the respective user interface element towards which the portion of the input is directed because the gaze of the user is directed to the respective user interface element or because the hand of the user is within a predefined threshold distance (e.g., 1, 2, 3, 5, 10, 15, 30, or 50 centimeters) of the respective user interface element.

In some embodiments, such as in FIG. 9C, while displaying the plurality of interactive elements (e.g., 910a, 910b, 910c) of the user interface with the visual characteristic having the second value (1020a), in response to receiving the at the least the portion of the input directed to the respective user interface element (e.g., 910c) (1020c), in accordance with a determination that the respective user interface element is a first respective user interface element (e.g., 910c), the electronic device (e.g., 101) displays (1020d), via the display generation component (e.g., 120), a first visual indication (e.g., 926) associated with the first respective user interface element (e.g., 932) without displaying a second visual indication (e.g., 934a) associated with a second respective user interface element (e.g., 914a) of the plurality of interactive elements. In some embodiments, the first visual indication is a backplane or virtual shadow behind the first respective user interface element, an outline around the first respective user interface element, and/or one or more selectable options displayed overlaid on the first respective user interface element that are selectable to perform one or more actions related to the first respective user interface element. For example, the first respective user interface element is a representation of a content item the selectable options are an option to initiate playback of the content item and an option to display a menu of actions related to the content item (e.g., add to/remove from a content library, add to a playlist or playback queue, view a user interface related to the content item, etc.).

In some embodiments, such as in FIG. 9C, while displaying the plurality of interactive elements (e.g., 914b, 914c) of the user interface (e.g., 906) with the visual characteristic having the second value (1020a), in response to receiving the at the least the portion of the input directed to the respective user interface element (1020c), in accordance with a determination that the respective user interface element is the second respective user interface element (e.g., 914a), the electronic device (e.g., 101) displays (1020d), via the display generation component, the second visual indication (e.g., 934a) without displaying the first visual indication (e.g., 932). In some embodiments, the second visual indication is a backplane or virtual shadow behind the second respective user interface element, an outline around the second respective user interface element, and/or one or more selectable options displayed overlaid on the second respective user interface element that are selectable to perform one or more actions related to the second respective user interface element.

Displaying the visual indication associated with the interactive element to which the portion of the input is directed provides enhanced visual feedback to the user that providing the rest of the input will direct the input to the respective user interface element, thereby enabling the user to use the device more quickly and efficiently with fewer errors.

In some embodiments, such as in FIG. 9C, the first user interface element (e.g., 910c) and the second user interface element (e.g., 910a) are selectable buttons (1022a). In some embodiments, in response to detecting selection of the first user interface element, the electronic device performs a first action associated with the first user interface element. For example, in response to detecting selection of the first user interface element, the electronic device initiates playback of a content item associated with the first user interface element. In some embodiments, in response to detecting selection of the second user interface element, the electronic device performs a second action associated with the second user interface element. For example, in response to detecting selection of the second user interface element, the electronic device skips from a content item that is currently playing to the next content item in a playback queue.

In some embodiments, such as in FIG. 9C, the first visual indication (e.g., 932) is displayed at a location in the three-dimensional environment (e.g., 901) such that the first respective user interface element (e.g., 910c) is displayed between the first visual indication (e.g., 932) and a viewpoint of the user in the three-dimensional environment (e.g., 901) (1022b). In some embodiments, the first respective user interface element is a backplane, platter, or virtual shadow displayed behind, and visually separated from, the first user interface element from the viewpoint of the user in the three-dimensional environment.

In some embodiments, such as in FIG. 9C, the second visual indication is displayed at a location in the three-dimensional environment such that the second respective user interface element (e.g., 910b) is displayed between the second visual indication and the viewpoint of the user in the three-dimensional environment (e.g., 901) (1022c). In some embodiments, the second respective user interface element is a backplane, platter, or virtual shadow displayed behind, and visually separated from, the second user interface element from the viewpoint of the user in the three-dimensional environment.

Displaying the visual indication behind the user interface element that is a selectable button provides enhanced visual feedback to the user indicating that the user interface element is selectable, thereby enabling the user to use the electronic device more quickly and efficiently with enhanced visual feedback.

In some embodiments, such as in FIG. 9C, the first user interface element (e.g., 914a) is a scrubber bar that controls playback of a content item currently playing on the electronic device and that does not include an indication of a playback time of the content item before the at least the portion of the input is directed to the scrubber bar (e.g., 914a), and the first visual indication (e.g., 934a) is an indication of the playback time of the content item currently playing on the electronic device (1024). In some embodiments, the scrubber bar includes an indication at a position along the scrubber bar that corresponds to the current playback position of the content item. In some embodiments, as the content item plays, the indication of the scrubber bar moves in accordance with progression of the playback position of the content item. In some embodiments, in response to an input selecting and moving the indication of the scrubber bar, the electronic device updates the playback position of the content item and, once the content item is playing (e.g., in response to an input to play the content item, at the end of the input moving the indication of the scrubber bar without an additional input), the electronic device resumes playback of the content item from the playback position corresponding to the updated position of the indication of the scrubber bar. In some embodiments, the indication of the playback time indicates the elapsed time of the current playback position of the content item from the beginning of the content item and/or a duration of the content item remaining until the end of the content item from the current playback position. In some embodiments, the electronic device forgoes display of the indication of the playback time unless and until the portion of the input directed to the scrubber bar is detected.

Displaying the indication of the playback time of the content item in response to the portion of the input being directed to the scrubber bar provides an efficient way of presenting additional details related to the scrubber bar, thereby enabling the user to obtain the information quickly and efficiently with reduced virtual clutter unless and until the portion of the input directed to the scrubber bar is received.

In some embodiments, such as in FIG. 9D, while displaying the plurality of interactive elements with the visual characteristic having the second value, the electronic device (e.g., 101) receives (1026*a*), via the one or more input devices (e.g., 314), an input directed to a respective user interface element (e.g., 910*c*) of the plurality of interactive elements (e.g., 910*a*, 910*b*, 910*c*), the input including the respective portion (e.g., hand 903*d*) of the user transitioning to the second pose and movement of the respective portion (e.g., hand 903*d*) of the user while in the second pose. In some embodiments, detecting the second pose of the respective portion of the hand includes detecting the pinch hand shape described above. In some embodiments, detecting the second pose of the respective portion of the hand includes detecting the pointing hand shape, described above, at a location within a threshold distance of a location corresponding to the respective user interface element.

In some embodiments, such as in FIG. 9E, in response to receiving the input directed to the respective user interface element (e.g., 910*c*), the electronic device (e.g., 101) moves (1026*b*) the respective user interface element (e.g., 910*c*) in three-dimensional environment (e.g., 901) in accordance with the movement of the respective portion of the user (e.g., 903*d*). In some embodiments, the electronic device moves the respective user interface element in a direction corresponding to the direction of movement and by an amount corresponding to an amount (e.g., of the speed, duration, distance, etc.) of the movement. In some embodiments, the electronic device displays one or more other user interface elements not being moved with the visual characteristic having the first value. In some embodiments, the electronic device displays one or more other user interface elements not being moved with the visual characteristic having the second value.

Moving the respective user interface element in accordance with the movement of the respective portion of the user provides enhanced visual feedback while the user interacts with the respective user interface element, thereby reducing cognitive burden on the user through enhanced visual feedback.

In some embodiments, such as in FIG. 9E, the user interface of the application includes a content section (e.g., 904) of the application, and the three-dimensional environment (e.g., 901) further includes a second user interface of the application including a media player section (e.g., 906) of the application. In some embodiments, the content section of the application includes representations of content items available for playback via the application. In some embodiments, in response to detecting selection of one of the representations, the electronic device initiates playback of the content item corresponding to the representation and updates the media player section to include an indication that the content item corresponding to the representation is being played. In some embodiments, the media player section of the application includes one or more selectable elements for modifying playback of a content item that is currently playing on the electronic device and/or information about a content item currently playing or included in a playback queue or playlist of the electronic device.

In some embodiments, such as in FIG. 9C, prior to receiving the input directed to the respective user interface element (e.g., 910*a*), the electronic device (e.g., 101) displays (1028*b*), via the display generation component (e.g., 120), the second user interface (e.g., 906) with a first appearance. In some embodiments, displaying the second user interface with the first appearance includes displaying one or more selectable options for modifying playback of the content item that is currently playing on the electronic device, such as options to skip ahead or skip back in a playback queue, an option to play/pause the content, an option to adjust the volume of the audio of the content item, and/or a scrubber bar. In some embodiments, displaying the second user interface with the first appearance includes forgoing display of an interactive element for adding a respective content item corresponding to the respective user interface element to a playlist, an interactive element for adding the respective content item to a playback queue of the electronic device, and indications of content items in the playback queue.

In some embodiments, such as in FIG. 9E, in response to receiving the input directed to the respective user interface element (e.g., 910*c*), the electronic device (e.g., 101) displays (1028*c*), via the display generation component (e.g., 120), the second user interface (e.g., 906) with a second appearance different from the first appearance. In some embodiments, displaying the second user interface with the second appearance includes displaying the interactive element for adding the respective content item corresponding to the respective user interface element to a playlist, the interactive element for adding the respective content item to a playback queue of the electronic device, and indications of content items in the playback queue. In some embodiments, displaying the second user interface with the second appearance includes forgoing display of one or more selectable options for modifying playback of the content item that is currently playing on the electronic device, such as options to skip ahead or skip back in a playback queue, an option to play/pause the content, an option to adjust the volume of the audio of the content item, and/or a scrubber bar.

Updating the appearance of the second user interface in response to the input provides enhanced visual feedback to the user indicating possible interactions with the respective user interface element and the second user interface in response to the input and providing other content while the input is not being received, thereby enhancing user interactions with the electronic device by presenting information relevant to the inputs being provided by the user.

In some embodiments, such as in FIG. 9E, displaying the second user interface (e.g., 906) with the second appearance includes displaying, via the display generation component (e.g., 120), a playback queue including indications (e.g., 940*a*, 940*b*, 940*c*) of content items queued for playback via an output device associated with the electronic device (e.g., 101) (1030*a*). In some embodiments, the indications of content items include text and/or images identifying the content items. In some embodiments, in response to an input directed to one of the representations, the electronic device initiates a process to update the position in the queue of the content item corresponding to the representation to which the input is directed. In some embodiments, displaying the second user interface with the second appearance further includes displaying an interactive element that, in response to the respective user interface element being dragged to the interactive element, causes the electronic device to add a content item corresponding to the respective user interface element to the playback queue.

In some embodiments, displaying the second user interface with the first appearance includes forgoing display of the playback queue (1030*b*). In some embodiments, displaying the second user interface with the first appearance includes displaying a selectable option that, when selected, causes the electronic device to display the second user interface with the second appearance (e.g., without receiving the input directed to the respective user interface element as described above). Displaying the playback queue in response to the input directed to the respective user interface element provides enhanced visual feedback for adding a content item associated with the respective user interface element to the playback queue, thereby reducing the time and inputs needed to add content items to the playback queue.

In some embodiments, such as in FIG. 9E, displaying the second user interface (e.g., 906) with the second appearance includes displaying, via the display generation component (e.g., 120), an indication (e.g., 938*b*) of a collection of content items (e.g., a playlist) accessible via the application (1032*a*). In some embodiments, in response to detecting that the input directed to the respective user interface element includes moving the respective user interface element to a location in the three-dimensional environment corresponding to the indication of the collection of content items, the electronic device adds a content item corresponding to the respective user interface element to the collection of content items. In some embodiments, the collection of content items is a playlist including a plurality of content items selected by the user for inclusion in the playlist.

In some embodiments, such as in FIG. 9C, displaying the second region of the user interface with the first appearance includes forgoing display of the indication of the collection of content items (1032*b*). In some embodiments, displaying the second user interface with the first appearance includes displaying a selectable option that, when selected, causes the electronic device to display the second user interface with the second appearance (e.g., without receiving the input directed to the respective user interface element as described above).

Displaying the indication of the collection of content items in response to the input directed to the respective user interface element provides enhanced visual feedback for adding a content item associated with the respective user interface element to the collection of content items, thereby reducing the time and inputs needed to add content items to the collection of content items.

In some embodiments, such as in FIG. 9E, displaying the second user interface (e.g., 906) with the second appearance includes displaying, via the display generation component (e.g., 120), a playlist creation element (e.g., 938*a*) (1034*a*).

In some embodiments, such as in FIG. 9C, displaying the second user interface (e.g., 906) with the first appearance includes forgoing display of the playlist creation element (e.g., 938*a* in FIG. 9F) (1034*b*).

In some embodiments, such as in FIG. 9E, while displaying the second user interface (e.g., 906) with the second appearance, in response to receiving the input directed to the respective user interface element (e.g., 910), in accordance with a determination that the movement of the respective portion of the user (e.g., 903*d*) corresponds to moving the respective user interface element (e.g., 910*c*) to a location of the playlist creation element (e.g., 938*a*), the electronic device (e.g., 101) creates (1034*c*) a playlist including a content item corresponding to the respective user interface element (e.g., 910*c*). In some embodiments, after creating the playlist including the content item, the electronic device displays, via the display generation component, in the second user interface with the second appearance, an indication of the new playlist. In some embodiments, the indication of the new playlist is interactive to cause the electronic device to add additional content items to the playlist in response to detecting an input corresponding to a request to drag a user interface element corresponding to a content item to a location corresponding to the indication of the playlist.

Displaying the playlist creation element in response to the input directed to the respective user interface element provides enhanced visual feedback for adding a content item associated with the respective user interface element to a new playlist, thereby reducing the time and inputs needed to add content items to new playlists.

In some embodiments, such as in FIG. 9E, during the input directed to the respective user interface element (e.g., 910*c*) (1036*a*), in response to detecting the respective portion of the user (e.g., 903*d*) in the second pose before detecting the movement of the respective portion of the user in the second pose, the electronic device (e.g., 101) displays (1036*b*), via the display generation component (e.g., 120), the second user interface (e.g., 906) with the first appearance. In some embodiments, the electronic device updates the second user interface in response to detecting the beginning of the input before detecting movement of the respective portion of the user.

In some embodiments, such as in FIG. 9E, during the input directed to the respective user interface element (e.g., 910*c*) (1036*a*), in response to detecting the movement of the respective portion of the user (e.g., 903*d*) in the second pose, the electronic device (e.g., 101) displays (1036*c*), via the display generation component (e.g., 120), the second user interface (e.g., 906) with the second appearance. In some embodiments, in response to detecting the movement of the respective portion of the user while providing the input directed to the respective user interface element, the electronic device maintains display of the second user interface with the second appearance. In some embodiments, the electronic device updates the second user interface to be displayed with the second appearance in response to detecting the movement of the respective portion of the user in the second pose even when the movement does not correspond to moving the respective user interface element to the second user interface. Updating the second user interface to be displayed with the second appearance in response to detecting the respective portion of the user in the second pose before detecting the movement of the respective portion of the user provides enhanced visual feedback to the user that moving the respective user interface element to the second user interface with the second appearance will cause an action to be performed, thereby enhancing visual feedback to the user and enabling the user to use the electronic device quickly and efficiently.

In some embodiments, such as in FIG. 9D, during the input directed to the respective user interface element (1038*a*), in accordance with a determination that the movement of the respective portion (e.g., hand 903*d*) of the user corresponds to movement of the respective user interface element (e.g., 910*c*) to a location outside of the second user interface (e.g., 906) (e.g., within the first user interface, to a location other than the first user interface or second user interface), the electronic device (e.g., 101) displays (1038*b*) the second user interface (e.g., 906) with the first appearance; and In some embodiments, the electronic device maintains display of the second user interface with the first appearance while the movement of the respective portion of the user corresponds to moving the respective user interface element to a location other than the second user interface.

In some embodiments, such as in FIG. 9F, during the input directed to the respective user interface element (e.g., 910*c*)

(1038a), in accordance with a determination that the movement of the respective portion of the user (e.g., 903d) corresponds to movement of the respective user interface element (e.g., 910c) to a location within the second user interface (e.g., 906), the electronic device (e.g., 101) displays (1038c) the second user interface (e.g., 906) with the second appearance. In some embodiments, the electronic device maintains display of the second user interface with the first appearance unless and until the movement of the respective portion of the user corresponds to moving the respective user interface element to a location within the second user interface.

Updating the second user interface to be displayed with the second appearance in response to detecting the movement of the respective portion of the user corresponding to moving the respective user interface element to the second user interface provides an efficient way of preserving display of the second user interface with the first appearance unless and until the respective user interface element is moved to the second user interface, thereby enabling the user to use the electronic device quickly and efficiently by continuing to view the second user interface while providing the input directed to the respective user interface element.

In some embodiments, such as in FIG. 9D, prior to detecting the input directed to the respective user interface element (e.g., 910c), the electronic device (e.g., 101) displays (1040a) the respective user interface element (e.g., 910c) with a first appearance. In some embodiments, displaying the respective user interface element with the first appearance includes displaying an image corresponding to a respective content item associated with the respective user interface element without displaying a visual indication of a characteristic of the content item. For example, the content item is an album and the visual characteristic is an indication of the number of songs included in the album.

In some embodiments, such as in FIG. 9E, in response to detecting the input directed to the respective user interface element (e.g., 910c), the electronic device (e.g., 101) displays (1040b) the respective user interface element (e.g., 910c) with a second appearance different from the first appearance. In some embodiments, displaying the respective user interface element with the second appearance includes displaying an image corresponding to a respective content item associated with the respective user interface element with a visual indication of a characteristic of the content item at least partially overlaid on the image. For example, the content item is an album and the visual characteristic is an indication of the number of songs included in the album. In some embodiments, the electronic device updates the appearance of the respective user interface element in response to receiving selection of the respective user interface element before detecting movement of the respective portion of the user. In some embodiments, the electronic device updates the appearance of the respective user interface element in response to detecting movement of the respective portion of the user after detecting selection of the respective user interface element.

Updating the appearance of the respective user interface element in response to detecting the input directed to the respective user interface element provides enhanced visual feedback to the user indicating information about the operation that will be performed in response to further input, thereby enabling the user to use the electronic device quickly and efficiently with enhanced visual feedback.

In some embodiments, such as in FIG. 9B, the electronic device (e.g., 101) displays (1042), in the user interface, a respective region (e.g., 904) (e.g., container, window, backplane, etc.) of the user interface having a respective boundary between the user interface and a portion of the three-dimensional environment surrounding the user interface, wherein the plurality of interactive elements (e.g., 910a, 910b) is contained within the respective boundary of the user interface, and the respective region of the user interface includes a respective element (e.g., 908) (e.g., a non-selectable element) that extends beyond the respective boundary. In some embodiments, the respective element is an image or other content corresponding to a content item accessible via the application. In some embodiments, the respective element corresponds to a content item selected based on content consumption history of the user and/or content consumption history of a plurality of users of the application (e.g., users of other electronic devices). In some embodiments, the respective element is displayed behind the interactive elements.

Presenting the respective element beyond the respective boundary of the respective region of the user interface provides access to the entire respective element even if it does not fit within the respective boundary of the respective region of the user interface thereby enabling the user to view more content of the user interface quickly and efficiently.

In some embodiments, such as in FIG. 9B, the respective element (e.g., 908) is a three-dimensional element (1044). In some embodiments, the respective element is a three-dimensional image. In some embodiments, the three-dimensional element is associated with one or more content items accessible via the application. In some embodiments, the respective element or a portion of the respective element is between the respective boundary of the respective region of the user interface and the viewpoint of the user in the three-dimensional environment (e.g., the respective element consumes a non-zero volume in the three-dimensional environment).

Presenting the three-dimensional element beyond the respective boundary of the respective region of the user interface provides access to the entire respective element even if it does not fit within the respective boundary of the respective region of the user interface thereby enabling the user to view more content of the user interface quickly and efficiently In some embodiments, such as in FIG. 9A, while a viewpoint of the user in the three-dimensional environment (e.g., 901) is at a first location in the three-dimensional environment, the electronic device (e.g., 101) displays (1046a), via the display generation component (e.g., 120), a first portion of the respective element (e.g., 908) with a first perspective in accordance with the viewpoint at the first location without displaying a second portion of the respective element (e.g., 908). In some embodiments, the electronic device displays the respective element with a parallax effect that includes presenting the first portion of the respective element from the first perspective without presenting a second portion of the respective element. In some embodiments, the electronic device presents multiple three-dimensional elements with the parallax effect. In some embodiments, the electronic device presents multiple non-selectable elements with the parallax effect. In some embodiments, the first perspective is based on the pose (e.g., location and orientation) of the viewpoint of the user in the three-dimensional environment relative to the respective element.

In some embodiments, such as in FIG. 9A, while the viewpoint of the user in the three-dimensional environment (e.g., 901) is at a second location different from the first location in the three-dimensional environment (e.g., 901), the electronic device (e.g., 101) displays (1046b), via the display generation component (e.g., 120), the first portion of the respective element (e.g., 908) and the second portion of the respective element (e.g., 908) with a second perspective different from the second perspective in accordance with the viewpoint at the second location. In some embodiments, while the viewpoint of the user has a first pose, the electronic device presents the first portion of the respective element from the first perspective without displaying the second portion of the respective element and while the viewpoint of the user has a second pose (e.g., in response to detecting the viewpoint of the user change from the first viewpoint to the second viewpoint), the electronic device presents the first and second portions, or the second but not the first portions, of the respective element from the second perspective.

Updating the portion(s) of the respective element that are displayed based on the perspective from which the respective element is displayed provides an immersive experience with the respective element, which enables the user of the electronic device to interact with the application user interface quickly and efficiently in an enhanced immersive experience.

In some embodiments, such as in FIG. 9B, while the respective portion of the user (e.g., 903*b*) is not in the first pose and while detecting, via the one or more input devices (e.g., 314), that the attention (e.g., 913*b*) of the user is directed to the user interface (e.g., 904) of the application, the electronic device (e.g., 101) displays (1048*a*), via the display generation component (e.g., 120), the respective element (e.g., 908) with a second visual characteristic having a first value and displaying, via the display generation component, the plurality of interactive elements (e.g., 910*a*, 910*b*) with the second visual characteristic having the first value. In some embodiments, the second visual characteristic is the same as the visual characteristic discussed above that the electronic device adjusts for the plurality of interactive elements in response to detecting the respective portion of the user in the first pose. In some embodiments, the second visual characteristic different from the visual characteristic discussed above that the electronic device adjusts for the plurality of interactive elements in response to detecting the respective portion of the user in the first pose. In some embodiments, the second visual characteristic is the distance from the viewpoint of the user in the three-dimensional environment. For example, while the respective portion of the user is not in the first pose, the respective element and the interactive elements are displayed the same distance from the viewpoint of the user.

In some embodiments, such as in FIG. 9C, in response to detecting the respective portion of the user (e.g., 903*b*) in the first pose and while the attention (e.g., 913*b*) of the user is directed to the user interface of the application, the electronic device (e.g., 101) displays (1048*b*), via the display generation component (e.g., 120), the respective element (e.g., 908) with the second visual characteristic having the first value and displays, via the display generation component (e.g., 120), the plurality of interactive elements (e.g., 910*a*, 910*b*) with the second visual characteristic having a second value different from the first value. In some embodiments, in response to detecting the respective portion of the user in the first pose, the electronic device updates the second visual characteristic of the interactive elements to visually distinguish the interactive elements from the respective element. For example, in response to detecting the respective portion of the user in the first pose, the electronic device displays the plurality of interactive elements at a distance closer to the viewpoint of the user than the distance from the viewpoint of the user with which the electronic device displays the respective element. In some embodiments, in response to detecting the respective portion of the user in the first pose and while the attention of the user is directed to the user interface of the application, the electronic device displays the respective element with the second visual characteristic having a third value different from the second value. For example, in response to detecting the respective portion of the user in the first pose while the attention of the user is directed to the user interface of the application, the electronic device reduces the distance between the respective element and the viewpoint of the user by a first amount and reduces the distance between the plurality of interactive element and the viewpoint of the user by a second amount greater than the first amount. In some embodiments, the respective element is a backplane of the interactive elements.

Displaying the respective element with the second visual characteristic having the first value and the plurality of interactive elements with the second visual characteristic having the second value in response to detecting the respective portion of the user in the first pose provides enhanced visual feedback to the user to interact with the plurality of interactive elements, thereby enabling the user to use the electronic device quickly and efficiently with enhanced visual feedback.

In some embodiments, aspects/operations of methods 800 and 1000 may be interchanged, substituted, and/or added between these methods. For example, the three-dimensional environments and content applications of methods 800 and 1000 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
displaying, via the display generation component, a user interface of an application in a three-dimensional environment that includes a plurality of interactive elements, wherein the plurality of interactive elements are responsive to inputs including a transition of a respective portion of a user of the electronic device from a first pose to a second pose;
while displaying the user interface of the application in the three-dimensional environment, while the respective portion of the user of the electronic device is not in the first pose and while detecting, via the one or more input devices, that attention of the user is directed to the user interface of the application, displaying, in the user interface of the application, the plurality of interactive elements of the user interface with a visual characteristic having a first value;
while displaying, in the user interface of the application, the plurality of interactive elements with the visual characteristic having the first value and while detecting, via the one or more input devices, that the attention of the user is directed to the user interface of the application, detecting, via the one or more input devices, the respective portion of the user in the first pose; and in response to detecting the respective portion of the user in the first pose and while the attention of the user is directed to the user interface of the application:

updating the user interface to include displaying, via the display generation component, the plurality of interactive elements of the user interface with the visual characteristic having a second value different from the first value.

2. The method of claim 1, further comprising:

while displaying the user interface of the application in the three-dimensional environment, and while detecting, via the one or more input devices, that the attention of the user is directed to the user interface of the application, detecting, via the one or more input devices, the respective portion of the user transition from the first pose to the second pose; and in response to detecting the respective portion of the user transition from the first pose to the second pose, performing a respective operation corresponding to detecting the respective portion of the user transition from the first pose to the second pose.

3. The method of claim 2, wherein:

in accordance with a determination that the attention of the user is directed to a first user interface element of the plurality of interactive elements when the respective portion of the user is detected transitioning from the first pose to the second pose, the respective operation is a first operation corresponding to the first user interface element, and in accordance with a determination that the attention of the user is directed to a second user interface element, different from the first user interface element, of the plurality of user interface elements when the respective portion of the user is detected transitioning from the first pose to the second pose, the respective operation is a second operation, different from the first operation, corresponding to the second user interface element.

4. The method of claim 1, wherein:

the visual characteristic is a distance between locations corresponding to the plurality of interactive elements of the user interface and a viewpoint of the user in the three-dimensional environment, displaying the plurality of interactive elements of the user interface with the visual characteristic having the first value includes displaying the plurality of interactive elements of the user interface at locations that correspond to a first distance from the viewpoint of the user in the three-dimensional environment, and displaying the plurality of interactive elements of the user interface with the visual characteristic having the second value includes displaying the plurality of interactive elements of the user interface at locations that correspond to a second distance from the viewpoint of the user in the three-dimensional environment, the second distance less than the first distance.

5. The method of claim 1, further comprising:

while displaying the user interface of the application in the three-dimensional environment, and while the respective portion of the user is not in the first pose:

displaying, via the display generation component, a first portion of the plurality of interactive elements of the user interface at first locations in the user interface; and forgoing display of a second portion of the plurality of interactive elements of the user interface that are beyond a boundary of the user interface; and in response to detecting the respective portion of the user in the first pose while the attention of the user is directed to the user interface of the application:

displaying, via the display generation component, the first portion of the plurality of interactive elements of the user interface at second locations, different from the first locations, in the user interface; and displaying, via the display generation component, the second portion of the plurality of interactive elements in the user interface.

6. The method of claim 1, further comprising:

while displaying the user interface of the application in the three-dimensional environment, while the respective portion of the user is not in the first pose:

displaying, via the display generation component, a respective user interface element of the plurality of interactive elements of the user interface, including displaying a respective portion of the respective user interface element with a first amount of visual emphasis, wherein the respective user interface element is for navigating content of the user interface of the application; and in response to detecting the respective portion of the user in the first pose while the attention of the user is directed to the respective portion of the respective user interface element:

in accordance with a determination that the respective portion of the respective user interface element is a first portion of the respective user interface element, displaying, via the display generation component, the first portion of the respective user interface element with a second amount of visual emphasis greater than the first amount, and displaying, via the display generation component, a second portion of the respective user interface element with the first amount of visual emphasis; and in accordance with a determination that the respective portion of the respective user interface element is the second portion of the respective user interface element, displaying, via the display generation component, the second portion of the respective user interface element with the second amount of visual emphasis, and displaying, via the display generation component, the first portion of the respective user interface element with the first amount of visual emphasis.

7. The method of claim 6, further comprising:

while displaying the user interface of the application in the three-dimensional environment including displaying the respective portion the respective user interface element with the second amount of visual emphasis:

detecting, via the one or more input devices, movement of the respective portion of the user while the respective portion of the user is in a respective shape; and in response to detecting the movement of the respective portion of the user while the respective portion of the user is in the respective shape, updating display of the respective user interface element to display, via the display generation component, a third portion of the respective user interface element with the second amount of visual emphasis in accordance with the movement of the respective portion of the user.

8. The method of claim 1, further comprising:
while the respective portion of the user is in the first pose:
in accordance with a determination that the attention of the user is directed to a first user interface element of the plurality of interactive elements, displaying, via the display generation component, the first user interface element with the visual characteristic having a third value and displaying, via the display generation component, a second user interface element of the plurality of interactive elements with the visual characteristic having a fourth value different from the third value; and
in accordance with a determination that the attention of the user is directed to the second user interface element, displaying, via the display generation component, the second user interface element with the visual characteristic having the third value and displaying, via the display generation component, the first user interface element with the visual characteristic having the fourth value.

9. The method of claim 1, further comprising:
in response to detecting the respective portion of the user in the first pose:
in accordance with a determination that the attention of the user is directed to a first region of the user interface:
displaying, via the display generation component, a first plurality of interactive elements in the first region of the user interface with the visual characteristic having the second value; and
displaying, via the display generation component, a second plurality of interactive elements in a second region of the user interface different from the first region with the visual characteristic having the first value; and
in accordance with a determination that the attention of the user is directed to the second region of the user interface:
displaying, via the display generation component, the second plurality of interactive elements with the visual characteristic having the second value; and
displaying, via the display generation component, the first plurality of interactive elements with the visual characteristic having the first value.

10. The method of claim 1, further comprising:
while displaying the plurality of interactive elements with the visual characteristic having the second value, receiving, via the one or more input devices, an input directed to a respective user interface element of the plurality of interactive elements, the input including the respective portion of the user transitioning to the second pose and movement of the respective portion of the user while in the second pose; and
in response to receiving the input directed to the respective user interface element, moving the respective user interface element in three-dimensional environment in accordance with the movement of the respective portion of the user.

11. The method of claim 10, wherein the user interface of the application includes a content section of the application, and the three-dimensional environment further includes a second user interface of the application including a media player section of the application, and the method further comprises:

prior to receiving the input directed to the respective user interface element:
displaying, via the display generation component, the second user interface with a first appearance;
in response to receiving the input directed to the respective user interface element:
displaying, via the display generation component, the second user interface with a second appearance different from the first appearance.

12. The method of claim 11, wherein:
displaying the second user interface with the second appearance includes displaying, via the display generation component, a playback queue including indications of content items queued for playback via an output device associated with the electronic device, and
displaying the second user interface with the first appearance includes forgoing display of the playback queue.

13. The method of claim 11, wherein:
displaying the second user interface with the second appearance includes displaying, via the display generation component, an indication of a collection of content items accessible via the application, and
displaying the second user interface with the first appearance includes forgoing display of the indication of the collection of content items.

14. The method of claim 11, wherein:
displaying the second user interface with the second appearance includes displaying, via the display generation component, a playlist creation element,
displaying the second user interface with the first appearance includes forgoing display of the playlist creation element, and
the method further comprises:
while displaying the second user interface with the second appearance, in response to receiving the input directed to the respective user interface element, in accordance with a determination that the movement of the respective portion of the user corresponds to moving the respective user interface element to a location of the playlist creation element, creating a playlist including a content item corresponding to the respective user interface element.

15. The method of claim 11, further comprising:
during the input directed to the respective user interface element:
in response to detecting the respective portion of the user in the second pose before detecting the movement of the respective portion of the user in the second pose, displaying, via the display generation component, the second user interface with the first appearance; and
in response to detecting the movement of the respective portion of the user in the second pose, displaying, via the display generation component, the second user interface with the second appearance.

16. The method of claim 11, further comprising:
during the input directed to the respective user interface element:
in accordance with a determination that the movement of the respective portion of the user corresponds to movement of the respective user interface element to a location outside of the second user interface, displaying the second user interface with the first appearance; and
in accordance with a determination that the movement of the respective portion of the user corresponds to movement of the respective user interface element to a location within the second user interface, displaying the second user interface with the second appearance.

17. An electronic device, comprising:
one or more processors;
memory; and
one or more programs, wherein the one or more programs are stored in the memory and configured to be executed by the one or more processors, the one or more programs including instructions for:
displaying, via a display generation component, a user interface of an application in a three-dimensional environment that includes a plurality of interactive elements, wherein the plurality of interactive elements are responsive to inputs including a transition of a respective portion of a user of the electronic device from a first pose to a second pose;
while displaying the user interface of the application in the three-dimensional environment, while the respective portion of the user of the electronic device is not in the first pose and while detecting, via one or more input devices, that attention of the user is directed to the user interface of the application, displaying, in the user interface of the application, the plurality of interactive elements of the user interface with a visual characteristic having a first value;
while displaying, in the user interface of the application, the plurality of interactive elements with the visual characteristic having the first value and while detecting, via one or more input devices, that the attention of the user is directed to the user interface of the application, detecting, via the one or more input devices, the respective portion of the user in the first pose; and
in response to detecting the respective portion of the user in the first pose and while the attention of the user is directed to the user interface of the application:
updating the user interface to include displaying, via the display generation component, the plurality of interactive elements of the user interface with the visual characteristic having a second value different from the first value.

18. A non-transitory computer readable storage medium storing one or more programs, the one or more programs comprising instructions, which when executed by one or more processors of an electronic device, cause the electronic device to perform a method comprising:
displaying, via a display generation component, a user interface of an application in a three-dimensional environment that includes a plurality of interactive elements, wherein the plurality of interactive elements are responsive to inputs including a transition of a respective portion of a user of the electronic device from a first pose to a second pose;
while displaying the user interface of the application in the three-dimensional environment, while the respective portion of the user of the electronic device is not in the first pose and while detecting, via one or more input devices, that attention of the user is directed to the user interface of the application, displaying, in the user interface of the application, the plurality of interactive elements of the user interface with a visual characteristic having a first value;
while displaying, in the user interface of the application, the plurality of interactive elements with the visual characteristic having the first value and while detecting, via one or more input devices, that the attention of the user is directed to the user interface of the application, detecting, via the one or more input devices, the respective portion of the user in the first pose; and
in response to detecting the respective portion of the user in the first pose and while the attention of the user is directed to the user interface of the application:
updating the user interface to include displaying, via the display generation component, the plurality of interactive elements of the user interface with the visual characteristic having a second value different from the first value.

19. The electronic device of claim 17, wherein the one or more programs further include instructions for:
while displaying the user interface of the application in the three-dimensional environment, and while detecting, via the one or more input devices, that the attention of the user is directed to the user interface of the application, detecting, via the one or more input devices, the respective portion of the user transition from the first pose to the second pose; and
in response to detecting the respective portion of the user transition from the first pose to the second pose, performing a respective operation corresponding to detecting the respective portion of the user transition from the first pose to the second pose.

20. The electronic device of claim 19, wherein:
in accordance with a determination that the attention of the user is directed to a first user interface element of the plurality of interactive elements when the respective portion of the user is detected transitioning from the first pose to the second pose, the respective operation is a first operation corresponding to the first user interface element, and
in accordance with a determination that the attention of the user is directed to a second user interface element, different from the first user interface element, of the plurality of user interface elements when the respective portion of the user is detected transitioning from the first pose to the second pose, the respective operation is a second operation, different from the first operation, corresponding to the second user interface element.

21. The electronic device of claim 17, wherein:
the visual characteristic is a distance between locations corresponding to the plurality of interactive elements of the user interface and a viewpoint of the user in the three-dimensional environment,
displaying the plurality of interactive elements of the user interface with the visual characteristic having the first value includes displaying the plurality of interactive elements of the user interface at locations that correspond to a first distance from the viewpoint of the user in the three-dimensional environment, and
displaying the plurality of interactive elements of the user interface with the visual characteristic having the second value includes displaying the plurality of interactive elements of the user interface at locations that correspond to a second distance from the viewpoint of the user in the three-dimensional environment, the second distance less than the first distance.

22. The electronic device of claim 17, wherein the one or more programs further include instructions for:
while displaying the user interface of the application in the three-dimensional environment, and while the respective portion of the user is not in the first pose:

displaying, via the display generation component, a first portion of the plurality of interactive elements of the user interface at first locations in the user interface; and forgoing display of a second portion of the plurality of interactive elements of the user interface that are beyond a boundary of the user interface; and in response to detecting the respective portion of the user in the first pose while the attention of the user is directed to the user interface of the application:

displaying, via the display generation component, the first portion of the plurality of interactive elements of the user interface at second locations, different from the first locations, in the user interface; and displaying, via the display generation component, the second portion of the plurality of interactive elements in the user interface.

23. The electronic device of claim 17, wherein the one or more programs further include instructions for:

while displaying the user interface of the application in the three-dimensional environment, while the respective portion of the user is not in the first pose:

displaying, via the display generation component, a respective user interface element of the plurality of interactive elements of the user interface, including displaying a respective portion of the respective user interface element with a first amount of visual emphasis, wherein the respective user interface element is for navigating content of the user interface of the application; and in response to detecting the respective portion of the user in the first pose while the attention of the user is directed to the respective portion of the respective user interface element:

in accordance with a determination that the respective portion of the respective user interface element is a first portion of the respective user interface element, displaying, via the display generation component, the first portion of the respective user interface element with a second amount of visual emphasis greater than the first amount, and displaying, via the display generation component, a second portion of the respective user interface element with the first amount of visual emphasis; and in accordance with a determination that the respective portion of the respective user interface element is the second portion of the respective user interface element, displaying, via the display generation component, the second portion of the respective user interface element with the second amount of visual emphasis, and displaying, via the display generation component, the first portion of the respective user interface element with the first amount of visual emphasis.

24. The electronic device of claim 23, wherein the one or more programs further include instructions for:

while displaying the user interface of the application in the three-dimensional environment including displaying the respective portion the respective user interface element with the second amount of visual emphasis:

detecting, via the one or more input devices, movement of the respective portion of the user while the respective portion of the user is in a respective shape; and in response to detecting the movement of the respective portion of the user while the respective portion of the user is in the respective shape, updating display of the respective user interface element to display, via the display generation component, a third portion of the respective user interface element with the second amount of visual emphasis in accordance with the movement of the respective portion of the user.

25. The electronic device of claim 17, wherein the one or more programs further include instructions for:

while the respective portion of the user is in the first pose:

in accordance with a determination that the attention of the user is directed to a first user interface element of the plurality of interactive elements, displaying, via the display generation component, the first user interface element with the visual characteristic having a third value and displaying, via the display generation component, a second user interface element of the plurality of interactive elements with the visual characteristic having a fourth value different from the third value; and in accordance with a determination that the attention of the user is directed to the second user interface element, displaying, via the display generation component, the second user interface element with the visual characteristic having the third value and displaying, via the display generation component, the first user interface element with the visual characteristic having the fourth value.

26. The electronic device of claim 17, wherein the one or more programs further include instructions for:

in response to detecting the respective portion of the user in the first pose:

in accordance with a determination that the attention of the user is directed to a first region of the user interface:

displaying, via the display generation component, a first plurality of interactive elements in the first region of the user interface with the visual characteristic having the second value; and displaying, via the display generation component, a second plurality of interactive elements in a second region of the user interface different from the first region with the visual characteristic having the first value; and in accordance with a determination that the attention of the user is directed to the second region of the user interface:

displaying, via the display generation component, the second plurality of interactive elements with the visual characteristic having the second value; and displaying, via the display generation component, the first plurality of interactive elements with the visual characteristic having the first value.

27. The electronic device of claim 17, wherein the one or more programs further include instructions for:

while displaying the plurality of interactive elements with the visual characteristic having the second value, receiving, via the one or more input devices, an input directed to a respective user interface element of the plurality of interactive elements, the input including the respective portion of the user transitioning to the second pose and movement of the respective portion of the user while in the second pose; and in response to receiving the input directed to the respective user interface element, moving the respective user interface element in three-dimensional environment in accordance with the movement of the respective portion of the user.

28. The electronic device of claim 27, wherein the user interface of the application includes a content section of the application, and the three-dimensional environment further includes a second user interface of the application including a media player section of the application, and the one or more programs further include instructions for:
- prior to receiving the input directed to the respective user interface element:
  - displaying, via the display generation component, the second user interface with a first appearance;
- in response to receiving the input directed to the respective user interface element:
  - displaying, via the display generation component, the second user interface with a second appearance different from the first appearance.

29. The electronic device of claim 28, wherein:
- displaying the second user interface with the second appearance includes displaying, via the display generation component, a playback queue including indications of content items queued for playback via an output device associated with the electronic device, and
- displaying the second user interface with the first appearance includes forgoing display of the playback queue.

30. The electronic device of claim 28, wherein:
- displaying the second user interface with the second appearance includes displaying, via the display generation component, an indication of a collection of content items accessible via the application, and
- displaying the second user interface with the first appearance includes forgoing display of the indication of the collection of content items.

31. The electronic device of claim 28, wherein:
- displaying the second user interface with the second appearance includes displaying, via the display generation component, a playlist creation element,
- displaying the second user interface with the first appearance includes forgoing display of the playlist creation element, and
- the one or more programs further include instructions for:
  - while displaying the second user interface with the second appearance, in response to receiving the input directed to the respective user interface element, in accordance with a determination that the movement of the respective portion of the user corresponds to moving the respective user interface element to a location of the playlist creation element, creating a playlist including a content item corresponding to the respective user interface element.

32. The electronic device of claim 28, wherein the one or more programs further include instructions for:
- during the input directed to the respective user interface element:
  - in response to detecting the respective portion of the user in the second pose before detecting the movement of the respective portion of the user in the second pose, displaying, via the display generation component, the second user interface with the first appearance; and
  - in response to detecting the movement of the respective portion of the user in the second pose, displaying, via the display generation component, the second user interface with the second appearance.

33. The electronic device of claim 28, wherein the one or more programs further include instructions for:
- during the input directed to the respective user interface element:
  - in accordance with a determination that the movement of the respective portion of the user corresponds to movement of the respective user interface element to a location outside of the second user interface, displaying the second user interface with the first appearance; and
  - in accordance with a determination that the movement of the respective portion of the user corresponds to movement of the respective user interface element to a location within the second user interface, displaying the second user interface with the second appearance.

34. The non-transitory computer readable storage medium of claim 18, wherein the method further comprises:
- while displaying the user interface of the application in the three-dimensional environment, and while detecting, via the one or more input devices, that the attention of the user is directed to the user interface of the application, detecting, via the one or more input devices, the respective portion of the user transition from the first pose to the second pose; and
- in response to detecting the respective portion of the user transition from the first pose to the second pose, performing a respective operation corresponding to detecting the respective portion of the user transition from the first pose to the second pose.

35. The non-transitory computer readable storage medium of claim 34, wherein:
- in accordance with a determination that the attention of the user is directed to a first user interface element of the plurality of interactive elements when the respective portion of the user is detected transitioning from the first pose to the second pose, the respective operation is a first operation corresponding to the first user interface element, and
- in accordance with a determination that the attention of the user is directed to a second user interface element, different from the first user interface element, of the plurality of user interface elements when the respective portion of the user is detected transitioning from the first pose to the second pose, the respective operation is a second operation, different from the first operation, corresponding to the second user interface element.

36. The non-transitory computer readable storage medium of claim 18, wherein:
- the visual characteristic is a distance between locations corresponding to the plurality of interactive elements of the user interface and a viewpoint of the user in the three-dimensional environment,
- displaying the plurality of interactive elements of the user interface with the visual characteristic having the first value includes displaying the plurality of interactive elements of the user interface at locations that correspond to a first distance from the viewpoint of the user in the three-dimensional environment, and
- displaying the plurality of interactive elements of the user interface with the visual characteristic having the second value includes displaying the plurality of interactive elements of the user interface at locations that correspond to a second distance from the viewpoint of the user in the three-dimensional environment, the second distance less than the first distance.

37. The non-transitory computer readable storage medium of claim 18, wherein the method further comprises:
- while displaying the user interface of the application in the three-dimensional environment, and while the respective portion of the user is not in the first pose:

displaying, via the display generation component, a first portion of the plurality of interactive elements of the user interface at first locations in the user interface; and forgoing display of a second portion of the plurality of interactive elements of the user interface that are beyond a boundary of the user interface; and in response to detecting the respective portion of the user in the first pose while the attention of the user is directed to the user interface of the application:

displaying, via the display generation component, the first portion of the plurality of interactive elements of the user interface at second locations, different from the first locations, in the user interface; and displaying, via the display generation component, the second portion of the plurality of interactive elements in the user interface.

38. The non-transitory computer readable storage medium of claim 18, wherein the method further comprises:

while displaying the user interface of the application in the three-dimensional environment, while the respective portion of the user is not in the first pose:

displaying, via the display generation component, a respective user interface element of the plurality of interactive elements of the user interface, including displaying a respective portion of the respective user interface element with a first amount of visual emphasis, wherein the respective user interface element is for navigating content of the user interface of the application; and in response to detecting the respective portion of the user in the first pose while the attention of the user is directed to the respective portion of the respective user interface element:

in accordance with a determination that the respective portion of the respective user interface element is a first portion of the respective user interface element, displaying, via the display generation component, the first portion of the respective user interface element with a second amount of visual emphasis greater than the first amount, and displaying, via the display generation component, a second portion of the respective user interface element with the first amount of visual emphasis; and in accordance with a determination that the respective portion of the respective user interface element is the second portion of the respective user interface element, displaying, via the display generation component, the second portion of the respective user interface element with the second amount of visual emphasis, and displaying, via the display generation component, the first portion of the respective user interface element with the first amount of visual emphasis.

39. The non-transitory computer readable storage medium of claim 38, wherein the method further comprises:

while displaying the user interface of the application in the three-dimensional environment including displaying the respective portion the respective user interface element with the second amount of visual emphasis:

detecting, via the one or more input devices, movement of the respective portion of the user while the respective portion of the user is in a respective shape; and in response to detecting the movement of the respective portion of the user while the respective portion of the user is in the respective shape, updating display of the respective user interface element to display, via the display generation component, a third portion of the respective user interface element with the second amount of visual emphasis in accordance with the movement of the respective portion of the user.

40. The non-transitory computer readable storage medium of claim 18, wherein the method further comprises:

while the respective portion of the user is in the first pose:

in accordance with a determination that the attention of the user is directed to a first user interface element of the plurality of interactive elements, displaying, via the display generation component, the first user interface element with the visual characteristic having a third value and displaying, via the display generation component, a second user interface element of the plurality of interactive elements with the visual characteristic having a fourth value different from the third value; and in accordance with a determination that the attention of the user is directed to the second user interface element, displaying, via the display generation component, the second user interface element with the visual characteristic having the third value and displaying, via the display generation component, the first user interface element with the visual characteristic having the fourth value.

41. The non-transitory computer readable storage medium of claim 18, wherein the method further comprises:

in response to detecting the respective portion of the user in the first pose:

in accordance with a determination that the attention of the user is directed to a first region of the user interface:

displaying, via the display generation component, a first plurality of interactive elements in the first region of the user interface with the visual characteristic having the second value; and displaying, via the display generation component, a second plurality of interactive elements in a second region of the user interface different from the first region with the visual characteristic having the first value; and in accordance with a determination that the attention of the user is directed to the second region of the user interface:

displaying, via the display generation component, the second plurality of interactive elements with the visual characteristic having the second value; and displaying, via the display generation component, the first plurality of interactive elements with the visual characteristic having the first value.

42. The non-transitory computer readable storage medium of claim 18, wherein the method further comprises:

while displaying the plurality of interactive elements with the visual characteristic having the second value, receiving, via the one or more input devices, an input directed to a respective user interface element of the plurality of interactive elements, the input including the respective portion of the user transitioning to the second pose and movement of the respective portion of the user while in the second pose; and in response to receiving the input directed to the respective user interface element, moving the respective user interface element in three-dimensional environment in accordance with the movement of the respective portion of the user.

43. The electronic device of claim 42, wherein the user interface of the application includes a content section of the application, and the three-dimensional environment further includes a second user interface of the application including a media player section of the application, and the method further comprises:

prior to receiving the input directed to the respective user interface element:
displaying, via the display generation component, the second user interface with a first appearance;
in response to receiving the input directed to the respective user interface element:
displaying, via the display generation component, the second user interface with a second appearance different from the first appearance.

44. The non-transitory computer readable storage medium of claim 43, wherein:
displaying the second user interface with the second appearance includes displaying, via the display generation component, a playback queue including indications of content items queued for playback via an output device associated with the electronic device, and
displaying the second user interface with the first appearance includes forgoing display of the playback queue.

45. The non-transitory computer readable storage medium of claim 43, wherein:
displaying the second user interface with the second appearance includes displaying, via the display generation component, an indication of a collection of content items accessible via the application, and
displaying the second user interface with the first appearance includes forgoing display of the indication of the collection of content items.

46. The non-transitory computer readable storage medium of claim 43, wherein:
displaying the second user interface with the second appearance includes displaying, via the display generation component, a playlist creation element,
displaying the second user interface with the first appearance includes forgoing display of the playlist creation element, and
the one or more programs further include instructions for:
while displaying the second user interface with the second appearance, in response to receiving the input directed to the respective user interface element, in accordance with a determination that the movement of the respective portion of the user corresponds to moving the respective user interface element to a location of the playlist creation element, creating a playlist including a content item corresponding to the respective user interface element.

47. The non-transitory computer readable storage medium of claim 43, wherein the method further comprises:
during the input directed to the respective user interface element:
in response to detecting the respective portion of the user in the second pose before detecting the movement of the respective portion of the user in the second pose, displaying, via the display generation component, the second user interface with the first appearance; and
in response to detecting the movement of the respective portion of the user in the second pose, displaying, via the display generation component, the second user interface with the second appearance.

48. The non-transitory computer readable storage medium of claim 43, wherein the method further comprises:
during the input directed to the respective user interface element:
in accordance with a determination that the movement of the respective portion of the user corresponds to movement of the respective user interface element to a location outside of the second user interface, displaying the second user interface with the first appearance; and
in accordance with a determination that the movement of the respective portion of the user corresponds to movement of the respective user interface element to a location within the second user interface, displaying the second user interface with the second appearance.

* * * * *